US012546645B2

(12) United States Patent
El Haddad et al.

(10) Patent No.: US 12,546,645 B2
(45) Date of Patent: Feb. 10, 2026

(54) DUAL-TRUNCATED WHEEL KIBBLE BALANCE AND DETERMINING ABSOLUTE MASS

(71) Applicant: Government of the United States of America, as represented by the Secretary of Commerce, Gaithersburg, MD (US)

(72) Inventors: Darine El Haddad, Gaithersburg, MD (US); Lorenz Harald Keck, Washington, DC (US); René Bernd Theska, Ilmenau (DE); Frank Christian Seifert, Germantown, MD (US)

(73) Assignee: Government of the United States of America, as represented by the Secretary of Commerce, Gaithersburg, MD (US)

( * ) Notice: Subject to any disclaimer, the term of this patent is extended or adjusted under 35 U.S.C. 154(b) by 321 days.

(21) Appl. No.: 18/210,033

(22) Filed: Jun. 14, 2023

(65) Prior Publication Data

US 2023/0400346 A1    Dec. 14, 2023

Related U.S. Application Data

(60) Provisional application No. 63/352,006, filed on Jun. 14, 2022.

(51) Int. Cl.
*G01G 21/28* (2006.01)
*G01G 21/23* (2006.01)

(52) U.S. Cl.
CPC ............. *G01G 21/28* (2013.01); *G01G 21/23* (2013.01)

(58) Field of Classification Search
CPC ........ G01G 1/22; G01G 21/23; G01G 21/244; G01G 21/26; G01G 21/28; G01G 7/04
See application file for complete search history.

(56) References Cited

U.S. PATENT DOCUMENTS 4,798,251 A    1/1989  Maaz et al.
7,847,202 B2  12/2010  Mueller et al.
(Continued)

FOREIGN PATENT DOCUMENTS

CN       101819059 A  *  9/2010
DE    102016106695 A1  * 10/2017   ............... G01G 7/04
EP       3591352 B1  * 12/2021   ............... G01G 7/04

OTHER PUBLICATIONS

Screenshot of publication date for Proceedings in American Society for Precision Engineering, Minneapolis, 2021. (Year: 2022).*
(Continued)

*Primary Examiner* — Natalie Huls
(74) *Attorney, Agent, or Firm* — Office of Chief Counsel for National Institute of Standards and Technology

(57) ABSTRACT

A dual-truncated wheel Kibble balance includes: a stationary frame; a double balance wheel disposed on the stationary frame; a pair of guide members, such that one of the guide members is disposed on each opposing end of the double balance wheel; outer connector bands, such that each guide member is gravitationally suspended from the double balance wheel by at least one of the outer connector bands; inner connector bands, such that each guide member is gravitationally suspended from the double balance wheel by at least one of the inner connector bands; and a central flexural bridge in mechanical communication with the stationary frame and the double balance wheel, such that the central flexural bridge is: interposed between the stationary frame and double balance wheel, interconnects the stationary frame and the double balance wheel, and flexes in
(Continued)

response to pivotal motion of the double balance wheel relative to the stationary frame.

25 Claims, 41 Drawing Sheets

(56) References Cited

U.S. PATENT DOCUMENTS

2020/0182682 A1* 6/2020 Chao .................. G01G 23/10
2023/0375396 A1* 11/2023 Chao .................. G01G 1/20

OTHER PUBLICATIONS

Fang, H., et al., "The BIPM Kibble balance for realizing the kilogram definition", Metrologia, 2020, p. 045009, vol. 57.
Kim, D., et al., "Realization of the kilogram using the KRISS Kibble balance", Metrologia, 2020, p. 055006, vol. 57.
Villar, F., et al., "75 mm stroke flexure stage for the LNE watt balance experiment", Precision Engineering, 2011, p. 693-703, vol. 35.
Cosandier, F., et al., "Development and integration of high straightness flexure guiding mechanisms dedicated to the METAS watt balance Mark II", Metrologia, 2014, p. S88-S95, vol. 51.
Fung, Y.H., et al., "Alignment in the MSL Kibble balance", IEEE, 2020, p. 1-2.
Li, Z., et al., "The Improvements of the NIM-2 Joule Balance", IEEE Transactions on Instrumentation and Measurement, 2019, p. 2208-2214, vol. 68 No. 6.
Haddad, D., et al., "Measurement of the Planck constant at the National Institute of Standards and Technology from 2015 to 2017", Metrologia, 2017, p. 633-641, vol. 54.
Robinson, I.A., "Simplified fundamental force and mass measurements", Metrologia, 2016, p. 1054-1060, vol. 53.
Wood, B.M., et al., "A summary of the Planck constant determinations using the NRC Kibble balance", Metrologia, 2017, p. 399-409, vol. 54.
Rothleitner, C., et al., "The Planck-Balance-using a fixed value of the Planck constant to calibrate E1/E2-weights", Measurement Science and Technology, 2018, p. 074003, vol. 29.
Ahmedov, H., et al., "Preliminary Planck constant measurements via UME oscillating magnet Kibble balance", Metrologia, 2018, p. 326-333, vol. 55.
Keck, L., et al., "Design of an Electrostatic Balance Mechanism to Measure Optical Power of 100 kW", IEEE Transactions on Instrumentation and Measurement, 2021, p. 7002909, vol. 70.
Pratt, J.R., et al., "A Flexure Balance with Adjustable Restoring Torque for Nanonewton Force Measurement", International Measurement Confederation 2002, 2002, p. 1-6.
Mettler Toledo, "Precision Balances and Scales, Accurate and Precise Weighing Equipment for the Laboratory and Manufacturing", Accessed Jun. 16, 2023, DOI: https://www.mt.com/ca/en/home/products/Laboratory_Weighing_Solutions/precision-balances.html.
Keck, L., et al., "Design of the Mechanical System for the Quantum Electro-Mechanical Metrology Suite", In: Proceedings in American Society for Precision Engineering, Minneapolis, 2021, p. 1-4.
Keck, L., et al., "An enhanced mechanism for a Kibble balance at the National Institute of Standards and Technology", Proceedings in euspen's 22nd International Conference & Exhibition, Geneva, CH, 2022, p. 1-4.
Keck, L., et al., "Design of an enhanced mechanism for a new Kibble balance directly traceable to the quantum Si", EPJ Techn Instrum 9, 2022, p. 1-20, DOI:https://doi.org/10.1140/epjti/s40485-022-00080-3.

* cited by examiner (A)
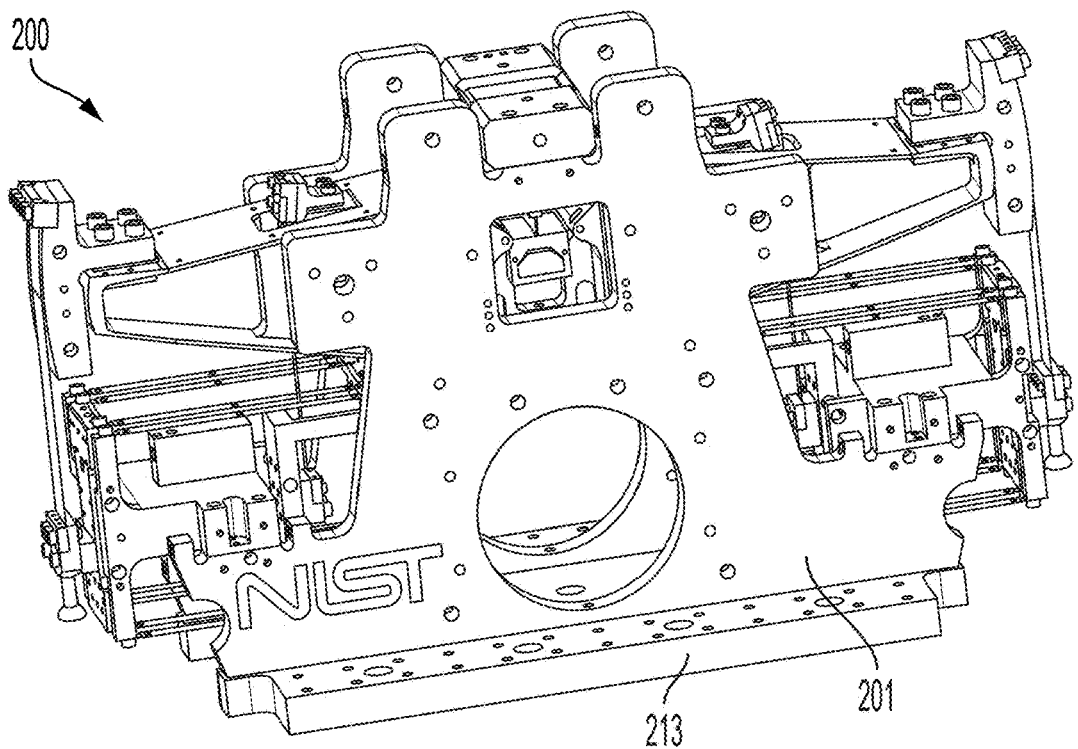
(B)
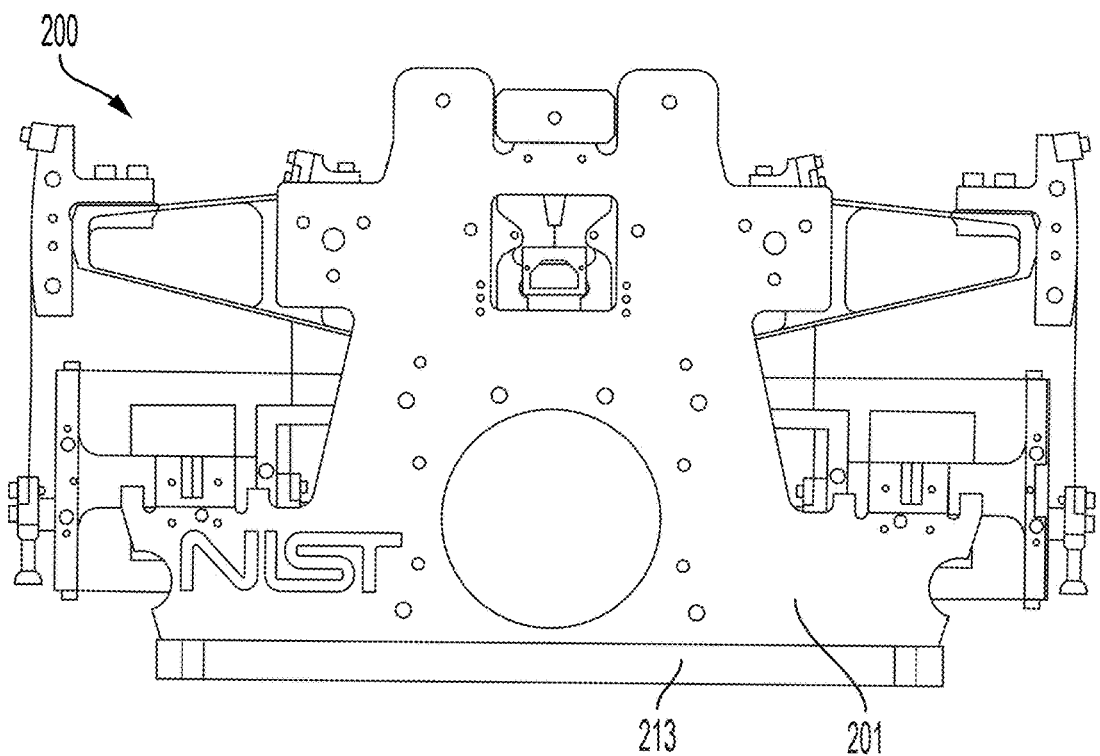
FIG. 3

(A)
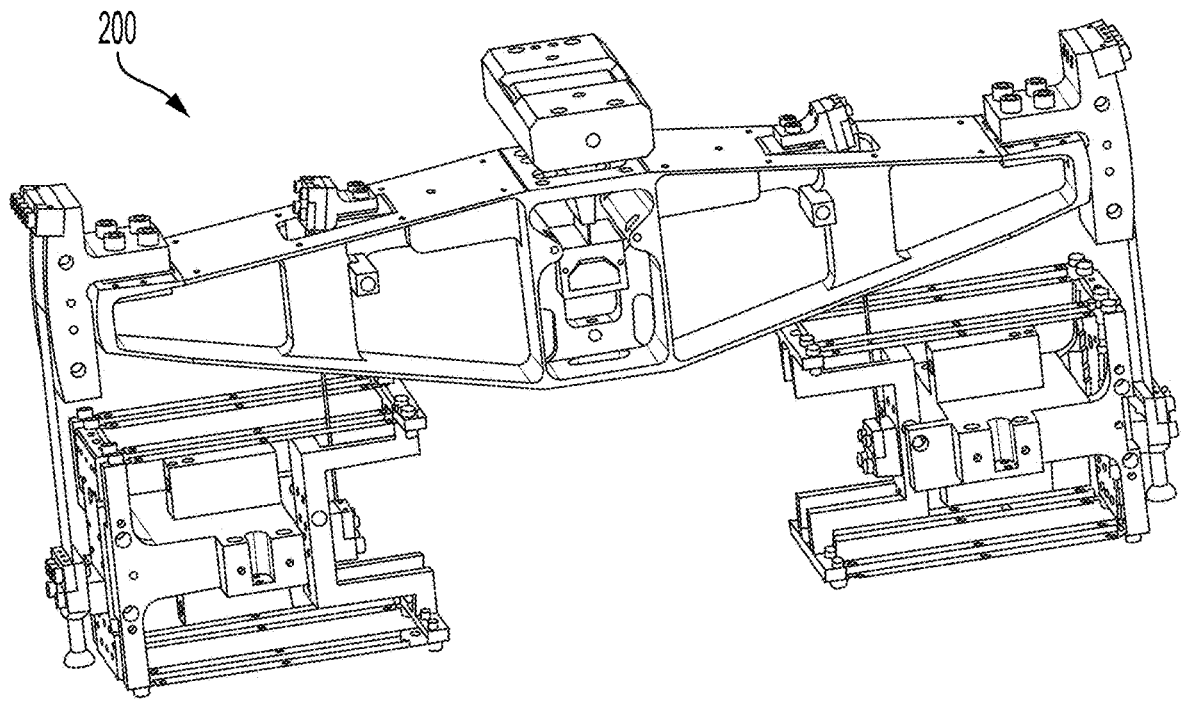
(B)
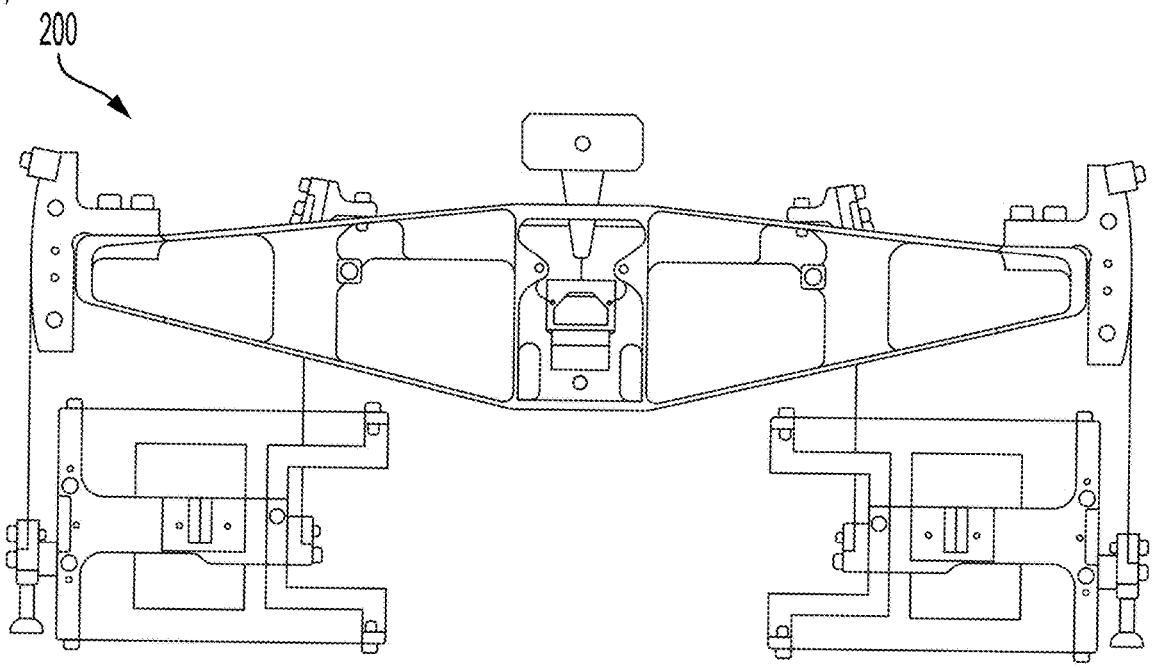
FIG. 9

(A)
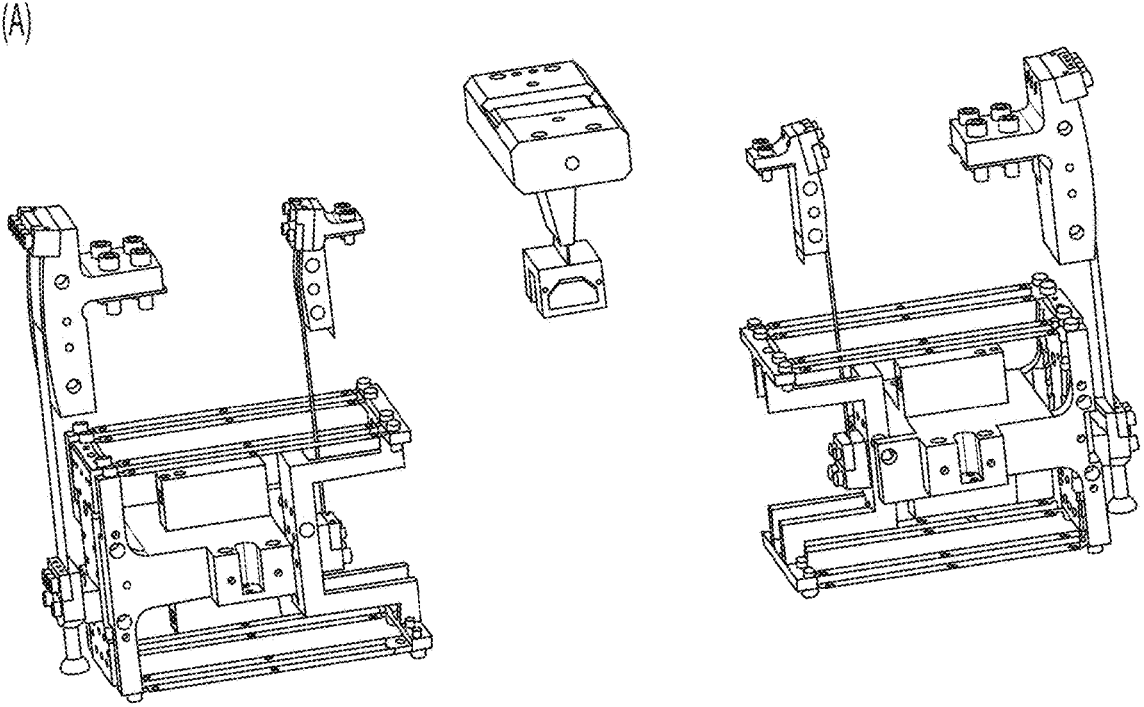
(B)
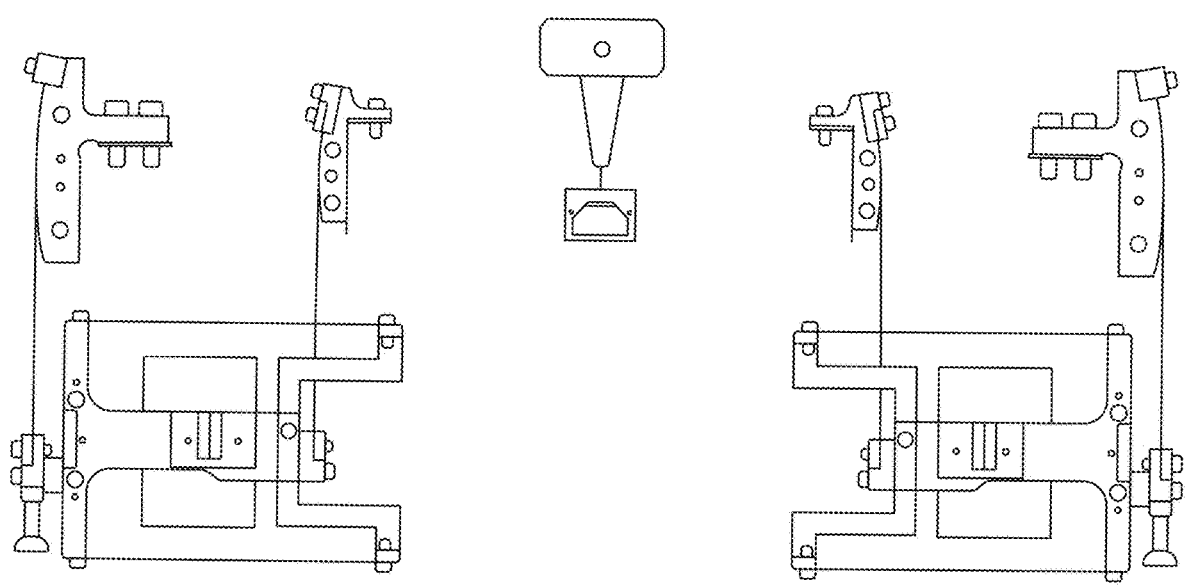
FIG. 12

(A)
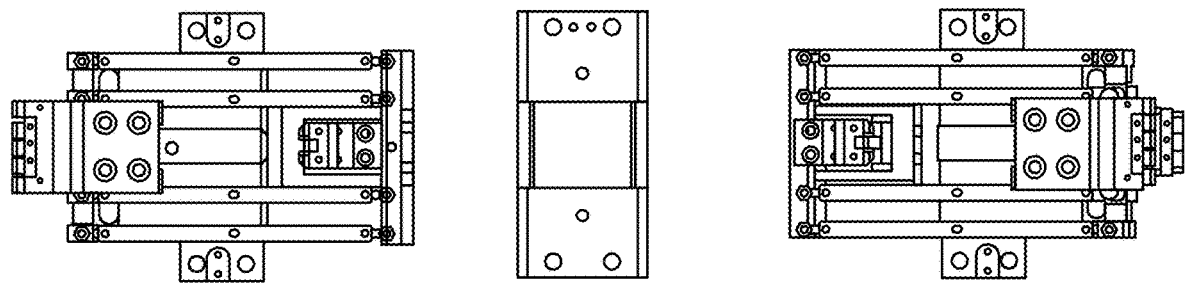
(B)
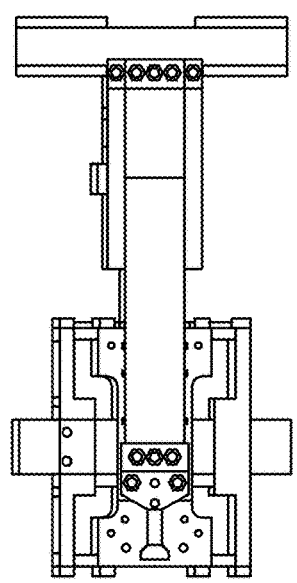
(C)
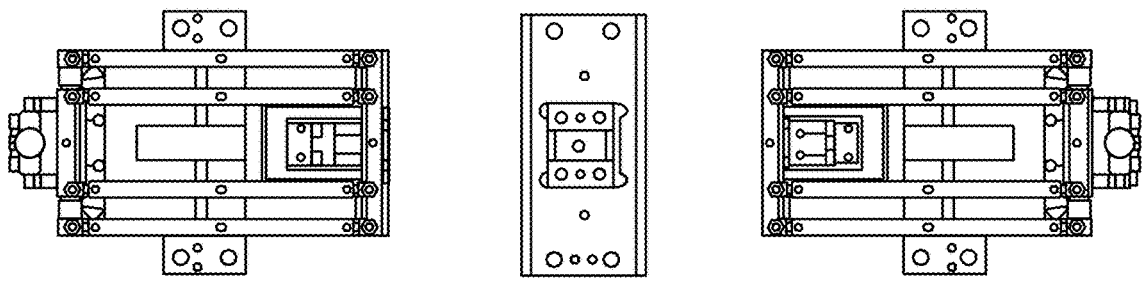
FIG. 13

(A)
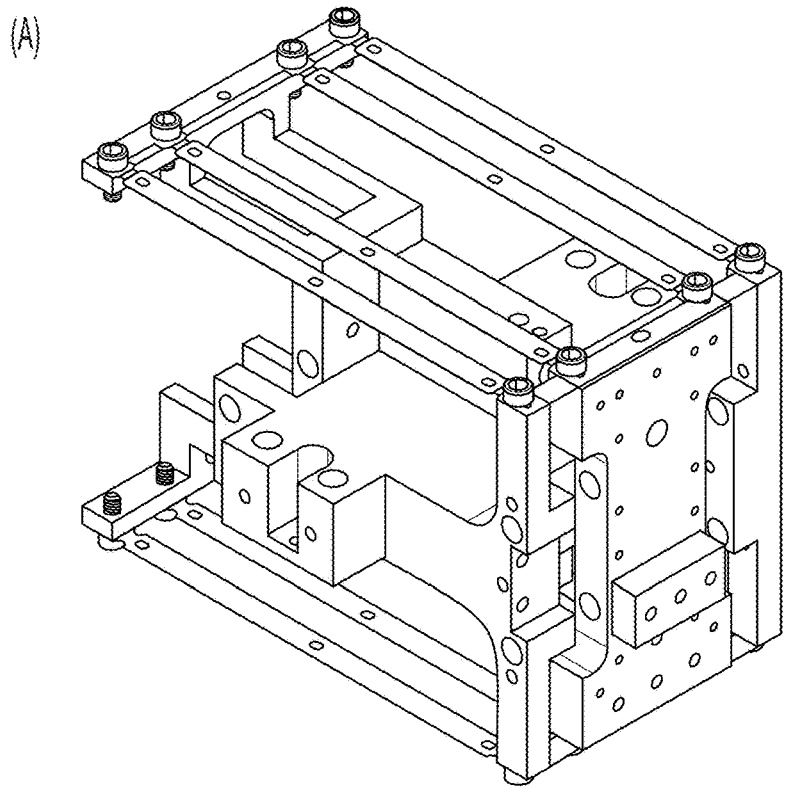
(B)
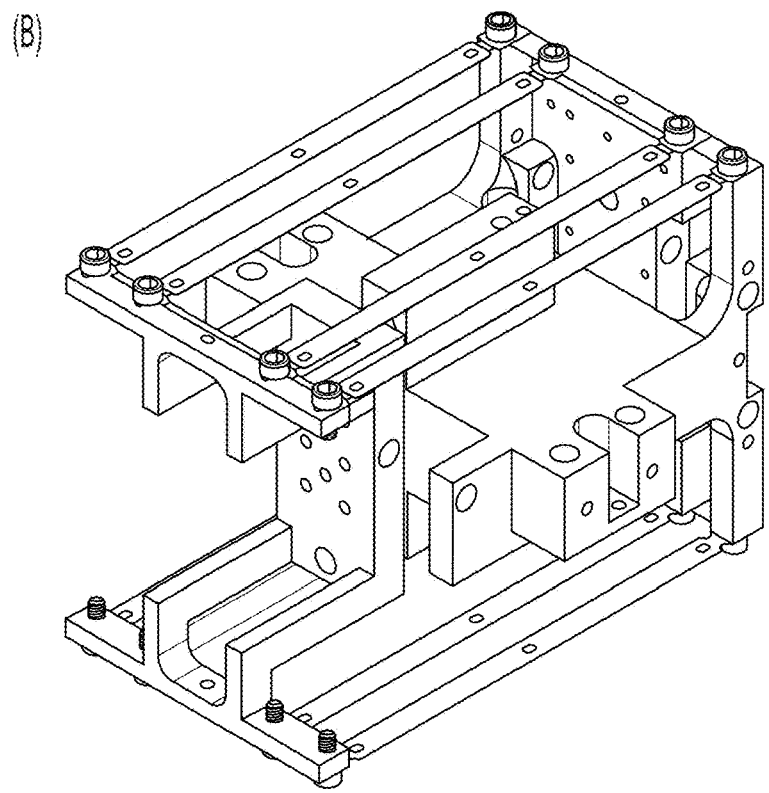
FIG. 20

(A)
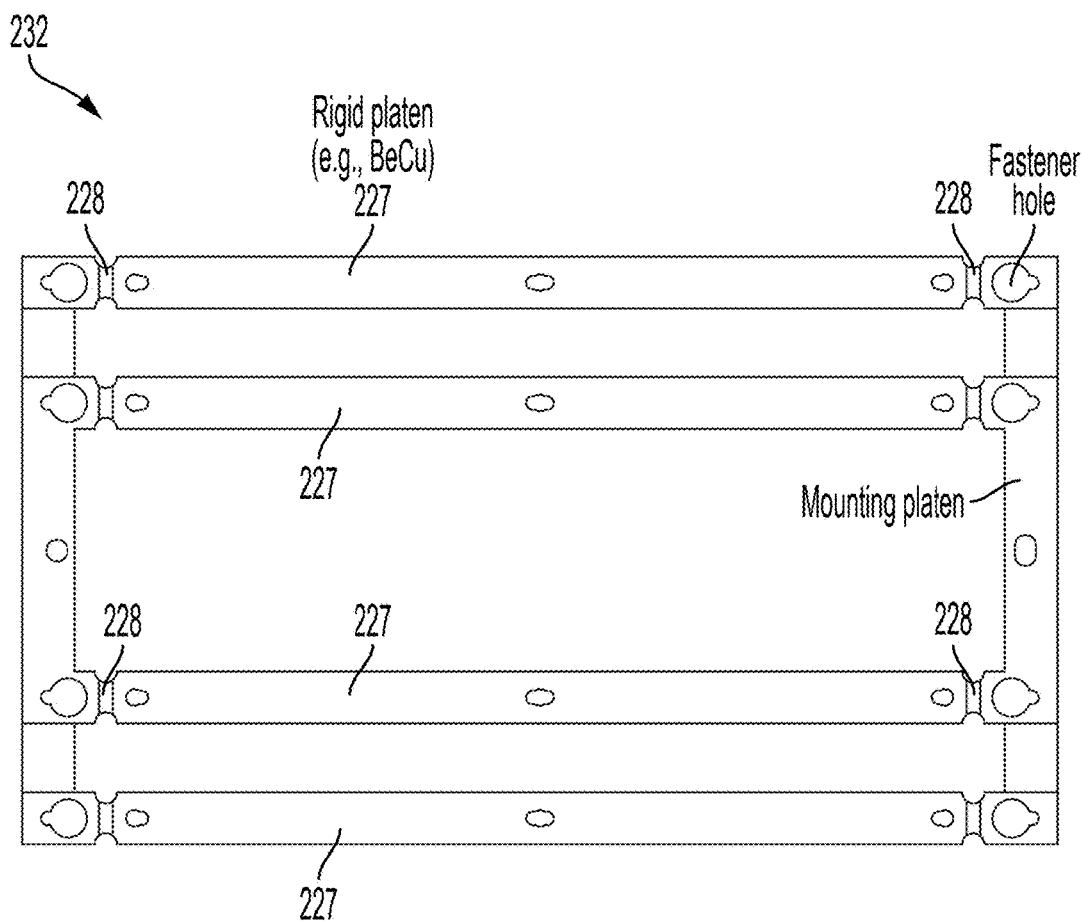
(B)
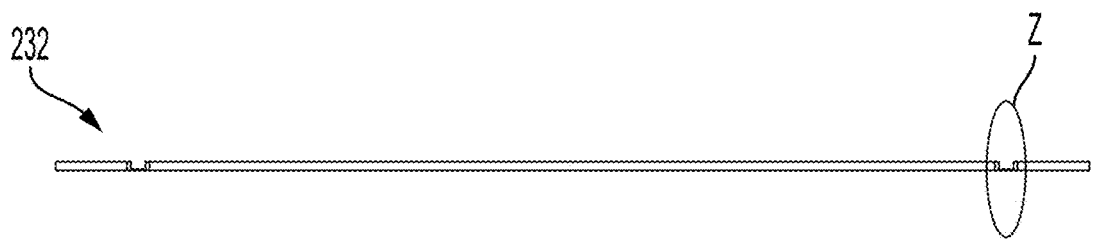
(C)
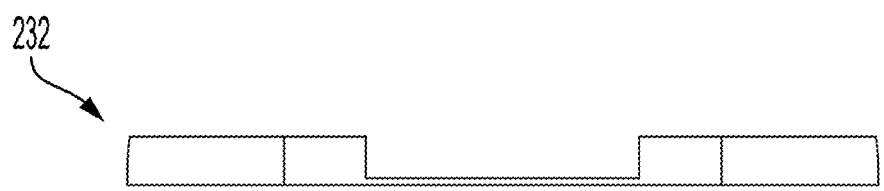
FIG. 24

| Requirement | Value | Unit |
|---|---|---|
| Coil travel in velocity mode | ±30 | mm |
| Stiffness[1] | ≤0.01 | N m-1 |
| Linear guiding of coil | - | - |
| Guiding imperfection of coil | ≤10 | μm |
| Hysteretic force | ≤0.1 | μg |
| Carrying capacity | ≈15 | kg |
| Installation space[2] | ≤500 | mm |

[1] The stiffness should be constant along the travel in the velocity mode, and over time. It should not change with, e.g, temperature fluctuation.

[2] This indicates the maximum horizontal dimension.

FIG. 30

DUAL-TRUNCATED WHEEL KIBBLE BALANCE AND DETERMINING ABSOLUTE MASS

CROSS REFERENCE TO RELATED APPLICATIONS

This application claims the benefit of U.S. Provisional Patent Application Ser. No. 63/352,006 (filed Jun. 14, 2022), which is herein incorporated by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in this invention.

BRIEF DESCRIPTION

Disclosed is a dual-truncated wheel Kibble balance for determining absolute mass, the dual-truncated wheel Kibble balance comprising: a stationary frame that provides a stationary point of attachment: for displacement motion of a measurement mass arm and a reference force arm relative to the stationary frame, and for pivotal motion of a double balance wheel relative to the stationary frame; the double balance wheel in mechanical communication with the stationary frame at the stationary point of attachment to the stationary frame and that pivots about the stationary point of attachment to the stationary frame, such that the double balance wheel is suspended from the stationary frame by a central flexural bridge that is mechanically interposed between the double balance wheel and the stationary frame, so that the double balance wheel pivotally moves via the central flexural bridge to restore mass balance between the measurement mass arm and the reference force arm, the double balance wheel comprising: a lever bar disposed on and opposing the stationary frame and in pivotal communication with the stationary frame via the central flexural bridge; an outer truncated wheel disposed on the lever bar at an outer wheel radius and comprising: a first outer wheel head and a second outer wheel head, such that each outer wheel head comprises an outer peripheral radial surface arranged at the outer wheel radius; an inner truncated wheel disposed on the lever bar at an inner wheel radius and comprising: a first inner wheel head and a second inner wheel head, such that each inner wheel head comprises an inner peripheral radial surface arranged at the inner wheel radius, and the inner truncated wheel is circumscribed by the outer truncated wheel with the outer wheel radius greater than the inner wheel radius; the central flexural bridge in mechanical communication with the stationary frame and the double balance wheel, such that the central flexural bridge is: interposed between the stationary frame and the double balance wheel, interconnects the stationary frame and the double balance wheel, and flexes in response to pivotal motion of the double balance wheel relative to the stationary frame; a first outer connector band disposed on the first outer wheel head at the outer peripheral radial surface, such that the first outer connector band is gravitationally suspended from the first outer wheel head and mechanically interconnects the first outer wheel head and a first guide member to synchronize the rotation of the outer truncated wheel and vertical linear motion of the first guide member and constrains motion of the first outer wheel head and the first guide member to one degree of freedom; a second outer connector band disposed on the second outer wheel head at the outer peripheral radial surface, such that the second outer connector band is gravitationally suspended from the second outer wheel head and mechanically interconnects the second outer wheel head and a second guide member to synchronize the rotation of the outer truncated wheel and vertical linear motion of the second guide member and constrains motion of the second outer wheel head and the second guide member to one degree of freedom; a first inner connector band disposed on the first inner wheel head at the inner peripheral radial surface, such that the first inner connector band is gravitationally suspended from the first inner wheel head and mechanically interconnects the first inner wheel head and the first guide member to synchronize the rotation of the inner truncated wheel and vertical linear motion of the first guide member and constrains motion of the first inner wheel head and the first guide member to one degree of freedom; a second inner connector band disposed on the second inner wheel head at the inner peripheral radial surface, such that the second inner connector band is gravitationally suspended from the second inner wheel head and mechanically interconnects the second inner wheel head and the second guide member to synchronize the rotation of the inner truncated wheel and vertical linear motion of the second guide member and constrains motion of the second inner wheel head and the second guide member to one degree of freedom; the first guide member in mechanical communication with the first outer wheel head and the first inner wheel head; and the second guide member in mechanical communication with the second outer wheel head and the second inner wheel head.

Disclosed is a dual-truncated wheel Kibble balance for determining absolute mass, the dual-truncated wheel Kibble balance comprising: a stationary frame; a double balance wheel disposed on the stationary frame; a pair of guide members, such that one of the guide members is disposed on each opposing end of the double balance wheel; a plurality of outer connector bands, such that each guide member is gravitationally suspended from the double balance wheel by at least one of the outer connector bands; a plurality of inner connector bands, such that each guide member is gravitationally suspended from the double balance wheel by at least one of the inner connector bands; and a central flexural bridge in mechanical communication with the stationary frame and the double balance wheel, such that the central flexural bridge is: interposed between the stationary frame and the double balance wheel, interconnects the stationary frame and the double balance wheel, and flexes in response to pivotal motion of the double balance wheel relative to the stationary frame.

Disclosed is a process for determining absolute mass, the process comprising: providing a dual-truncated wheel Kibble balance comprising: a stationary frame; a double balance wheel disposed on the stationary frame; a pair of guide members, such that one of the guide members is disposed on each opposing end of the double balance wheel; a plurality of outer connector bands, such that each guide member is gravitationally suspended from the double balance wheel by at least one of the outer connector bands; a plurality of inner connector bands, such that each guide member is gravitationally suspended from the double balance wheel by at least one of the inner connector bands; and a central flexural bridge in mechanical communication with the stationary frame and the double balance wheel, such that the central flexural bridge is: interposed between the stationary frame and the double balance wheel, interconnects the stationary frame and the double balance wheel, and flexes in response to pivotal motion of the double balance wheel relative to the stationary frame a measurement mass arm mechanically coupled to the stationary frame via the double balance wheel, the central flexural bridge, and at least one of the guide members; a reference force arm mechanically coupled to the stationary frame via the double balance wheel, the central flexural bridge, and at least one of the guide members; oscillating, by a coil of the measurement mass arm, the double balance wheel relative to the stationary frame to produce oscillatory linear displacements of the measurement mass arm; calibrating the coil as a function of the oscillatory linear displacements of the measurement mass arm; determining a BL product of the coil after calibrating; receiving a mass on a mass pan disposed on the measurement mass arm; measuring a first change in voltage required by the coil to maintain the position of the measurement mass arm in absence of pivotal motion of the lever bar relative to the stationary frame with the mass disposed on the mass pan; removing the mass from the mass pan; measuring a second change in voltage required by the to maintain the position of the measurement mass arm in absence of pivotal motion of the lever bar relative to the stationary frame without the mass disposed on the mass pan; and calculating the absolute mass of the mass from the first change in voltage, the second change in voltage, and the BL product.

BRIEF DESCRIPTION OF THE DRAWINGS

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

FIG. 3 shows, according to some embodiments, a perspective view and front view of a dual-truncated wheel Kibble balance 200.

FIG. 9 shows, according to some embodiments, a perspective view and front view of the dual-truncated wheel Kibble balance shown in FIG. 3 with the both stationary frames 201 removed.

FIG. 12 shows, according to some embodiments, a perspective view and front view of elements of a double balance wheel 203 connected to guide members 205 in relation to central flexural bridge 202.

FIG. 13 shows, according to some embodiments, a plan view, side view, and bottom view of the elements of a double balance wheel 203 connected to guide members 205 in relation to the central flexural bridge 202 shown in FIG. 12.

FIG. 20 shows, according to some embodiments: (A) a perspective view of the guide member 205, and (B) a different perspective view of the guide member 205.

FIG. 24 shows, according to some embodiments, shows a lateral connector 227.

FIG. 30 shows, according to some embodiments, requirements to the mechanism in the Kibble balance of the QEMMS.

DETAILED DESCRIPTION

Figure 1:
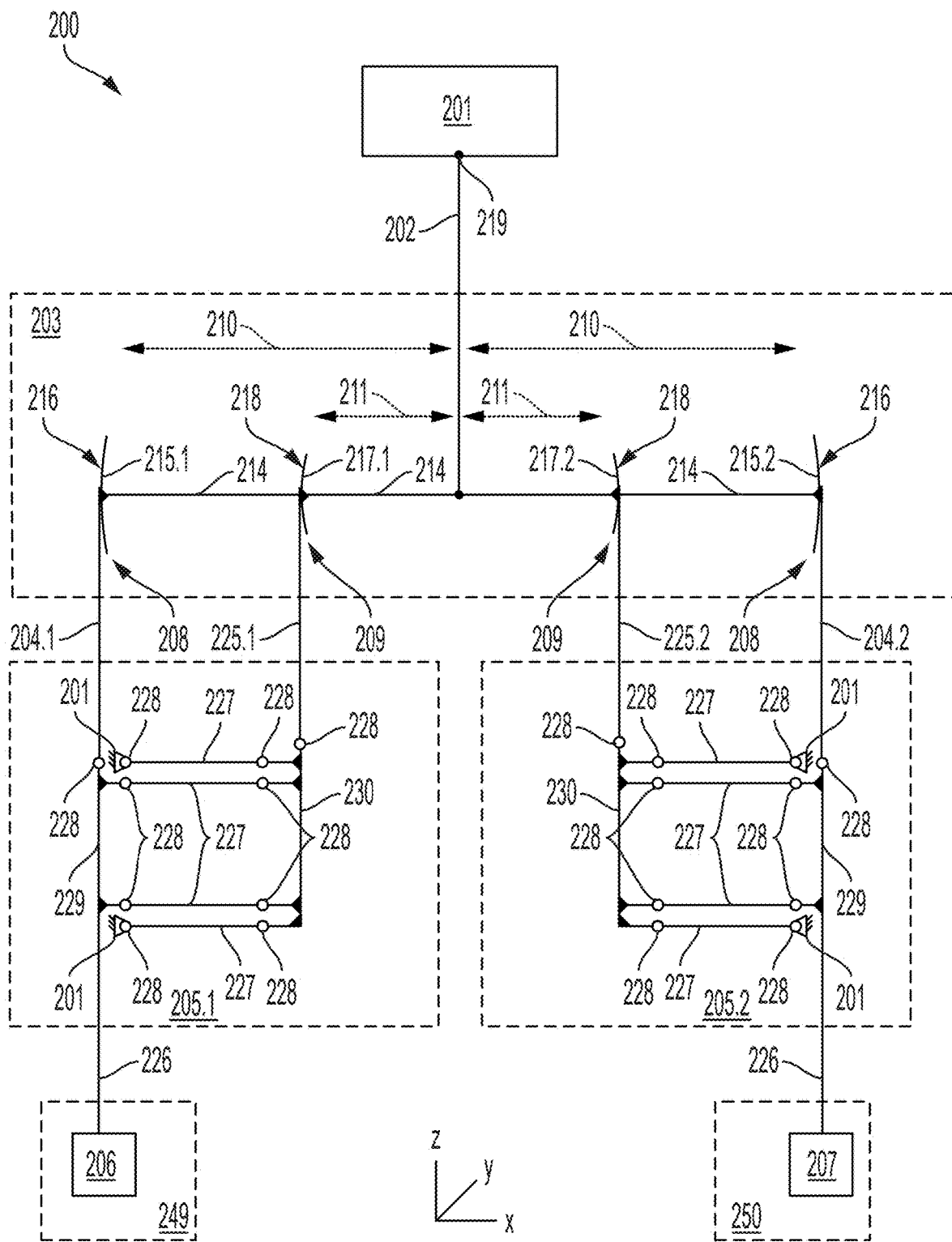
FIG. 1 shows, according to some embodiments, a dual-truncated wheel Kibble balance 200.
Figure 2:
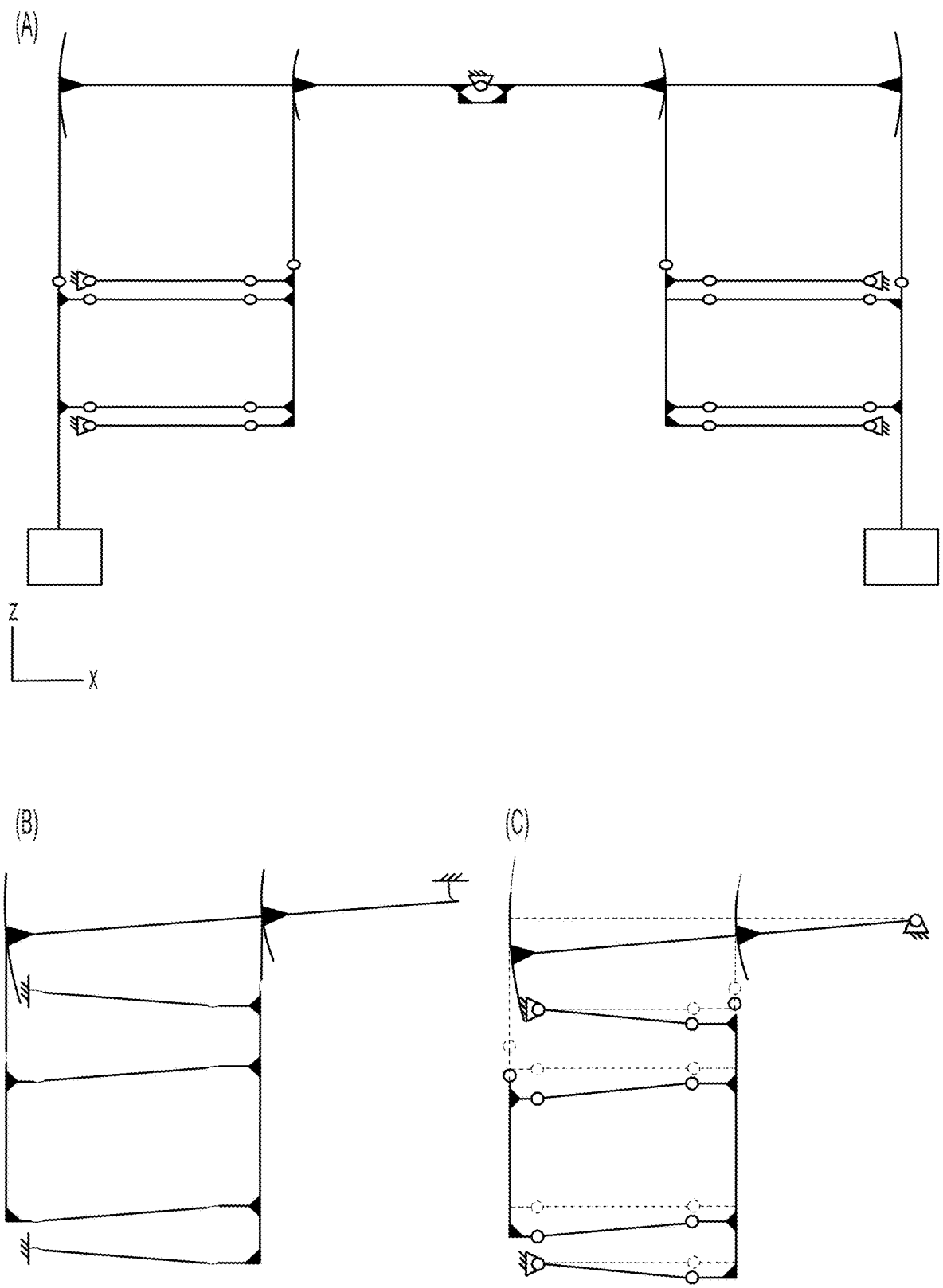
FIG. 2 shows, according to some embodiments: (A) the dual-truncated wheel Kibble balance 200 in FIG. 1 with a double balance wheel 203 in a non-rotated position, (B) downward rotation of a left portion of a double balance wheel 203 of the dual-truncated wheel Kibble balance 200, and (C) the view in panel B superimposed on the non-rotated position in panel A.
Figure 4:
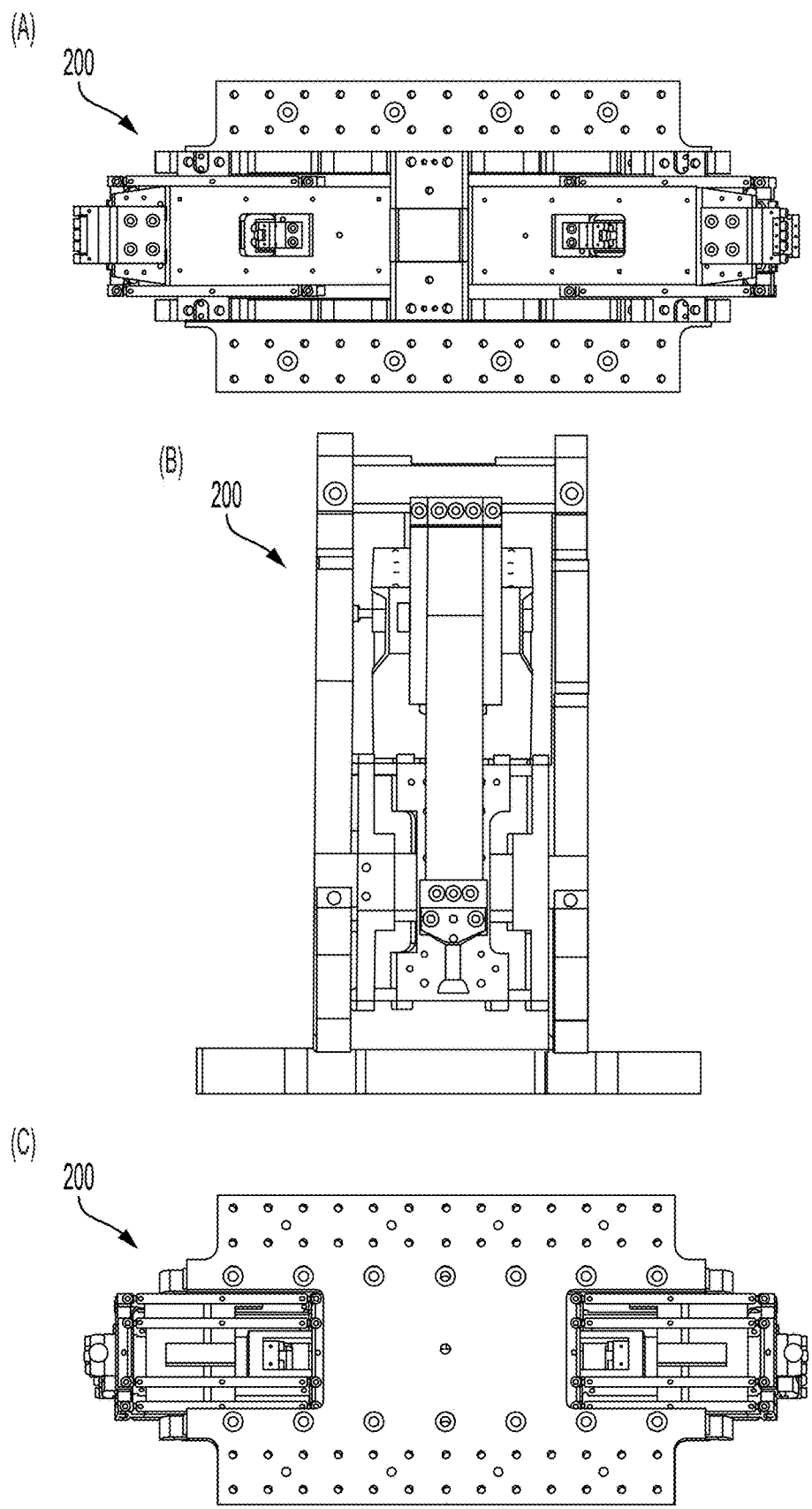
FIG. 4 shows, according to some embodiments, a plan view, side view, and bottom view of the dual-truncated wheel Kibble balance shown in FIG. 3.
Figure 5:
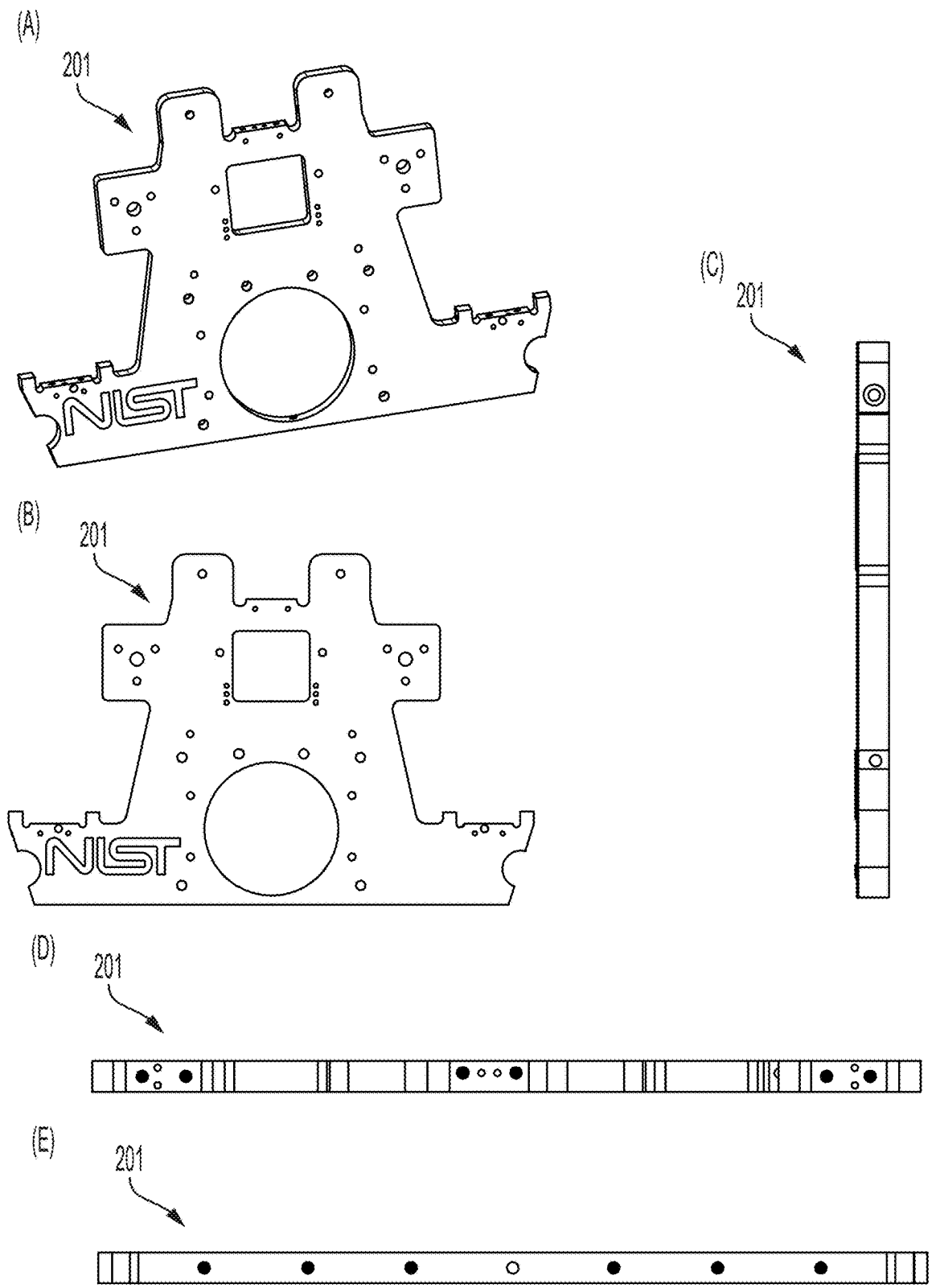
FIG. 5 shows, according to some embodiments, a perspective view, front view, a plan view, side view, and bottom view of a stationary frame 201 for the dual-truncated wheel Kibble balance shown in FIG. 3.
Figure 6:
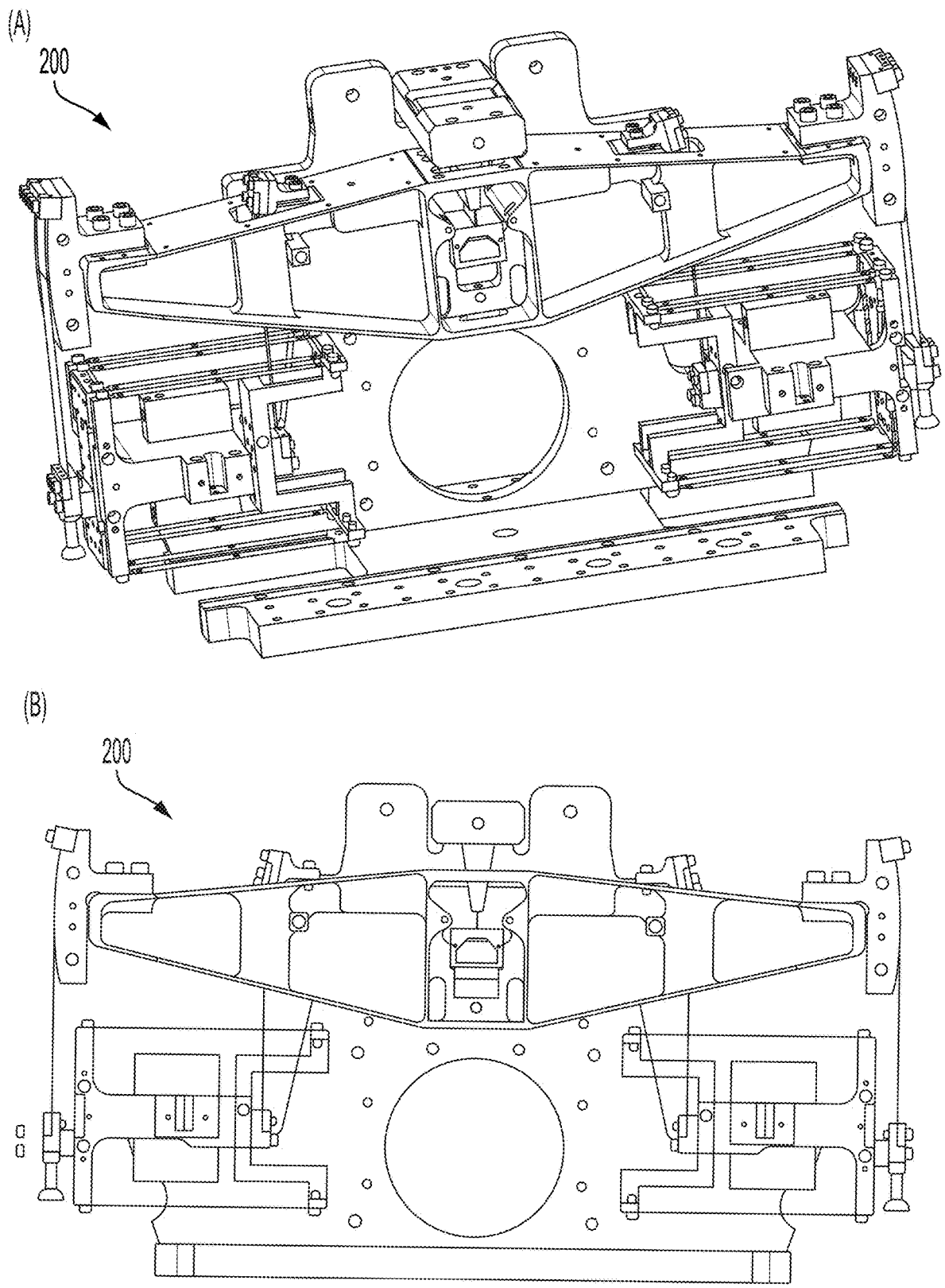
FIG. 6 shows, according to some embodiments, a perspective view and front view of the dual-truncated wheel Kibble balance shown in FIG. 3 with the front-most stationary frame 201 removed.
Figure 7:
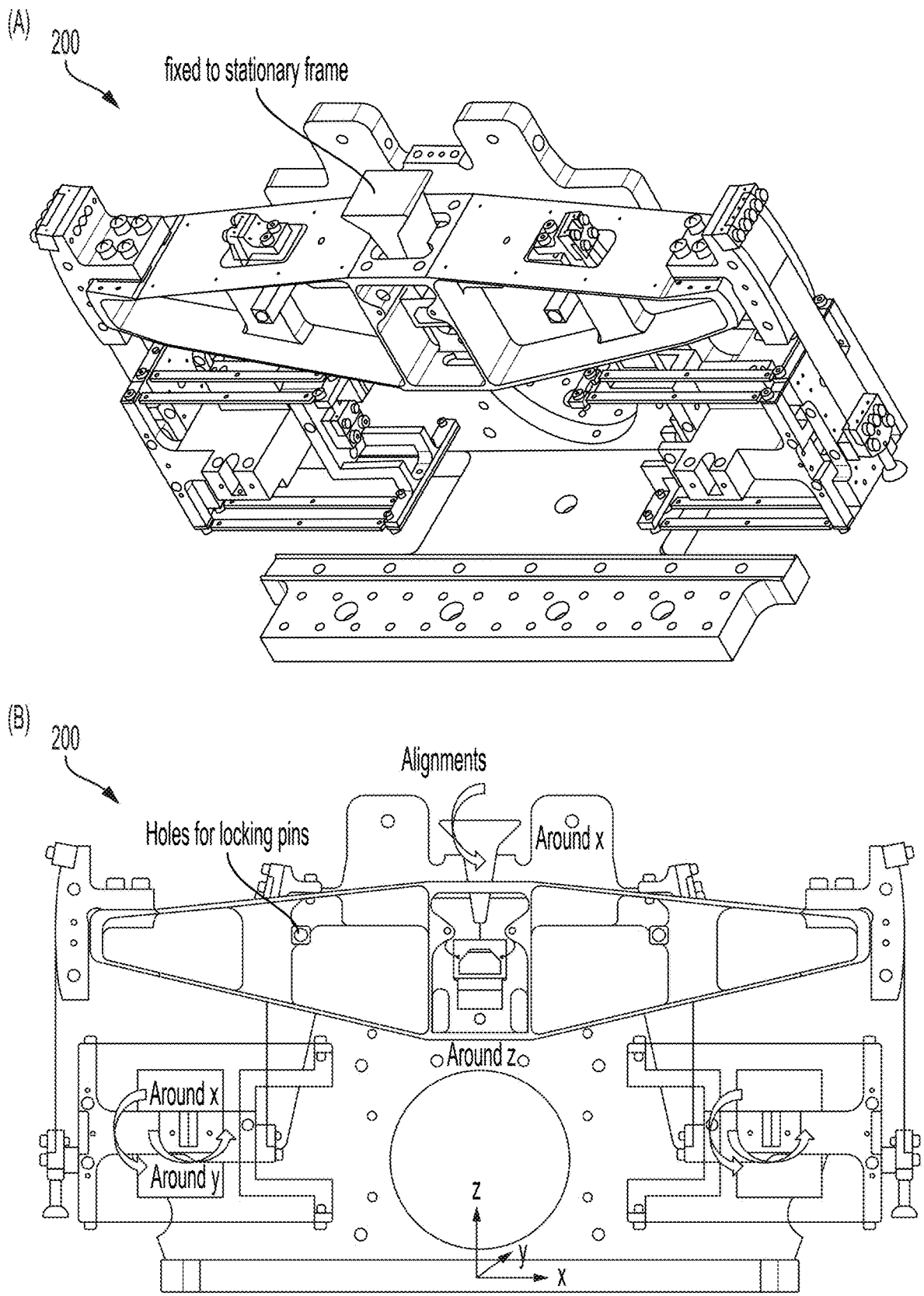
FIG. 7 shows, according to some embodiments, a perspective view and front view of the dual-truncated wheel Kibble balance shown in FIG. 3 with the front-most stationary frame 201 removed and indicating various positions of alignment for operating the dual-truncated wheel Kibble balance 200.
Figure 8:
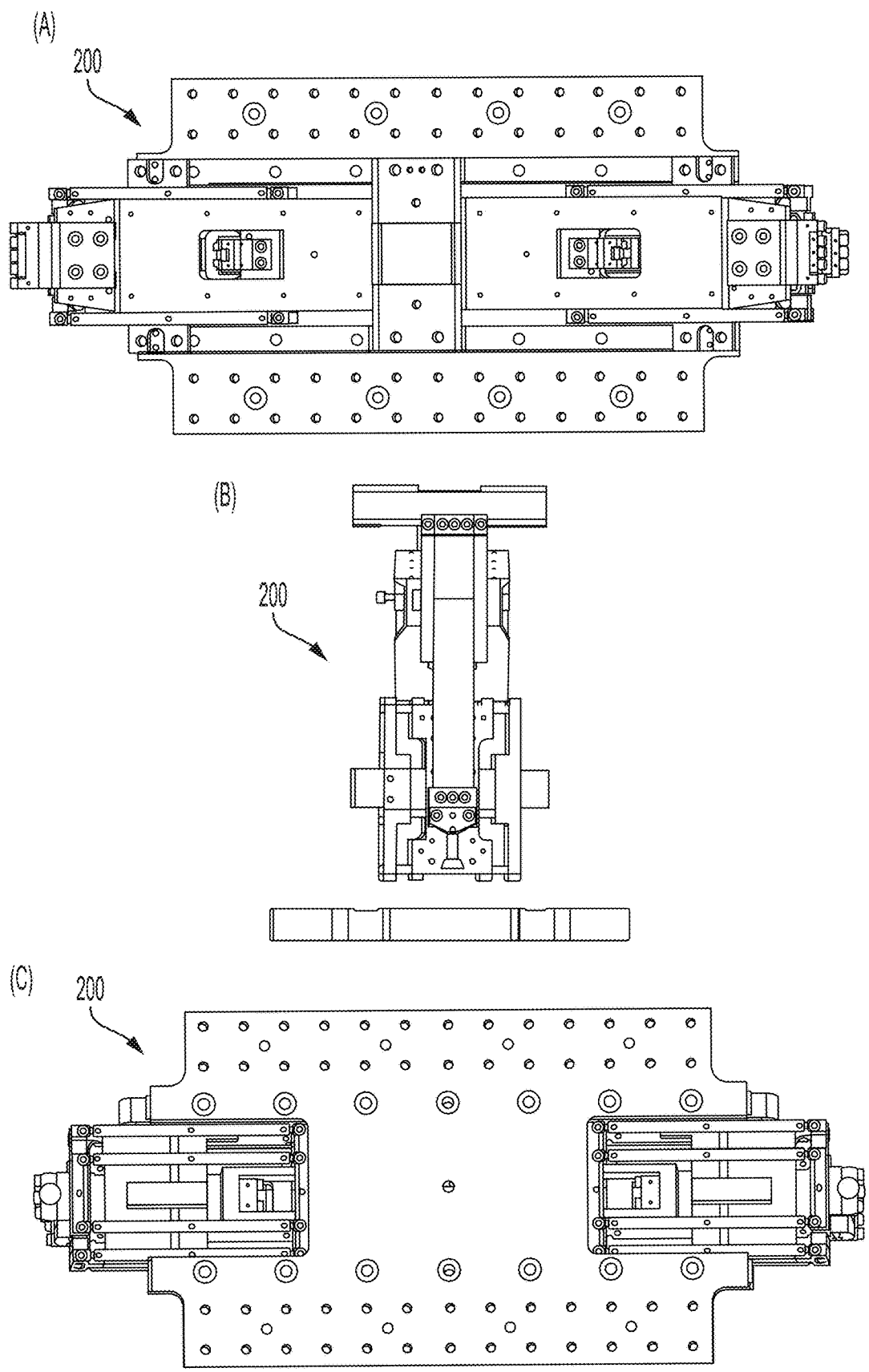
FIG. 8 shows, according to some embodiments, a plan view, side view, and bottom view of the dual-truncated wheel Kibble balance shown in FIG. 6.
Figure 10:
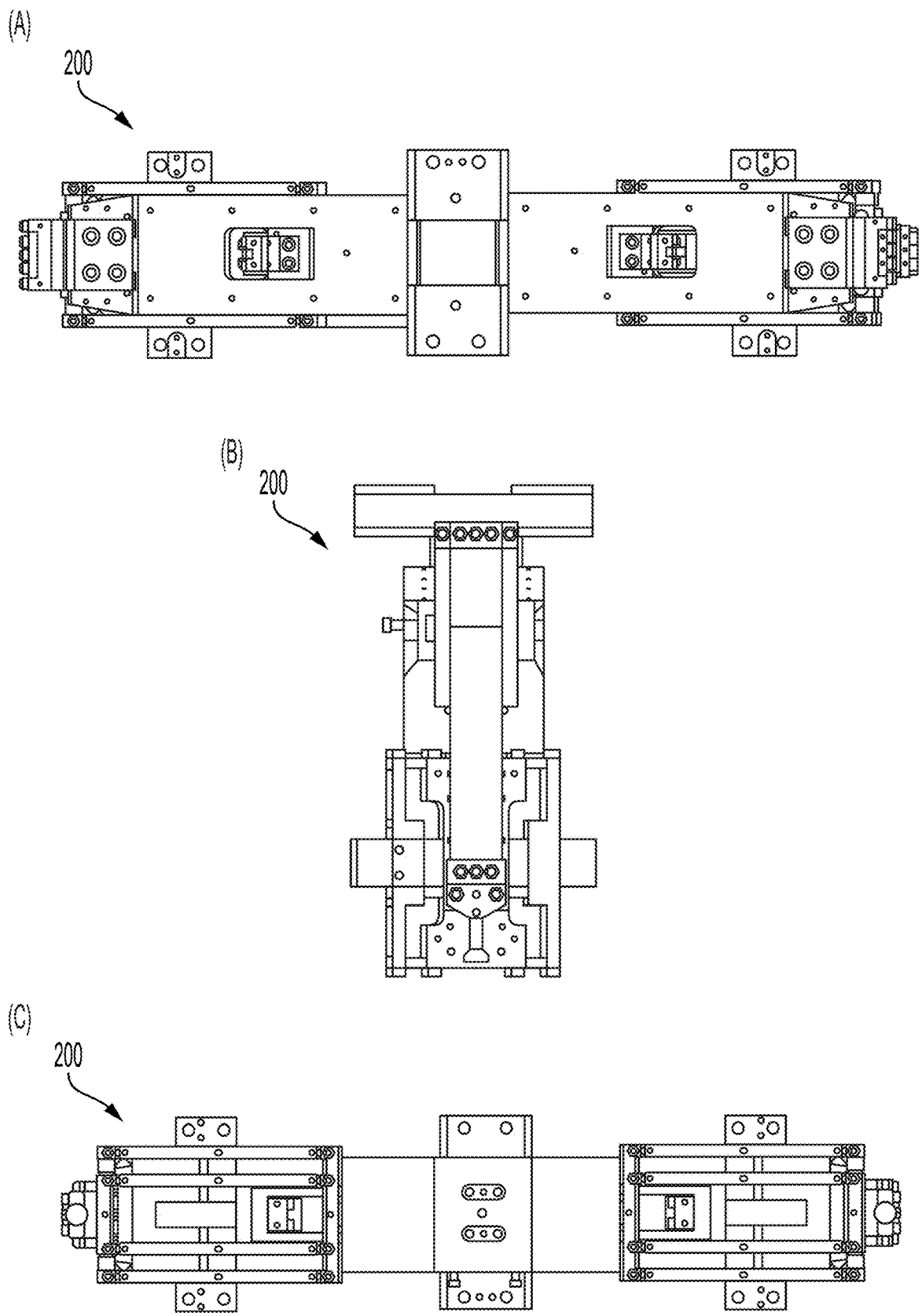
FIG. 10 shows, according to some embodiments, a plan view, side view, and bottom view of the dual-truncated wheel Kibble balance shown in FIG. 3 with the both stationary frames 201 removed.
Figure 11:
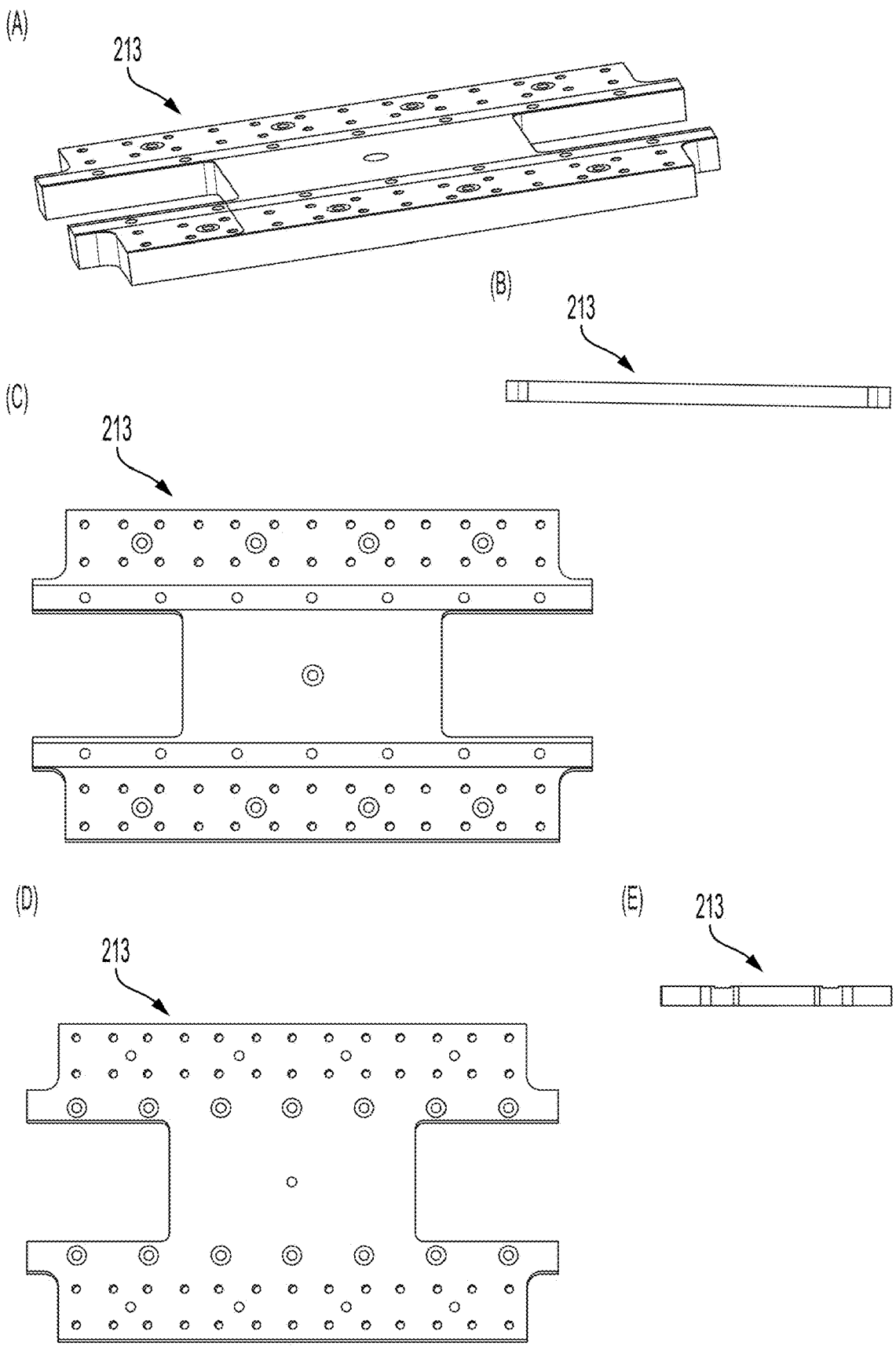
FIG. 11 shows, according to some embodiments, a perspective view, front view, a plan view, side view, and bottom view of a base plate for the stationary frame 201 for the dual-truncated wheel Kibble balance shown in FIG. 3.
Figure 14:
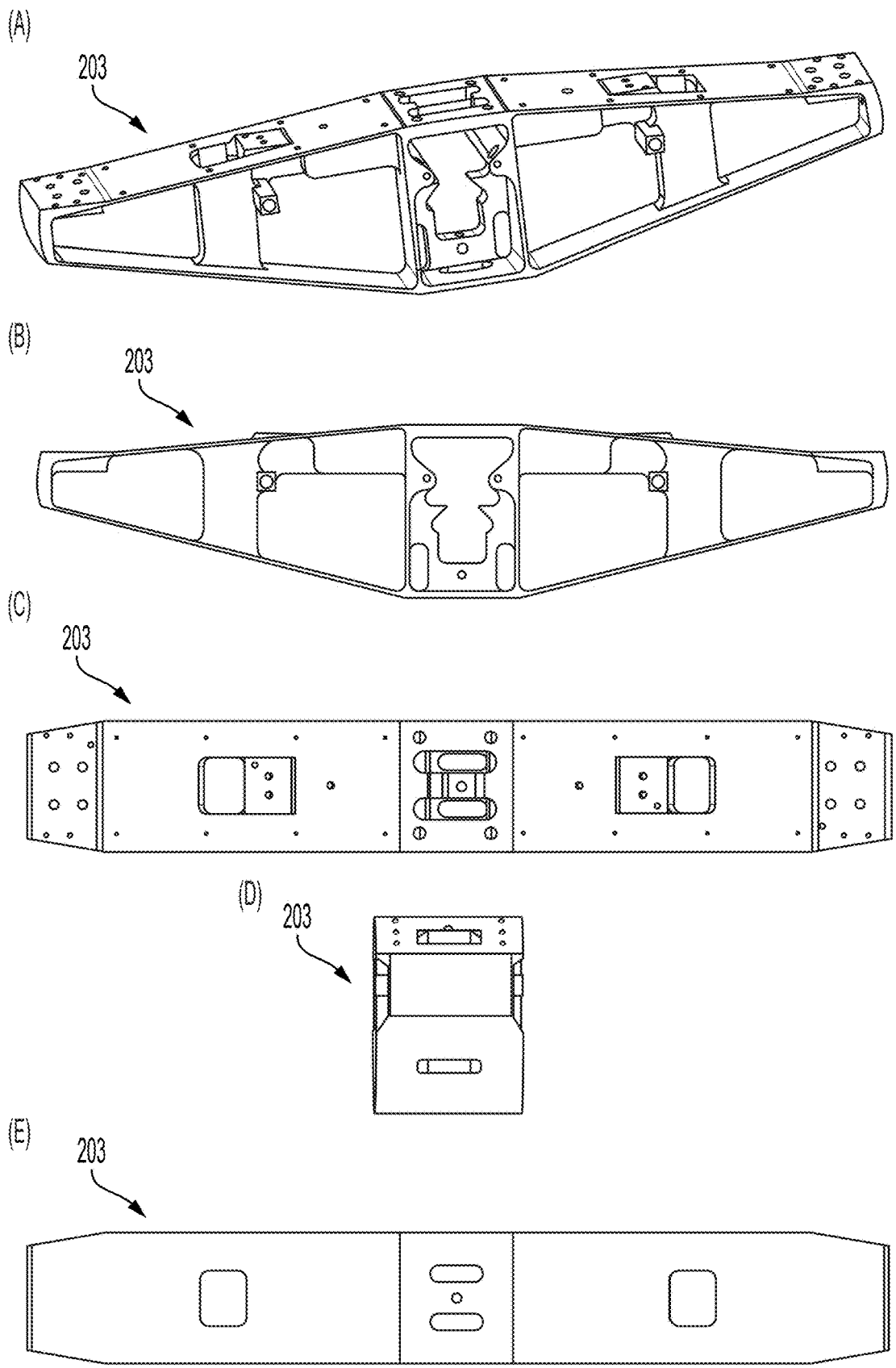
FIG. 14 shows, according to some embodiments, a perspective view, front view, a plan view, side view, and bottom view of a base plate for the double balance wheel 203 of the dual-truncated wheel Kibble balance shown in FIG. 3.
Figure 15:
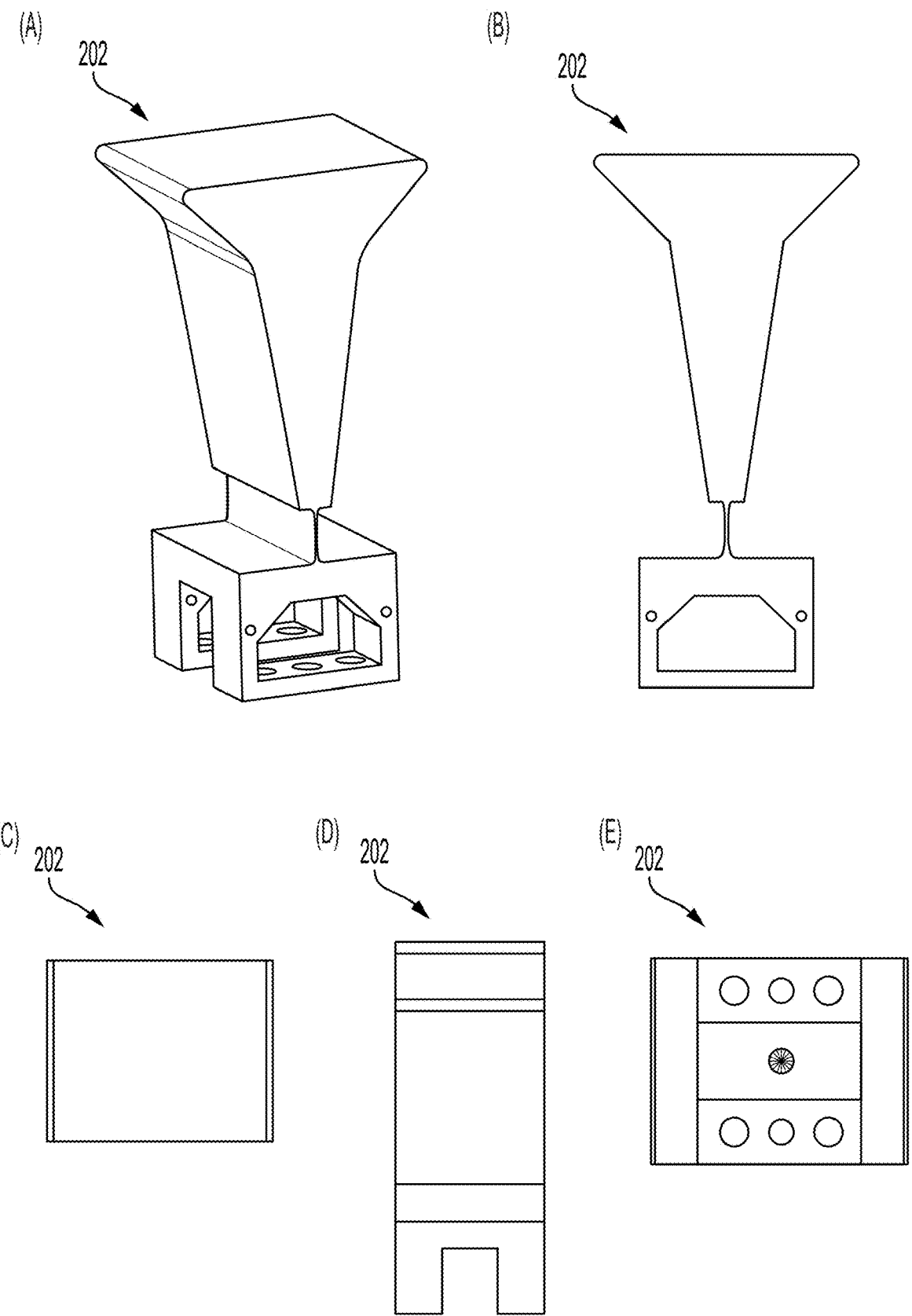
FIG. 15 shows, according to some embodiments, a perspective view, front view, a plan view, side view, and bottom view of a base plate for the central flexural bridge 202 of the dual-truncated wheel Kibble balance shown in FIG. 3.
Figure 16:
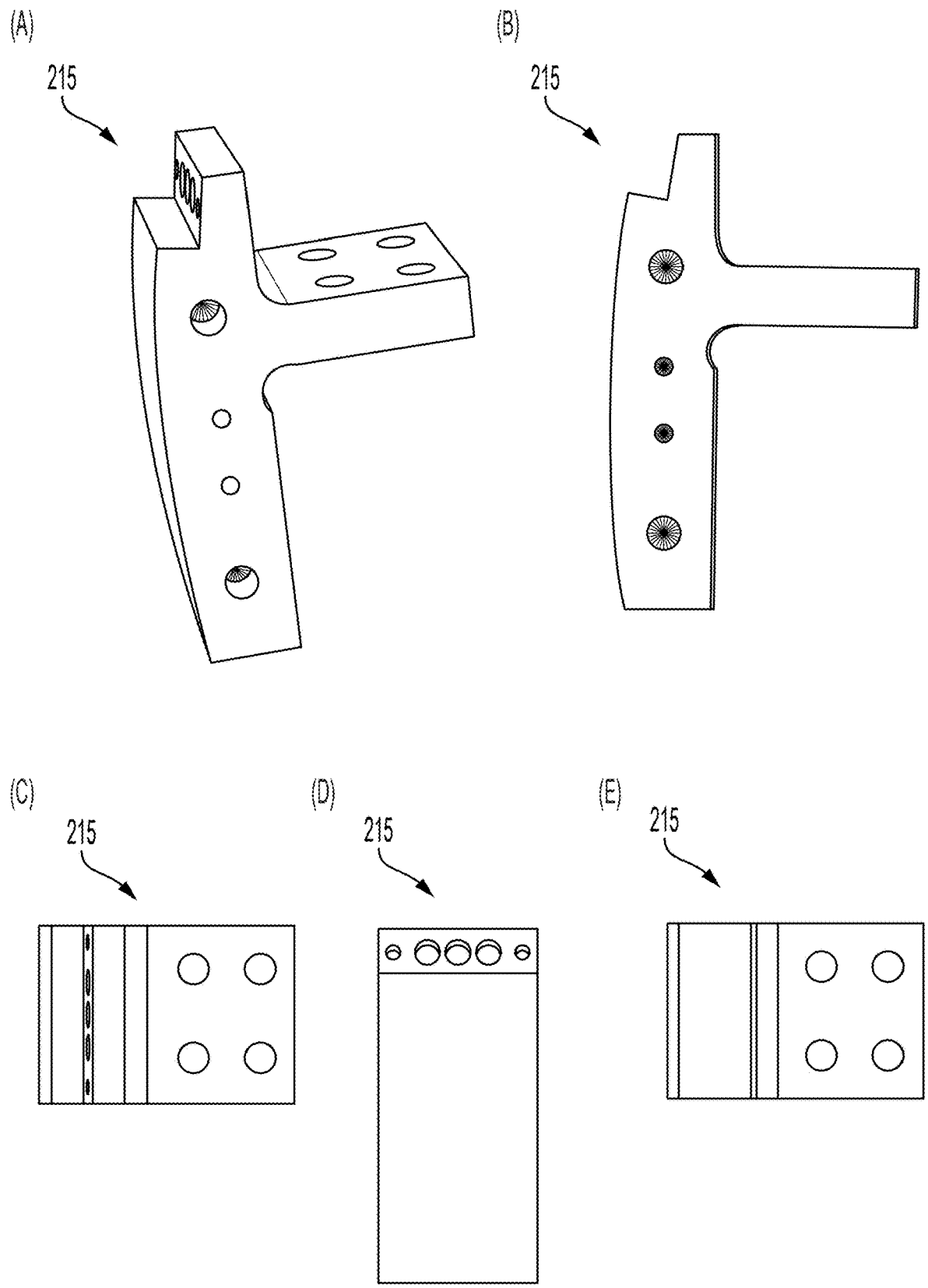
FIG. 16 shows, according to some embodiments, a perspective view, front view, a plan view, side view, and bottom view of a base plate for the outer wheel head 215 of the dual-truncated wheel Kibble balance shown in FIG. 3.
Figure 17:
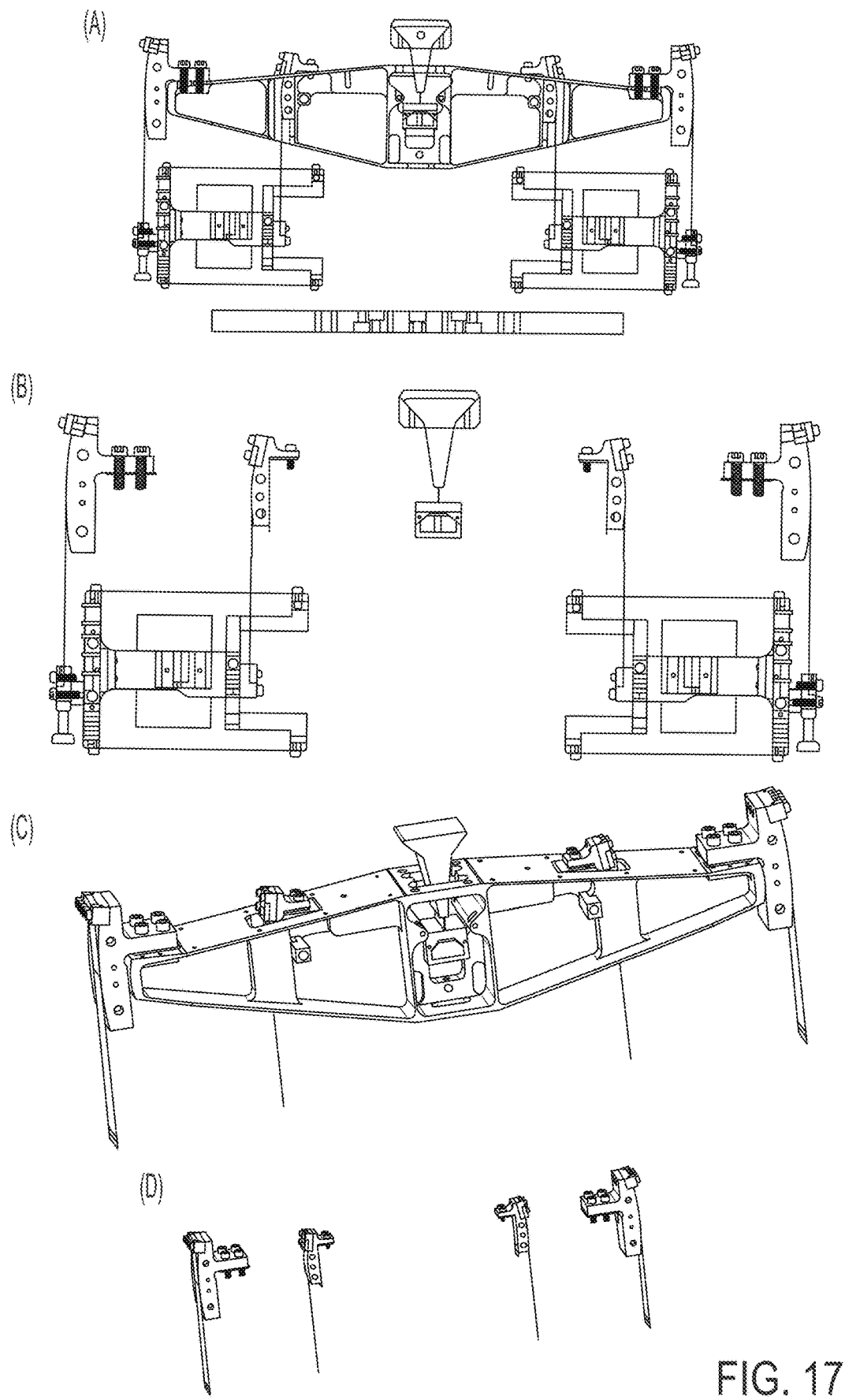
FIG. 17 shows, according to some embodiments: (A) a front view of various elements of the dual-truncated wheel Kibble balance 200 with the stationary frame 201 removed, (B) elements as in panel with the lever bar 214 of the double balance wheel 203 removed, (C) the double balance wheel 203 with outer connector band 204 and inner connector band 225, and (D) outer connector band 204 suspended from outer wheel head 215 and inner connector band 225 connected to inner wheel head 217.
Figure 18:
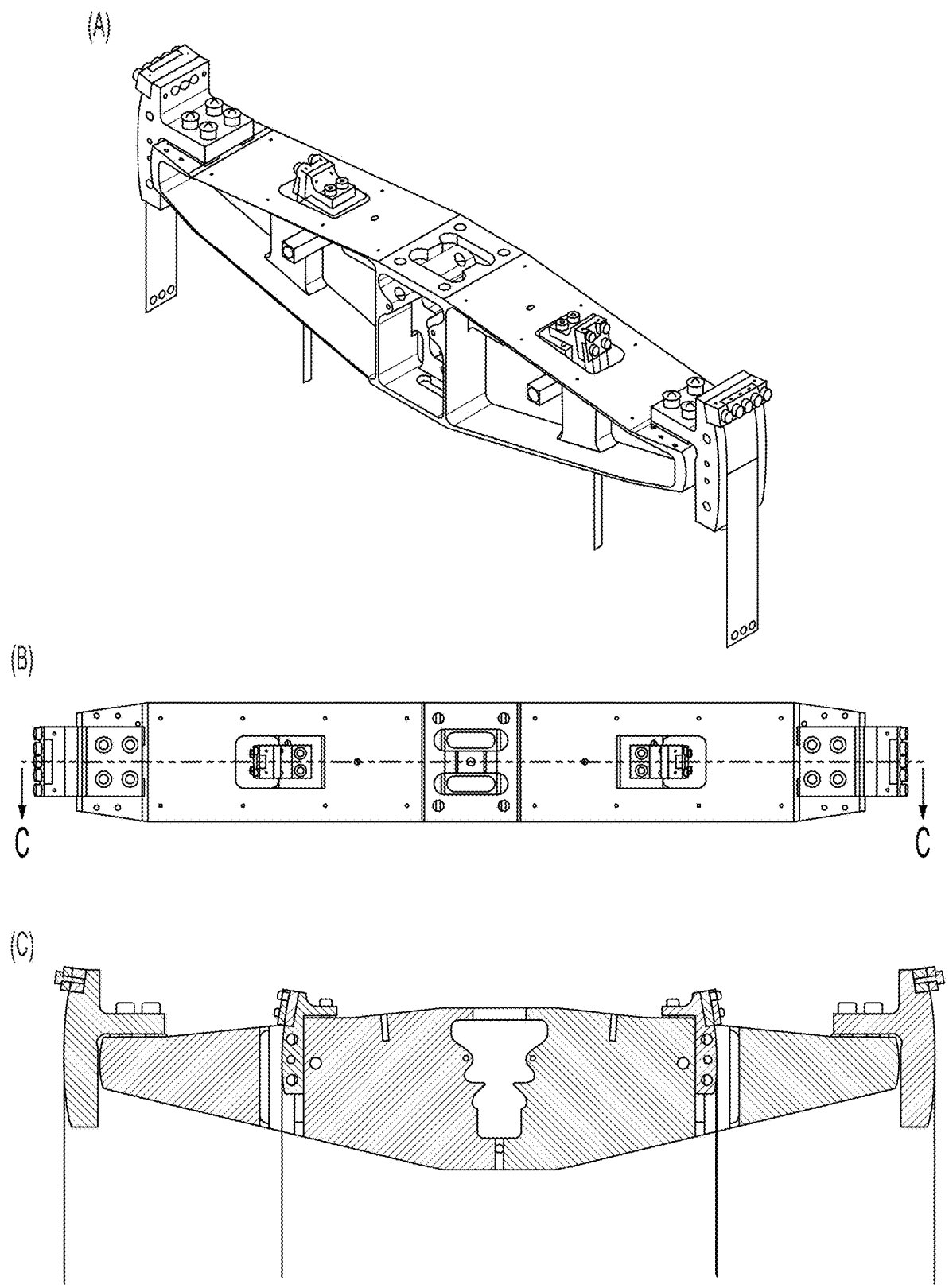
FIG. 18 shows, according to some embodiments: (A) a perspective view of the double balance wheel 203 with outer connector band 204 suspended from outer wheel head 215 and inner connector band 225 connected to inner wheel head 217, (B) a plan view of the double balance wheel 203, and (C) a cross-section along line A-A shown in panel B.
Figure 19:
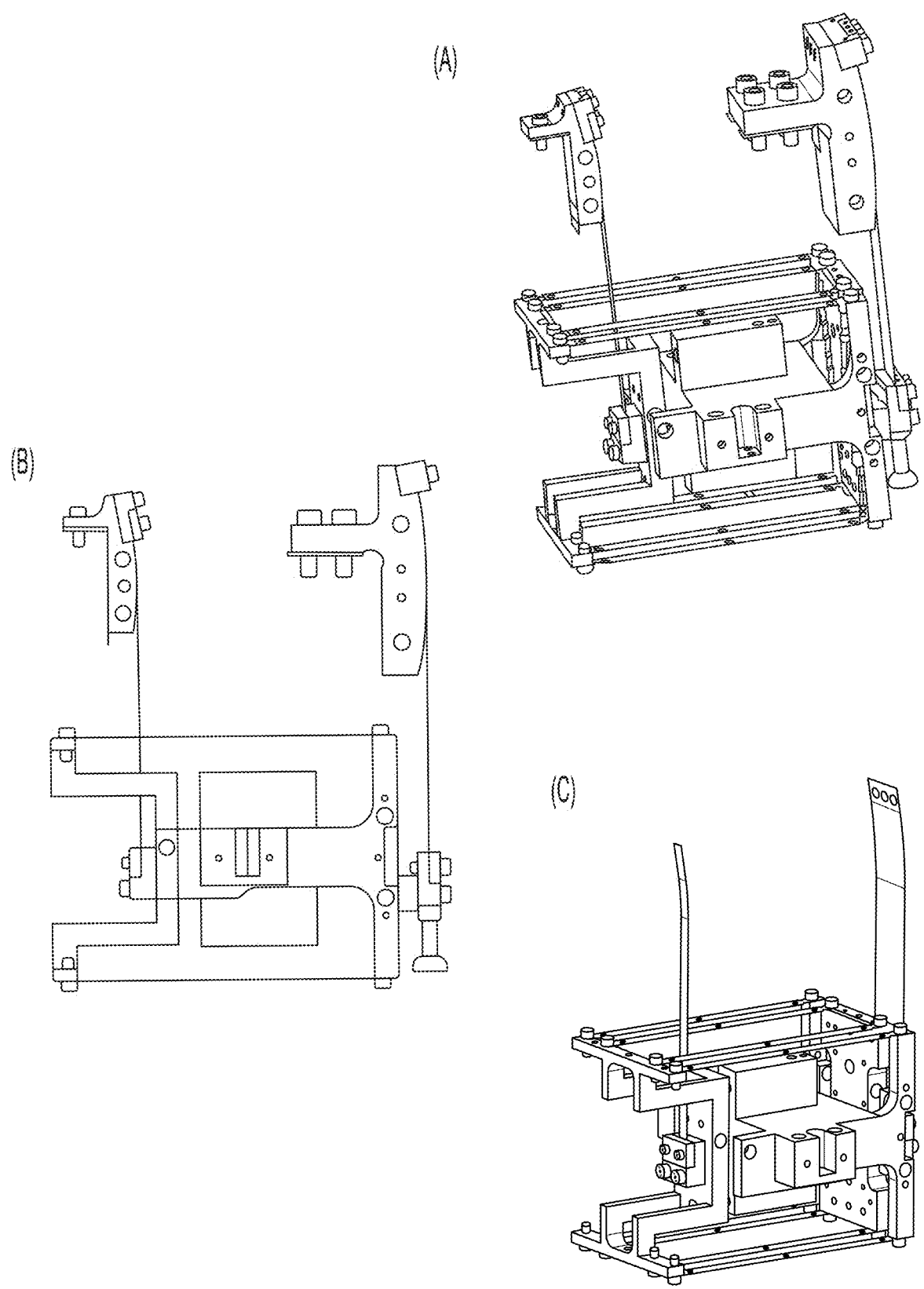
FIG. 19 shows, according to some embodiments: (A) a perspective view of the guide member 205 suspended by outer connector band 204 from outer wheel head 215 and suspended by inner connector band 225 from inner wheel head 217, (B) a side view of that shown in panel A, and (C) a perspective view with outer wheel head 215 and inner wheel head 217 absent.
Figure 21:
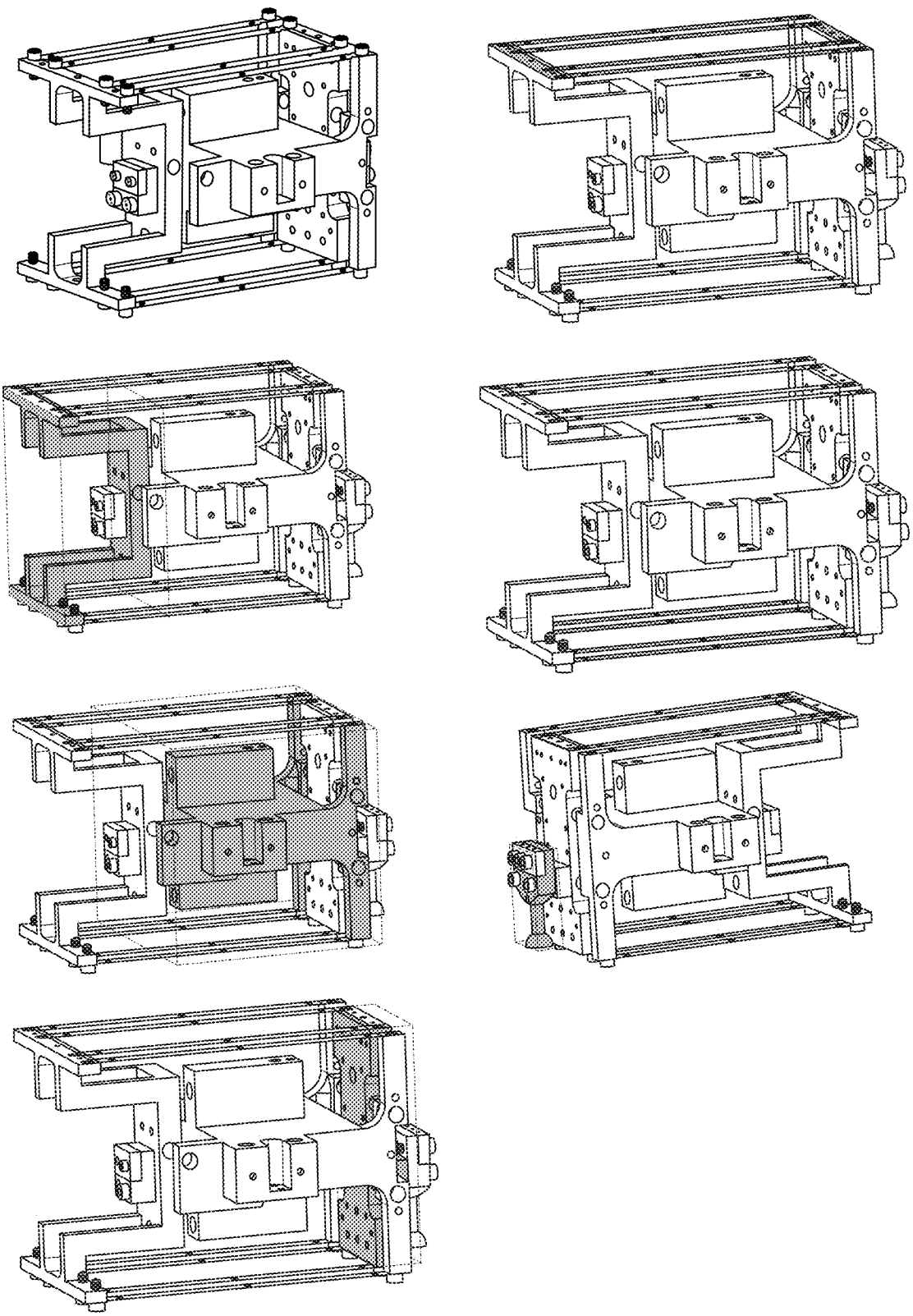
FIG. 21 shows, according to some embodiments, perspective views of guide member 205.
Figure 22:
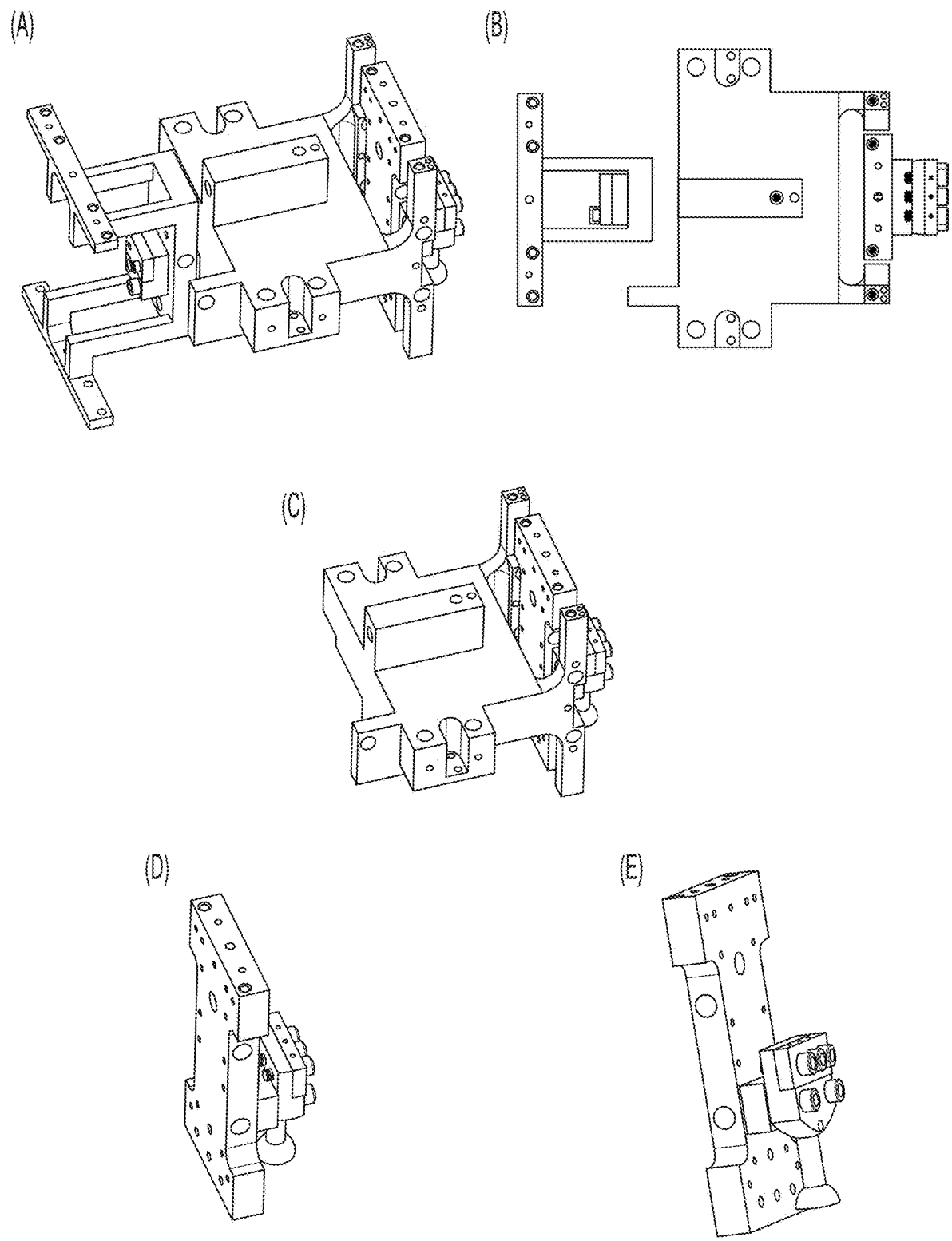
FIG. 22 shows, according to some embodiments, shows elements of guide member 205.
Figure 23:
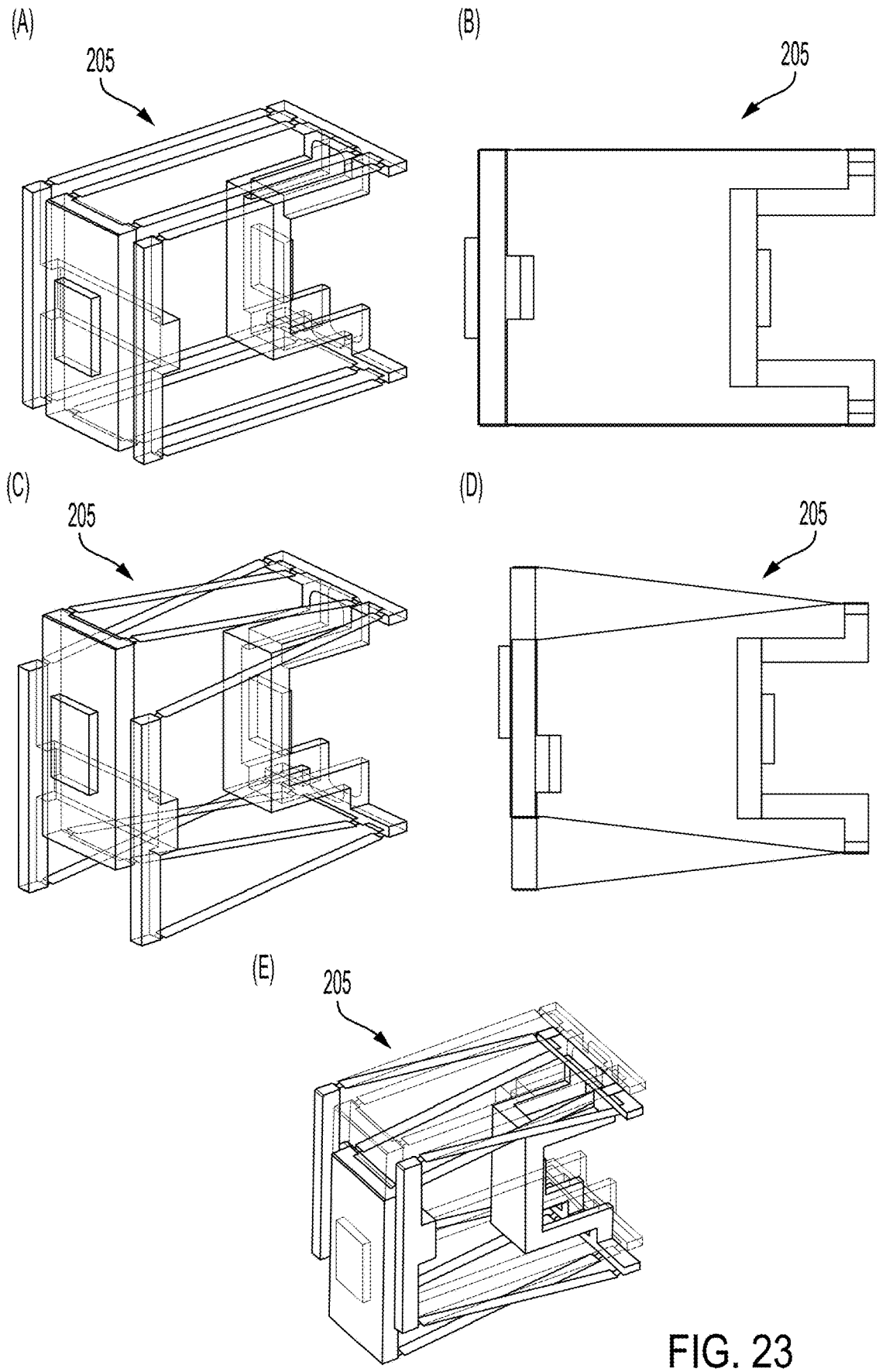
FIG. 23 shows, according to some embodiments, shows perspective and side views of guide member 205 in a neutral position and a deflected position.

A detailed description of one or more embodiments is presented herein by way of exemplification and not limitation.

Certain balances for mass calibration involve one mode of operation, the weighing phase where an artifact is compared to a known force in a defined null position. Kibble balances involve two modes of operation, the weighing phase similar to the one in normal balances and a moving phase, where the Kibble balance performs large excitations up to a few tens of millimeters. A functional advantage of the Kibble balance is that the operating principle allows absolute realization of mass or force, and a Kibble balance can be used as a primary realization for mass in the International System of Units (SI), wherein traditional balances or mass comparators give readouts relative to a known standard. With this added mode of operation, referred to as a moving mode, additional requirements are involved in balance mechanics for Kibble balances. Balance mechanisms in mass comparators can be designed based on flexure pivot mechanisms that can be sensitive and reproducible but may not allow for a lot of deflection. In conventional Kibble balances, knife edge pivots were used instead of flexures because of large travel involved and a large combined mass of suspended components, wherein the knife edge pivot has considerable hysteresis, which introduces a measurement error. Dual-truncated wheel Kibble balance 200 described herein includes a plurality of flexures that constrain motion of double balance wheel 203 to a linear movement to overcome error motions and related measurement errors.

The National Institute of Standards and Technology (NIST), an agency of the United States Department of Commerce, is developing a quantum electro-mechanical metrology suite (QEMMS) that includes a graphene quantum Hall resistor, a programmable Josephson voltage system, and a Kibble balance. QEMMS provides primary standards in the International System of Units (SI) for the units of volt, ohm, ampere, meter, second, and mass directly with a single apparatus. Advantageously, dual-truncated wheel Kibble balance 200 provides a high-precision weighing mechanism and a highly linear coil trajectory in a magnet. dual-truncated wheel Kibble balance 200 Includes mechanical structure that produces a defined movement that can be applied as the weighing and moving structure for a Kibble balance. dual-truncated wheel Kibble balance 200, as a Kibble balance, is an article that defines the unit of mass in the International System of Units (SI), and dual-truncated wheel Kibble balance 200 can have two modes of operation. In a first mode of operation, double balance wheel 203 is held in a zero position by a magnetic actuator. In an second mode of operation, double balance wheel 203 is deflected with a travel range on the order of plus/minus tens of millimeters. The first mode of operation involves maintaining mechanical nonlinearities from dissipative effects (referred to as hysteresis) to be below a force equivalent to a mass of 0.2 µg. The second mode of operation involves a precise, purely vertical motion. The precision for motion can be quantified as a sub-micron level over the travel range. Furthermore, dual-truncated wheel Kibble balance 200 can suspend a combined mass of over 15 kg, wherein double balance wheel 203 provides a high-precision balancing and moving stage so that dual-truncated wheel Kibble balance 200 provides highly-precise weighing and vertical movement of components.

Dual-truncated wheel Kibble balance 200 determines absolute mass. In an embodiment, with reference to FIG. 1 to FIG. 26, dual-truncated wheel Kibble balance 200 includes: stationary frame 201; double balance wheel 203 disposed on stationary frame 201; a pair of guide members 205, such that one of guide members 205 is disposed on each opposing end of double balance wheel 203; a plurality of outer connector bands 204, such that each guide member 205 is gravitationally suspended from double balance wheel 203 by at least one of outer connector bands 204; a plurality of inner connector bands 225, such that each guide member 205 is gravitationally suspended from double balance wheel 203 by at least one of inner connector bands 225; and central flexural bridge 202 in mechanical communication with stationary frame 201 and double balance wheel 203, such that central flexural bridge 202 is: interposed between stationary frame 201 and double balance wheel 203, interconnects stationary frame 201 and double balance wheel 203, and flexes in response to pivotal motion of double balance wheel 203 relative to stationary frame 201.

In an embodiment, double balance wheel 203 includes: lever bar 214 disposed on and opposing stationary frame 201 and in pivotal communication with stationary frame 201 via central flexural bridge 202; outer truncated wheel 208 disposed on lever bar 214 at outer wheel radius 210 and including: first outer wheel head 215.1 and second outer wheel head 215.2, such that each outer wheel head 215 includes outer peripheral radial surface 216 arranged at outer wheel radius 210; and inner truncated wheel 209 disposed on lever bar 214 at inner wheel radius 211 and including: first inner wheel head 217.1 and second inner wheel head 217.2, such that each inner wheel head 217 includes inner peripheral radial surface 218 arranged at inner wheel radius 211, and inner truncated wheel 209 is circumscribed by outer truncated wheel 208 with outer wheel radius 210 greater than inner wheel radius 211.

In an embodiment, the plurality of outer connector bands 204 includes: first outer connector band 204.1 disposed on first outer wheel head 215.1 at outer peripheral radial surface 216, such that first outer connector band 204.1 is gravitationally suspended from first outer wheel head 215.1 and mechanically interconnects first outer wheel head 215.1 and first guide member 205.1 to synchronize the rotation of outer truncated wheel 208 and vertical linear motion of first guide member 205.1 and constrains motion of first outer wheel head 215.1 and first guide member 205.1 to one degree of freedom; and second outer connector band 204.2 disposed on second outer wheel head 215.2 at outer peripheral radial surface 216, such that second outer connector band 204.2 is gravitationally suspended from second outer wheel head 215.2 and mechanically interconnects second outer wheel head 215.2 and second guide member 205.2 to synchronize rotation of outer truncated wheel 208 and vertical linear motion of second guide member 205.2 and constrains motion of second outer wheel head 215.2 and second guide member 205.2 to one degree of freedom.

In an embodiment, the plurality of inner connector bands 225 includes: first inner connector band 225.1 disposed on first inner wheel head 217.1 at inner peripheral radial surface 218, such that first inner connector band 225.1 is gravitationally suspended from first inner wheel head 217.1 and mechanically interconnects first inner wheel head 217.1 and first guide member 205.1 to synchronize rotation of inner truncated wheel 209 and vertical linear motion of first guide member 205.1 and constrains motion of first inner wheel head 217.1 and first guide member 205.1 to one degree of freedom; and second inner connector band 225.2 disposed on second inner wheel head 217.2 at inner peripheral radial surface 218, such that second inner connector band 225.2 is gravitationally suspended from second inner wheel head 217.2 and mechanically interconnects second inner wheel head 217.2 and second guide member 205.2 to synchronize the rotation of inner truncated wheel 209 and vertical linear motion of second guide member 205.2 and constrains motion of second inner wheel head 217.2 and second guide member 205.2 to one degree of freedom.

In an embodiment, guide members 205 include: first guide member 205.1 in mechanical communication with first outer wheel head 215.1 and first inner wheel head 217.1; and second guide member 205.2 in mechanical communication with second outer wheel head 215.2 and second inner wheel head 217.2. In an embodiment, first guide member 205.1 includes: final stage 229 disposed on first outer connector band 204.1; intermediate stage 230 disposed on first inner connector band 225.1; a plurality of lateral connectors 227, such that some of lateral connectors 227 interconnect final stage 229 and intermediate stage 230, and some of lateral connectors 227 interconnect intermediate stage 230 and stationary frame 201; and a plurality of guide flexural members 228, such that lateral connectors 227 interconnect final stage 229 and intermediate stage 230 via guide flexural members 228; lateral connectors 227 interconnect intermediate stage 230 and stationary frame 201 via guide flexural members 228; final stage 229 is disposed on first outer connector band 204.1 via at least one guide flexural member 228, and intermediate stage 230 is disposed on first inner connector band 225.1 via at least one guide flexural member 228. In an embodiment, second guide member 205.2 includes: final stage 229 disposed on second outer connector band 204.2; intermediate stage 230 disposed on second inner connector band 225.2; a plurality of lateral connectors 227, such that some of lateral connectors 227 interconnect final stage 229 and intermediate stage 230, and some of lateral connectors 227 interconnect intermediate stage 230 and stationary frame 201; and a plurality of guide flexural members 228, such that lateral connectors 227 interconnect final stage 229 and intermediate stage 230 via guide flexural members 228; lateral connectors 227 interconnect intermediate stage 230 and stationary frame 201 via guide flexural members 228; final stage 229 is disposed on second outer connector band 204.2 via at least one guide flexural member 228, and intermediate stage 230 is disposed on second inner connector band 225.2 via at least one guide flexural member 228.

In an embodiment, dual-truncated wheel Kibble balance 200 includes: measurement mass arm 249 in mechanical communication; and reference force arm 250, wherein double balance wheel 203 is in mechanical communication with stationary frame 201 at stationary point of attachment 219 to stationary frame 201 and that pivots about stationary point of attachment 219 to stationary frame 201, such that double balance wheel 203 is suspended from stationary frame 201 by central flexural bridge 202 that is mechanically interposed between double balance wheel 203 and stationary frame 201, so that double balance wheel 203 pivotally moves via central flexural bridge 202 to restore mass balance between measurement mass arm 249 and reference force arm 250.

In an embodiment, dual-truncated wheel Kibble balance 200 includes translational cord 226 in mechanical communication with first guide member 205.1 and measurement mass arm 249, such that translational cord 226 is interposed between first guide member 205.1 and measurement mass arm 249, interconnects first guide member 205.1 and measurement mass arm 249, and linearly translates measurement mass arm 249 parallel to earth's gravitational field in response to pivotal motion of double balance wheel 203 relative to stationary frame 201.

In an embodiment, dual-truncated wheel Kibble balance 200 includes translational cord 226 in mechanical communication with second guide member 205.2 and reference force arm 250, such that translational cord 226 is interposed between second guide member 205.2 and reference force arm 250, interconnects second guide member 205.2 and reference force arm 250, and linearly translates reference force arm 250 parallel to earth's gravitational field in response to pivotal motion of double balance wheel 203 relative to stationary frame 201.

In an embodiment, measurement mass arm 249 includes coil 206 in mechanical communication with first guide member 205.1. In an embodiment, coil 206 linearly reciprocates parallel to gravitational force of the earth in response to pivotal motion of double balance wheel 203. In an embodiment, reference force arm 250 includes tare mass 207 in mechanical communication with second guide member 205.2. In an embodiment, tare mass 207 linearly reciprocates parallel to the gravitational force of the earth in response to pivotal motion of double balance wheel 203.

In an embodiment, outer connector band 204 includes: outer wheel connector end 221, outer guide connector end 222, and a plurality of flexible filaments 220 that extend from outer wheel connector end 221 to outer guide connector end 222. In an embodiment, inner connector band 225 includes: inner wheel connector end 223, inner guide connector end 224, and a plurality of flexible filaments 220 that extend from inner wheel connector end 223 to inner guide connector end 224.

In an embodiment, dual-truncated wheel Kibble balance 200 for determining absolute mass includes: stationary frame 201 that provides stationary point of attachment 219: for displacement motion of measurement mass arm 249 and reference force arm 250 relative to stationary frame 201, and for pivotal motion of double balance wheel 203 relative to stationary frame 201; double balance wheel 203 in mechanical communication with stationary frame 201 at stationary point of attachment 219 to stationary frame 201 and that pivots about stationary point of attachment 219 to stationary frame 201, such that double balance wheel 203 is suspended from stationary frame 201 by central flexural bridge 202 that is mechanically interposed between double balance wheel 203 and stationary frame 201, so that double balance wheel 203 pivotally moves via central flexural bridge 202 to restore mass balance between measurement mass arm 249 and reference force arm 250, double balance wheel 203 including: lever bar 214 disposed on and opposing stationary frame 201 and in pivotal communication with stationary frame 201 via central flexural bridge 202; outer truncated wheel 208 disposed on lever bar 214 at outer wheel radius 210 and including: first outer wheel head 215.1 and second outer wheel head 215.2, such that each outer wheel head 215 includes outer peripheral radial surface 216 arranged at outer wheel radius 210; inner truncated wheel 209 disposed on lever bar 214 at inner wheel radius 211 and including: first inner wheel head 217.1 and second inner wheel head 217.2, such that each inner wheel head 217 includes inner peripheral radial surface 218 arranged at inner wheel radius 211, and inner truncated wheel 209 is circumscribed by outer truncated wheel 208 with outer wheel radius 210 greater than inner wheel radius 211; central flexural bridge 202 in mechanical communication with stationary frame 201 and double balance wheel 203, such that central flexural bridge 202 is: interposed between stationary frame 201 and double balance wheel 203, interconnects stationary frame 201 and double balance wheel 203, and flexes in response to pivotal motion of double balance wheel 203 relative to stationary frame 201; first outer connector band 204.1 disposed on first outer wheel head 215.1 at outer peripheral radial surface 216, such that first outer connector band 204.1 is gravitationally suspended from first outer wheel head 215.1 and mechanically interconnects first outer wheel head 215.1 and first guide member 205.1 to synchronize rotation of outer truncated wheel 208 and vertical linear motion of first guide member 205.1 and constrains motion of first outer wheel head 215.1 and first guide member 205.1 to one degree of freedom; second outer connector band 204.2 disposed on second outer wheel head 215.2 at outer peripheral radial surface 216, such that second outer connector band 204.2 is gravitationally suspended from second outer wheel head 215.2 and mechanically interconnects second outer wheel head 215.2 and second guide member 205.2 to synchronize rotation of outer truncated wheel 208 and vertical linear motion of second guide member 205.2 and constrains motion of second outer wheel head 215.2 and second guide member 205.2 to one degree of freedom; first inner connector band 225.1 disposed on first inner wheel head 217.1 at inner peripheral radial surface 218, such that first inner connector band 225.1 is gravitationally suspended from first inner wheel head 217.1 and mechanically interconnects first inner wheel head 217.1 and first guide member 205.1 to synchronize rotation of inner truncated wheel 209 and vertical linear motion of first guide member 205.1 and constrains motion of first inner wheel head 217.1 and first guide member 205.1 to one degree of freedom; second inner connector band 225.2 disposed on second inner wheel head 217.2 at inner peripheral radial surface 218, such that second inner connector band 225.2 is gravitationally suspended from second inner wheel head 217.2 and mechanically interconnects second inner wheel head 217.2 and second guide member 205.2 to synchronize rotation of inner truncated wheel 209 and vertical linear motion of second guide member 205.2 and constrains motion of second inner wheel head 217.2 and second guide member 205.2 to one degree of freedom; first guide member 205.1 in mechanical communication with first outer wheel head 215.1 and first inner wheel head 217.1; and second guide member 205.2 in mechanical communication with second outer wheel head 215.2 and second inner wheel head 217.2.

In an embodiment, dual-truncated wheel Kibble balance 200 first guide member 205.1 includes: final stage 229 disposed on first outer connector band 204.1; intermediate stage 230 disposed on first inner connector band 225.1; plurality of lateral connectors 227, such that some of lateral connectors 227 interconnect final stage 229 and intermediate stage 230, and some of lateral connectors 227 interconnect intermediate stage 230 and stationary frame 201; and a plurality of guide flexural members 228, such that lateral connectors 227 interconnect final stage 229 and intermediate stage 230 via guide flexural members 228; lateral connectors 227 interconnect intermediate stage 230 and stationary frame 201 via guide flexural members 228; final stage 229 is disposed on first outer connector band 204.1 via at least one guide flexural member 228, and intermediate stage 230 is disposed on first inner connector band 225.1 via at least one guide flexural member 228.

In an embodiment, second guide member 205.2 includes: final stage 229 disposed on second outer connector band 204.2; intermediate stage 230 disposed on second inner connector band 225.2; a plurality of lateral connectors 227, such that some of lateral connectors 227 interconnect final stage 229 and intermediate stage 230, and some of lateral connectors 227 interconnect intermediate stage 230 and stationary frame 201; and a plurality of guide flexural members 228, such that lateral connectors 227 interconnect final stage 229 and intermediate stage 230 via guide flexural members 228; lateral connectors 227 interconnect intermediate stage 230 and stationary frame 201 via guide flexural members 228; final stage 229 is disposed on second outer connector band 204.2 via at least one guide flexural member 228, and intermediate stage 230 is disposed on second inner connector band 225.2 via at least one guide flexural member 228.

In an embodiment, dual-truncated wheel Kibble balance 200 includes measurement mass arm 249 and reference force arm 250.

In an embodiment, dual-truncated wheel Kibble balance 200 includes translational cord 226 in mechanical communication with first guide member 205.1 and measurement mass arm 249, such that translational cord 226 is interposed between first guide member 205.1 and measurement mass arm 249, interconnects first guide member 205.1 and measurement mass arm 249, and linearly translates measurement mass arm 249 parallel to earth's gravitational field in response to pivotal motion of double balance wheel 203 relative to stationary frame 201.

In an embodiment, dual-truncated wheel Kibble balance 200 includes translational cord 226 in mechanical communication with second guide member 205.2 and reference force arm 250, such that translational cord 226 is interposed between second guide member 205.2 and reference force arm 250, interconnects second guide member 205.2 and reference force arm 250, and linearly translates reference force arm 250 parallel to earth's gravitational field in response to pivotal motion of double balance wheel 203 relative to stationary frame 201.

In an embodiment, measurement mass arm 249 includes coil 206 in mechanical communication with first guide member 205.1. In an embodiment, coil 206 linearly reciprocates parallel to the gravitational force of the earth in response to pivotal motion of double balance wheel 203.

In an embodiment, reference force arm 250 includes tare mass 207 in mechanical communication with second guide member 205.2. In an embodiment, tare mass 207 linearly reciprocates parallel to the gravitational force of the earth in response to pivotal motion of double balance wheel 203.

In an embodiment, outer connector band 204 includes: outer wheel connector end 221, outer guide connector end 222, and a plurality of flexible filaments 220 that extend from outer wheel connector end 221 to outer guide connector end 222.

In an embodiment, inner connector band 225 includes: inner wheel connector end 223, inner guide connector end 224, and a plurality of flexible filaments 220 that extend from inner wheel connector end 223 to inner guide connector end 224.

In an embodiment, dual-truncated wheel Kibble balance 200 includes a flexure pivot-based kinematical system. Guide member 205 can have a form of a flexure-based folded parallelogram linkage. Double balance wheel 203 is suspended from stationary frame 201 by central flexural bridge 202. Central flexural bridge 202 has a geometry with a radius in the bending region that is significantly larger than the bending length and keeps stress in the fully loaded mechanism, e.g., 15 kg, at a level (e.g., approximately 400 MPa) in a fully deflected state, wherein central flexural bridge 202 can be deflected by a selected amount such as about 70 The centers of rotation of outer truncated wheel 208 (with outer wheel head 215) and inner truncated wheel 209 (with inner wheel head 217) coincide with the rotation axis of central flexural bridge 202. Outer wheel head 215 and inner wheel head 217 are disposed on lever bar 214. Outer connector band 204 and inner connector band 225 (which can include multifilament bands) roll over outer peripheral radial surface 216 or inner peripheral radial surface 218 of outer wheel head 215 or inner wheel head 217 and connect these with final stage 229 or intermediate stage 230 of guide member 205. With respect to central flexural bridge 202, dual-truncated wheel Kibble balance 200 has a symmetric design and produces a vertical motion, e.g., ±30 mm, at first final stage 229.1 and second final stage 229.2. First intermediate stage 230.1 and second intermediate stage 230.2 travel, e.g., half the lineal distance of final stage 229. Lateral connector 227 as shown in FIG. 24 is a sheet structure that has guide flexural member 228 integrated, e.g., by etching a 350 µm thick hardened Copper Beryllium sheet down to a thickness of 50 µm. Encoder 212 encodes optical position readout fixed to base plate 213 of guide member 205, e.g., with a glass scale attached to final stage 229. Part [3.1] of the guiding mechanisms and the upper end of stationary frame 201 are attached to stiff base plate 213. Accordingly, dual-truncated wheel Kibble balance 200 includes stationary frame 201, double balance wheel 203, and guide member 205 as a more compact, high-precision Kibble balance mechanism than conventional technology and involves less active control features and fewer components, integrates functions of suspending a high load with little hysteresis, and provides a large deflection of double balance wheel 203. As a result, dual-truncated wheel Kibble balance 200 overcomes having to compromise between a high supported load and large deflection in flexure mechanisms.

Various parts and procedures for Kibble balances are described in U.S. patent application Ser. Nos. 16/706,011, 18/126,043, and 18/199,264, the disclosure of each of which is incorporated herein by reference in its entirety.

Dual-truncated wheel Kibble balance 200 can be made of various elements and components that can be various sizes and can include various materials. Elements of dual-truncated wheel Kibble balance 200 can be made of a material that is physically or chemically resilient in an environment in which dual-truncated wheel Kibble balance 200 is disposed. Exemplary materials include a metal, ceramic, thermoplastic, glass, semiconductor, and the like. The elements of dual-truncated wheel Kibble balance 200 can be made of the same or different material and can be monolithic in a single physical body or can be separate members that are physically joined.

Stationary frame 201 and base plate 213 fixes central flexural bridge 202, double balance wheel 203, and guide member 205, wherein stationary frame 201 and base plate 213 are stationary, and central flexural bridge 202, double balance wheel 203, and guide member 205 move cooperatively relative to stationary frame 201 and base plate 213. Stationary frame 201 has stationary point of attachment 219 to which other elements are attached.

Central flexural bridge 202 provides rotational movement of double balance wheel 203 and connects to stationary frame 201 at one end, and the other end of central flexural bridge 202 transmits rotary motion to double balance wheel 203. Central flexural bridge 202 suspends components from stationary frame 201. Central flexural bridge 202 receives a load at maximum bending angle that stays below significant creep level, has an elastic stiffness that is sufficiently small to minimize effects of relaxation after bending, e.g., when performing two modes of operation of the Kibble balance experiment in one mechanism, and has a fatigue limit that is not exceeded during operation of dual-truncated wheel Kibble balance 200. A shape of central flexural bridge 202 reduces maximum bending stress and maintains low elastic stiffness while bending. Elliptical shapes with high aspect ratio of major to minor axis can be used. Central flexural bridge 202 can have, e.g., a minor axis 0.7 mm, major axis 5 mm, or width 37.2 mm. Central flexural bridge 202 can be made from any suitable material such as precipitation hardened copper beryllium. The width of central flexural bridge 202 provides adequate stiffness in directions other than the axis of nominal rotation. A larger width provides more stability in those axes. Central flexural bridge 202 can be separated in the middle and spaced apart along the axis of rotation to include a gap between the half flexure parts so as to increase the effective width of the design.

Guide flexural member 228 or central flexural bridge 202 involve elastic deformation of a formed material to guide the motion of an element in a particular trajectory. Guide flexural member 228 or central flexural bridge 202 can be made from a metallic material such as aluminum, copper, brass, steel or any material that provides adequate flexion. Guide flexural member 228 or central flexural bridge 202 provide an approximately linear motion of outer connector band 204 or guide member 205 in a direction parallel to gravity.

Double balance wheel 203 attaches in its center to the nonstationary end of central flexural bridge 202 distal to stationary point of attachment 219 and includes outer truncated wheel 208 and inner truncated wheel 209, wherein a diameter of outer truncated wheel 208 is twice the diameter of inner truncated wheel 209, indicated by outer wheel radius 210 and inner wheel radius 211 in FIG. 1. In this manner, double balance wheel 203 is suspended by central flexural bridge 202 and provides linear motion to outer connector band 204 and inner connector band 225 suspended tangential to double balance wheel 203. Double balance wheel 203 pivots about central flexural bridge 202 and aligns with the axis of rotation of central flexural bridge 202. From one side of double balance wheel 203 coil 206 and a mass pan are suspended, while on the opposite side of double balance wheel 203, tare mass 207 is suspended from double balance wheel 203. Double balance wheel 203 provides balancing functionality to dual-truncated wheel Kibble balance 200. Double balance wheel 203 has stable and constant lever arms via lever bar 214 over the range of at least a few micrometers of travel to not preclude incorrect force readouts and displacement errors. It is contemplated that diamond-turned wheel surfaces provide smooth surfaces for lever arms good to almost 1 nanometer. Inner truncated wheel 209 can have, e.g., half the diameter of outer truncated wheel 208 although proportionalities among outer wheel radius 210 and inner wheel radius 211 are contemplated.

Figure 25:
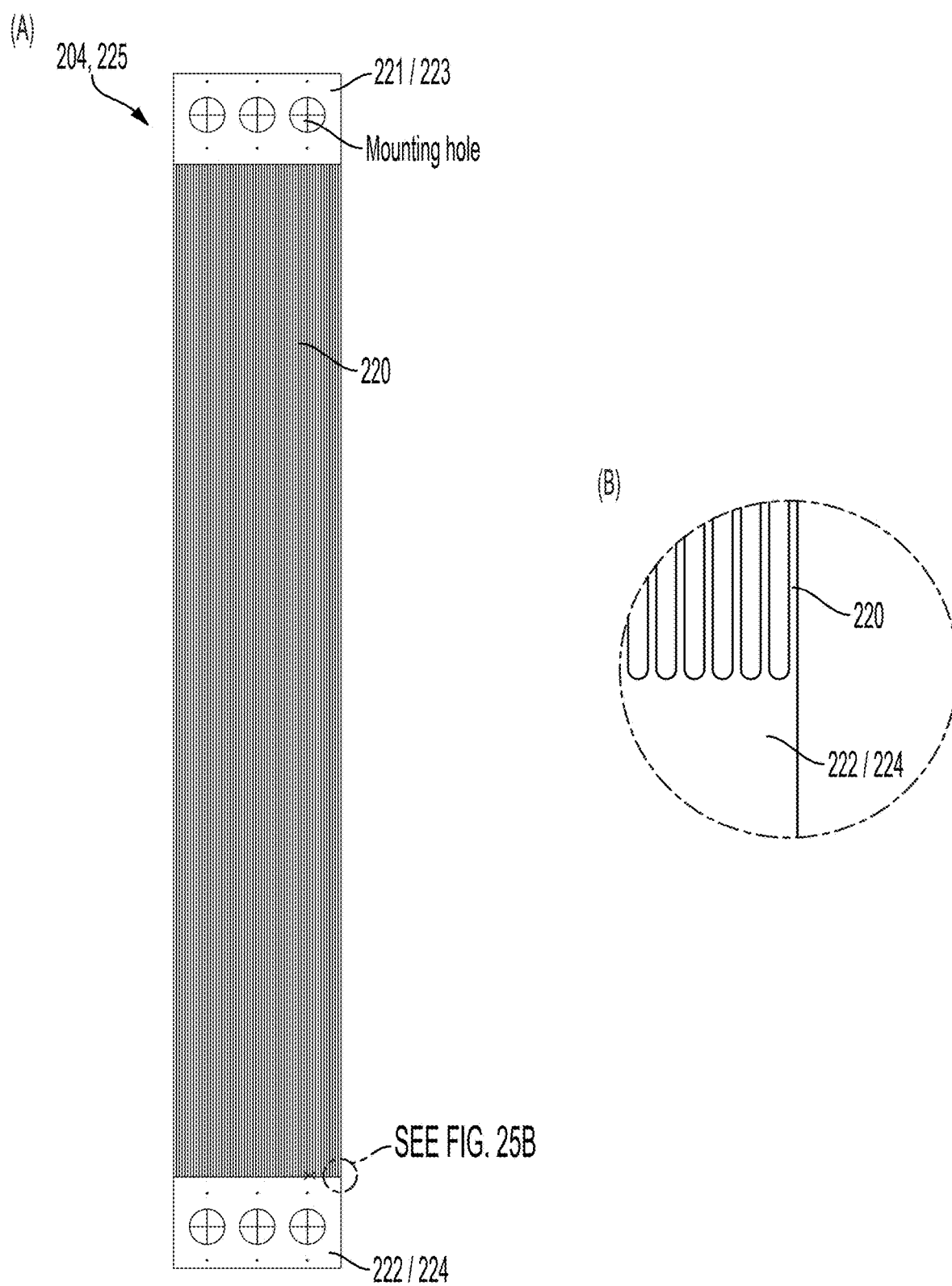
FIG. 25 shows, according to some embodiments, an outer connector band 204.

Connector bands (204, 225) interconnect outer and inner wheels (208, 209) to final stage 229 and intermediate stage 230 of guide member 205. Outer connector band 204 And inner connector band 225 roll off double balance wheel 203 and connect double balance wheel 203 with elements of guide member 205. With reference to FIG. 25, a multifilament design that includes flexible filaments 220 disposed from a first end (e.g., 221 or 223) and extend to a second end (e.g., 222 or 224) provide for a highly loaded band and integrates over residual surface imperfections in outer peripheral radial surface 216 or inner peripheral radial surface 218 of double balance wheel 203, while maintaining structural integrity regarding the suspended mass. In some embodiments, intermediate stage 230 of guide member 205 is connected to inner truncated wheel 209 with wire instead of a connector band.

Guide member 205 is attached to stationary frame 201 to be immobilized at various locations and includes final stage 229 in mechanical communication with outer truncated wheel 208 and intermediate stage 230 in mechanical communication with inner truncated wheel 209. Guide member 205 includes lateral connector 227 that connects intermediate stage 230 to stationary frame 201, wherein this linkage via lateral connector 227 is a direct and rigid connection to stationary frame 201. Intermediate stage 230 moves half the distance of the output motion of final stage 229. Intermediate stage 230 can be connected to inner truncated wheel 209 by a wire or inner connector band 225. The folding parallelogram design of guide member 205 provides nearly perfect correction of the arc motion of a single parallelogram linkage. Final stage 229 moves twice the distance of intermediate stage 230 and provides mechanical displacement to coil 206 or tare mass 207. The cooperative movement of elements in guide member 205 in relation to stationary frame 201 constrains motion of coil 206. The parallelogram linkage design can include an aluminum frame having copper beryllium sheets attached thereto. The sheets can be made, e.g., in a two-step etching process. In an exemplary process for making lateral connector 227, a 350 μm thick copper beryllium (alloy C17200) block is subjected to etching the general shape. Thereafter, guide flexural members 228 are produced by stopping the etching process so that a minimum thickness of about 50 μm of guide flexural member 228 results. Flexible filaments 220 are made by etching in a similar manner, wherein only the first step of etching process is performed.

Figure 26:
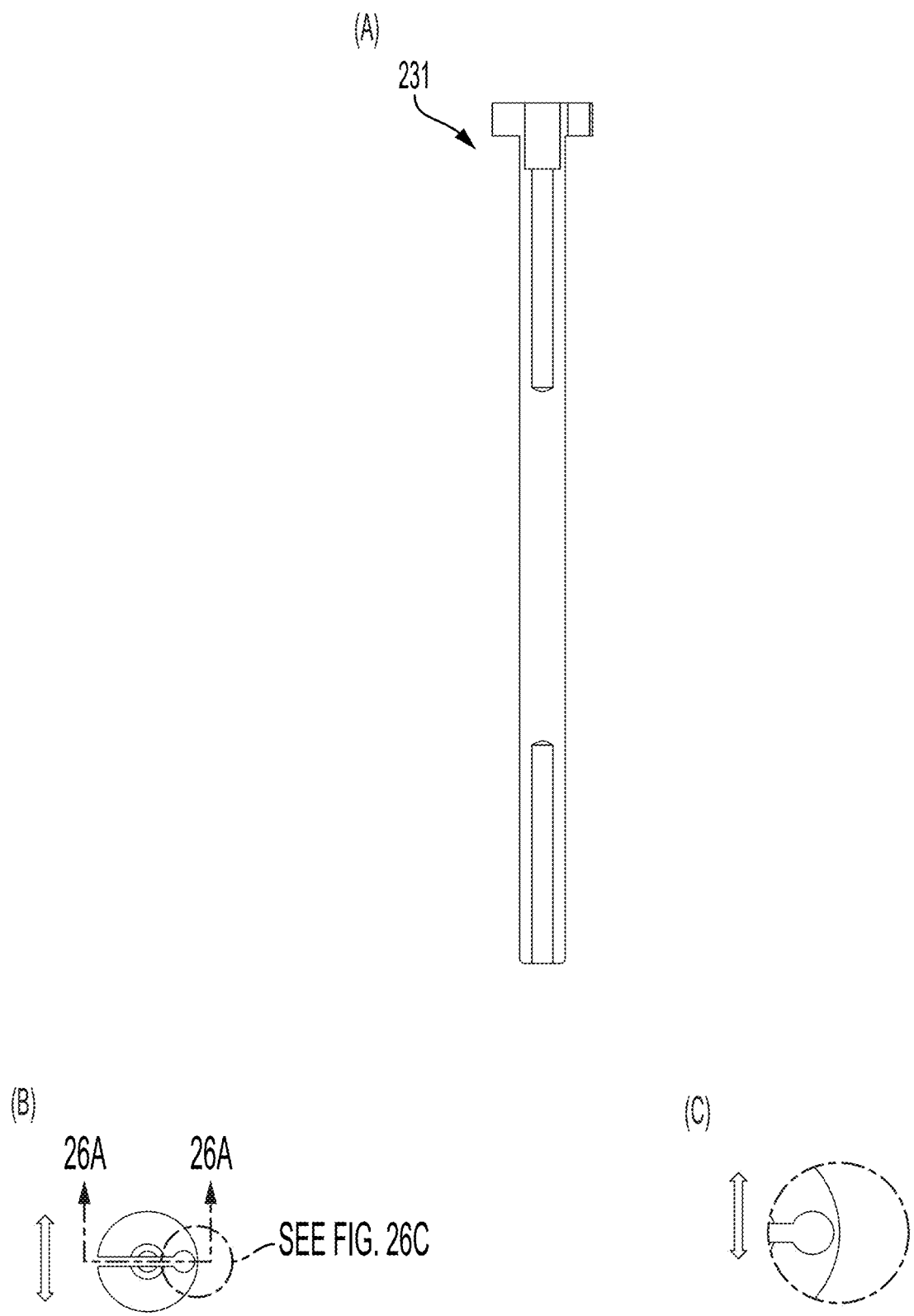
FIG. 26 shows, according to some embodiments, a fastener 231.

With reference to FIG. 26, fastener 231 can be used to secure various elements of dual-truncated wheel Kibble balance 200 in place. Such can receive a counter-fastener such as a bolt or screw.

Dual-truncated wheel Kibble balance 200 can be made in various ways. It should be appreciated that dual-truncated wheel Kibble balance 200 includes a number of optical, electrical, or mechanical components, wherein such components can be interconnected and placed in communication (e.g., optical communication, electrical communication, mechanical communication, and the like) by physical, chemical, optical, or free-space interconnects. The components can be disposed on mounts that can be disposed on a bulkhead for alignment or physical compartmentalization. As a result, dual-truncated wheel Kibble balance 200 can be disposed in a terrestrial environment or space environment. Elements of dual-truncated wheel Kibble balance 200 can be formed from suitable materials, such as ceramic, glass, or metal. According to an embodiment, the elements of dual-truncated wheel Kibble balance 200 are formed by machining a stock material such as block of material that is subjected to removal of material such as by cutting, laser oblation, and the like. Accordingly, dual-truncated wheel Kibble balance 200 can be made by additive or subtractive manufacturing. In an embodiment, elements of dual-truncated wheel Kibble balance 200 are selectively etched to remove various different materials using different etchants and photolithographic masks and procedures.

The process for making dual-truncated wheel Kibble balance 200 can include providing elements of dual-truncated wheel Kibble balance 200 with vacuum compatible elements such as vent holes; machining parts (e.g., stationary frame 201) from aluminum alloy that can include milling such out of a piece of aluminum or joining pieces together; performing wire electrical discharge machining of central flexural bridge 202; and attaching central flexural bridge 202 to stationary frame 201 with kinematic mounts or by bolting central flexural bridge 202 to stationary frame 201. The process can include adjusting the rotation axis of central flexural bridge 202 in direction perpendicular to vertical.

Making double balance wheel 203 can be done by premilling the coarse structure in aluminum alloy, and then diamond turning outer truncated wheel 208 onto the aluminum body. Inner truncated wheel 209 can be separately attached to the middle of lever bar 214 by separate inner wheel riggers. Double balance wheel 203 can be attached to the moving end of central flexural bridge 202 distal to stationary point of attachment 219 of stationary frame 201. This can be done by kinematically mounting or fastening components together. Points for adjustment of the wheel axis to the flexure axis can be considered. A vertical rotation of double balance wheel 203 to central flexural bridge 202 provides a rotation of the output moving member of the mechanism, which can be adjusted by rotating double balance wheel 203 around the vertical with respect to central flexural bridge 202.

Etching outer connector bands 204 from hardened copper beryllium alloy provides flexible filaments 220 to integrate over surface imperfections of the diamond turned double balance wheel 203 parts. Outer connector bands 204 can be centered on double balance wheel 203 so that their effective point of force action is in the center of central flexural bridge 202. This can be done by, e.g., a locating pin hole in the upper end of outer connector band 204 and a pin in the middle of double balance wheel 203. The outer connector band 204 suspended from outer truncated wheel 208 can be secured by a clamp. Similar procedures can be performed for inner connector band 225 to intermediate stage 230, wherein a flat ribbon can be hooked by pins on inner truncated wheel 209 or intermediate stage 230.

Guide member 205 can include 3 sub-components: a frame-fixed component, and two moving components (final stage 229 and intermediate stage 230), which can be made by machining. Machining can be performed on an aluminum alloy by milling. Guide flexural member 228 and lateral connector 227 can be made from hardened copper beryllium and machined by etching. Flexure sheet 232, e.g., as shown in FIG. 24, interconnect all three parts of guide member 205 so that they can move with respect to each other enabled by guide flexural members 228. Assembling guide member 205 is performed so that guide flexural members 228 of upper and lower flexure sheets 232 have rotation axes that are aligned. This can be accomplished by aligning them using gravity and, e.g., dowel pin holes in flexure sheets 232 while hanging vertically from final stage 229 or intermediate stage 230 before fastening them with a fastener such as a screw and washer. Guide member 205 can be attached to outer connector band 204 and inner connector band 225. Final stage 229 is attached to final stage 229, and intermediate stage 230 is attached to inner connector band 225. Inner connector band 225 can be attached by hooking it on a pin to intermediate stage 230 or by using screws. Final stage 229 can be rigidly connected to outer connector band 204 using screws or such. Guide member 205 can be adjusted around the horizontal axes so that its output movement is aligned with gravity. Alignment can be performed with shimming or by screw adjusters, wherein the frame-fixed component is moved with respect to stationary frame 201.

Dual-truncated wheel Kibble balance 200 has numerous advantageous and unexpected benefits and uses. In an embodiment, a process for determining absolute mass with dual-truncated wheel Kibble balance 200 includes: providing dual-truncated wheel Kibble balance 200 including: stationary frame 201; double balance wheel 203 disposed on stationary frame 201; a pair of guide members 205, such that one of guide members 205 is disposed on each opposing end of double balance wheel 203; a plurality of outer connector bands 204, such that each guide member 205 is gravitationally suspended from double balance wheel 203 by at least one of outer connector bands 204; a plurality of inner connector bands 225, such that each guide member 205 is gravitationally suspended from the double balance wheel 203 by at least one of the inner connector bands 225; and a central flexural bridge 202 in mechanical communication with the stationary frame 201 and the double balance wheel 203, such that the central flexural bridge 202 is: interposed between the stationary frame 201 and the double balance wheel 203, interconnects the stationary frame 201 and the double balance wheel 203, and flexes in response to pivotal motion of the double balance wheel 203 relative to the stationary frame 201 a measurement mass arm 249 mechanically coupled to the stationary frame 201 via the double balance wheel 203, the central flexural bridge 202, and at least one of the guide members 205; a reference force arm 250 mechanically coupled to the stationary frame 201 via the double balance wheel 203, the central flexural bridge 202, and at least one of the guide members 205; oscillating, by a coil 206 of the measurement mass arm 249, the double balance wheel 203 relative to the stationary frame 201 to produce oscillatory linear displacements of the measurement mass arm 249; calibrating the coil 206 as a function of the oscillatory linear displacements of the measurement mass arm; determining a BL product of the coil 206 after calibrating; receiving a mass on a mass pan disposed on the measurement mass arm 249; measuring a first change in voltage required by the coil 206 to maintain the position of the measurement mass arm 249 in absence of pivotal motion of the lever bar 214 relative to the stationary frame 201 with the mass disposed on the mass pan; removing the mass from the mass pan; measuring a second change in voltage required by the coil 206 to maintain the position of the measurement mass arm 249 in absence of pivotal motion of the lever bar 214 relative to the stationary frame 201 without the mass disposed on the mass pan; and calculating the absolute mass of the mass from the first change in voltage, the second change in voltage, and the BL product.

In an embodiment, dual-truncated wheel Kibble balance 200 and determining absolute mass can include the properties, functionality, hardware, and process steps described herein and embodied in any of the following non-exhaustive list:
- a process (e.g., a computer-implemented method including various steps; or a method carried out by a computer including various steps);
- an apparatus, device, or system (e.g., a data processing apparatus, device, or system including means for carrying out such various steps of the process; a data processing apparatus, device, or system including means for carrying out various steps; a data processing apparatus, device, or system including a processor adapted to or configured to perform such various steps of the process);
- a computer program product (e.g., a computer program product including instructions which, when the program is executed by a computer, cause the computer to carry out such various steps of the process; a computer program product including instructions which, when the program is executed by a computer, cause the computer to carry out various steps);
- computer-readable storage medium or data carrier (e.g., a computer-readable storage medium including instructions which, when executed by a computer, cause the computer to carry out such various steps of the process; a computer-readable storage medium including instructions which, when executed by a computer, cause the computer to carry out various steps; a computer-readable data carrier having stored thereon the computer program product; a data carrier signal carrying the computer program product);
- a computer program product including comprising instructions which, when the program is executed by a first computer, cause the first computer to encode data by performing certain steps and to transmit the encoded data to a second computer; or
- a computer program product including instructions which, when the program is executed by a second computer, cause the second computer to receive encoded data from a first computer and decode the received data by performing certain steps.

Dual-truncated wheel Kibble balance 200 and processes disclosed herein have numerous beneficial uses. Dual-truncated wheel Kibble balance 200 is vacuum compatible and is a highly accurate weighing article that can be operated under, e.g., high vacuum conditions (10^–6 Torr) up to elevated pressures, e.g., several atmospheres. Components can be electrically conductive to prevent electrostatic charges or electrostatic forces that disturb a measurement. Dual-truncated wheel Kibble balance 200 can be disposed in a vacuum chamber, wherein the coil is arranged on one side, and a physical tare plus a coil for moving the main coil through the mechanism during the velocity mode is disposed from the other side. Movement of the coil and tare occurs linearly due to the folded parallelogram linkage of guide member 205. Moreover, guide member 205 stiffens the output movement and constrains it to one degree of freedom motion. Accordingly, guide member 205 can have a low stiffness to provide a high force resolution. A low stiffness makes dual-truncated wheel Kibble balance 200 very sensitive to changes of force from, e.g., a mass placement and provides for sensitive adjustment of the counterforce provided by the coil.

The articles and processes herein are illustrated further by the following Example, which is non-limiting.

Example

Design of an enhanced mechanism for a new Kibble balance directly traceable to the quantum SI The Kibble balance is the instrument for the precise primary realization of the unit of mass in the International System of Units (SI) based on electro-mechanical metrology principles and quantum physics. Due to the design of a new version of the Kibble balance at the National Institute of Standards and Technology (NIST) as part of the so-called "Quantum Electro-Mechanical Metrology Suite", QEMMS, this article describes the components integrated in QEMMS as well as the design of the new flexure based moving and weighing mechanism.

The Kibble Balance

The measuring principle of the Kibble balance was one of the main experiments contributing to the redefinition of the SI in the year 2018. The redefinition of the unit of mass, the kilogram, based on the fixed values of three constants of nature—the Planck's constant, h, the speed of light, c, and the hyperfine transition frequency of Cesium, $\Delta v_{Cs}$—provides a means to realize mass through electrical metrology using absolute precision balances without the need to compare to a physical object.

Figure 27:
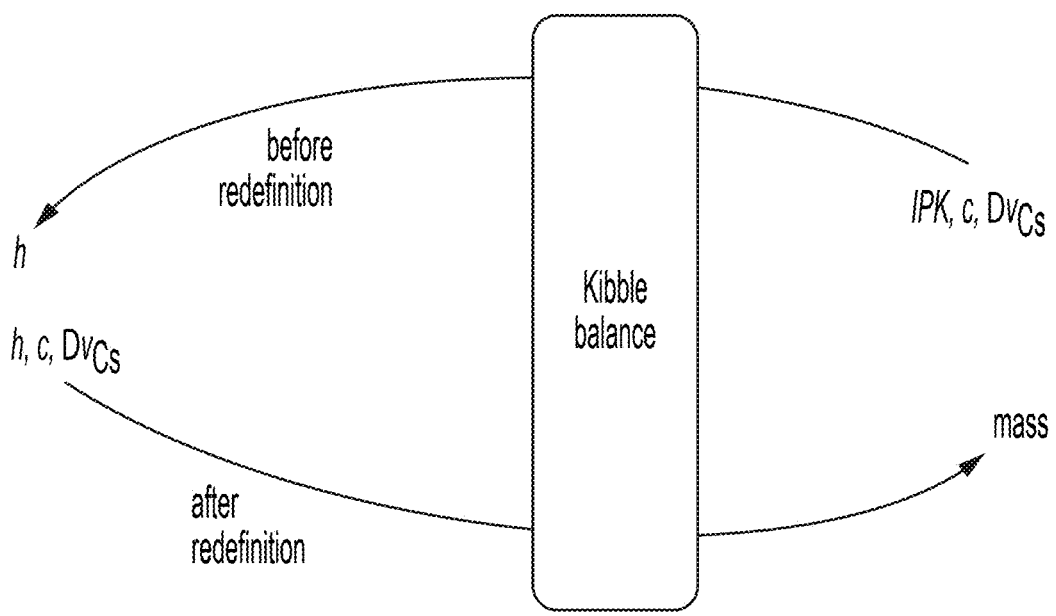
FIG. 27 shows, according to some embodiments, a relation between the IPK, natural constants and the unit of mass in the Kibble balance in traditional and reversed operation

Until 2018, only the values for c and $\Delta v_{Cs}$ were fixed, and the International Prototype Kilogram (IPK) was the last physical artifact defining one of the seven SI base units. Using the Kibble balance principle and decades of hard work, scientists were able to measure and define a numerical value for h based on the mass of the IPK, the speed of light and the hyperfine transition frequency of Cesium. As a result, the Kibble balance can be operated in a reversed fashion and realize virtually any macroscopic mass value directly from the defined value of h. A visualization of this relation is shown in FIG. 27.

The Kibble balance uses two modes of operation for an absolute mass measurement. In the first one, the weighing mode, the gravitational force of a test mass is directly compensated by a counter force such that the test mass stays at a defined null position. The counter force is provided by a magnet-coil system and can be controlled by adjusting the current through the coil.

The equation for this mode of operation is $$-mg = N\frac{\partial \Phi}{\partial z} I, \tag{1}$$

where m is the mass of the test mass, g the local gravitational acceleration, N the number of turns of the wire in the coil, Φ the magnetic flux through the coil, z the position of the coil along the vertical direction, and/the electric current through the coil.

Since the magnetic flux gradient N ∂Φ/∂z is very hard to obtain with sufficient uncertainty, a second mode of operation, the velocity mode, allows for direct measurement of the N ∂Φ/∂z with the required precision. Here, the coil is moved up and down in the magnetic field of the magnet such that a voltage is induced in the coil. Derived from Faraday's induction law it yields, $$V = -N \frac{\partial \Phi}{\partial z} v, \quad (2)$$

where V is the voltage induced in the coil in the velocity mode, and v is the vertical velocity of the coil with respect to the magnet. The velocity in high precision Kibble balances is usually measured with an interferometer and vacuum operation of the balance creates an environment with a stable index of refraction. Solving both equation (1), and equation (2) for N ∂Φ/∂z and equating them yields $$mgv = IV. \quad (3)$$

On the left hand side in equation (3), we see the expression for mechanical power, and on the right hand side, the one for electrical power. The original name of the Kibble balance, "watt balance", is a reflection of the power balance principle described here.

Figure 28:
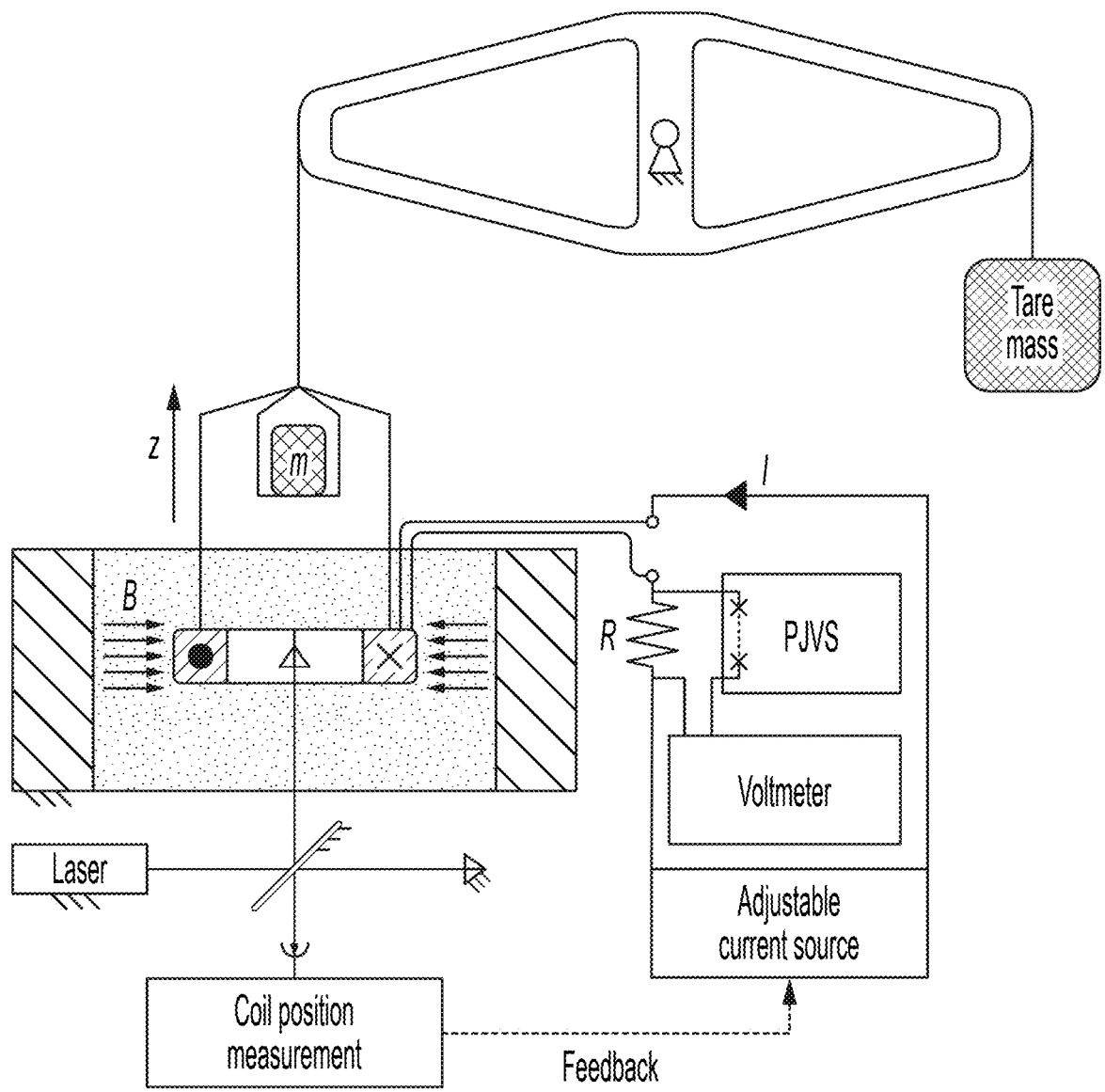
FIG. 28 shows, according to some embodiments, a principle of operation in the Kibble balance in the weighing mode. The gravitational force of a test mass m is compared with the magnetic force produced by the magnet-coil system to keep the test mass in a defined, feedback-controlled position.

A direct measurement of mass traceable to the new SI as in the QEMMS would not be possible without two quantum effects: The Josephson effect and the quantum Hall effect. The electric current/through the coil in the weighing mode is usually measured according to Ohm's law by monitoring a voltage drop over a traditional resistor R with very precisely known value (see FIG. 28), which is calibrated against a quantum Hall resistor (QHR) standard $R_H = h/(ie^2)$ where i is the Landau level filling factor, and e is the elementary charge. A Programmable Josephson Voltage System (PJVS) is a frequency to voltage converter, that is, $V = v/K_J$ where $K_J = 2e/h$, and v is a frequency. The PJVS provides a primary realization for voltage and is put parallel to the resistor in the electric circuit. It is used to create a voltage nominally equal to the drop over the resistor and a calibrated voltmeter monitors the remaining potential difference in the circuit. The voltage, hence, appears twice in the weighing mode, and the velocity mode. Adding the Josephson and quantum Hall effect to equation 3 yields the link of mass with Planck's constant established with the Kibble balance:

$$m = \frac{in^2 v^2}{4vg} h. \quad (4)$$

Furthermore, the velocity and the local gravitational acceleration in equation 4 are measured using primary standards of length and time based on the definition of the second and meter traceable to $\Delta vCs$ and c, respectively.

The QEMMS

There are multiple Kibble balance experiments around the globe. The design of each Kibble balance is unique, however, one feature seems to be common to all: The resistor in the electrical circuit for the weighing mode (see FIG. 28) is calibrated using transfer standards against a QHR as primary standard for resistance. QEMMS will overcome the inconvenience of external resistor calibration and thus eliminate the resistance calibration uncertainty by implementing a QHR directly in the Kibble balance's electrical circuit. This QHR is based on the quantization effect of monolayer graphene. Among the advantages offered by graphene-based QHR standards is their ability to maintain the fully quantized state at higher currents and temperature. NIST researchers fabricated thirteen single element graphene QHR standards in parallel and operate at the Landau level i=2 plateau, giving a nominal value of $R_K/26 \approx 992.8 \Omega$.

Hence, this will be the first integrated instrument in the world to feature all three: a Kibble balance for the actual mass measurement, a PJVS, and a primary reference resistor directly implemented in the instrument, which provides an outlook for improved overall measurement uncertainty for masses. The entire QEMMS will fit in one room of the size of approximately 4 m×5 m (width×length). Through the direct link to all three natural constants h, c and $\Delta v_{Cs}$, it is providing direct SI realization for the units of mass, time, length, electrical resistance, voltage, and current.

The apparatus can be designed and optimized to measure mass in the range of 10 g to 200 g with a targeted relative combined measurement uncertainty of $2 \times 10^{-8}$ at 100 g. Since a QHR has been designed for this purpose, we put the focus on the redesign and optimization of the Kibble balance. Each individual subsystem is being investigated regarding new opportunities for improvement.

The mechanism in the QEMMS has two functions: It provides suspension and defines the trajectory of moving components. The former entails suspending all functional components of the balance such as the mass pan, the coil, a counterweight for balancing, the coil suspension and optics for the interferometer. The latter requires the mechanism to move the coil in a vertical trajectory through the magnet in velocity mode. We are seeking to integrate these two main functions in the same mechanism so that one mechanical system is used to perform both modes of operation in the QEMMS.

A set of important requirements pre-define a successful mechanism design. The most important aspects that can directly be impacted by conceptual decisions in an early state of design are listed in FIG. 30.

One keeps all uncertainty contributions of the mechanical system to the measurement sufficiently small that their combination does not exceed the targeted uncertainty. For the QEMMS we define this as on the order of parts in $10^9$.

Coil Travel in the Velocity Mode

For a measurement of N ∂Φ/∂z in the velocity mode, the coil will be moved up and down in the magnetic field of the permanent magnet for the QEMMS. At first, it is accelerated to a velocity of $v_z = 2$ mm s$^{-1}$. Then it will travel with constant speed for 40 mm. Finally, the coil is decelerated to a stop at the end of each sweep. The permanent magnet for the QEMMS has been designed and built to provide uniform ∂Φ/Φz profile over the course of the travel with constant speed. This area is referred to as the precision air gap.

Hence, the travel range of the coil is given by the length of the precision air gap plus additional travel for acceleration and deceleration of the coil. A conservative estimate of the total travel length based on experience with previous Kibble balance designs is 60 mm. We will use this number as an input parameter for the mechanism design of QEMMS.

Stiffness

To keep measurement errors at the necessary minimum and to achieve the required resolution, the balance mechanism needs to have a low stiffness. More importantly, we want the stiffness to be constant in time and over all possible coil positions for the following three reasons:

The noise in the balance position feedback converts to force noise by multiplying the position noise with the stiffness of the mechanism. Hence, a low stiffness produces a small force noise at a stable position which reduces averaging time. Since QEMMS will be optimized to measure 100 g mass artifacts with an overall relative standard uncertainty of $2\times10^{-8}$, we are aiming for a resolution of the balance of $1\times10^{-9}$ on 100 g. This yields an absolute mass resolution of 0.1 µg, which is roughly equivalent to a force resolution of 1 nN. We assume we can average the position feedback uncertainty down to 100 nm, which means that the mechanism needs to have a stiffness of $\leq 0.01$ N m$^{-1}$ at the weighing position to be within the resolution requirements.

A constant stiffness value along the coil travel is important for an accurate and stable feedback control during the velocity mode. A higher order stiffness term causes the balance to become unstable or stiffen up along the travel, if the stiffness at the weighing position, which is in the middle of the coil travel, is adjusted down to 0.

The stiffness needs to be constant with time because changes over time result in a change in the restoring force of the mechanism, which leads to a drifting equilibrium position of the balance and therefore drift in the force signal, which might be limiting for the balance performance.

Guiding of the Coil

For QEMMS, the maximum horizontal parasitic motion along the vertical coil travel is 10 µm. Furthermore, we are seeking to create a trajectory with the QEMMS mechanism that is repeatable between weighing and velocity mode as well as between each sweep in the velocity mode.

Figure 29:
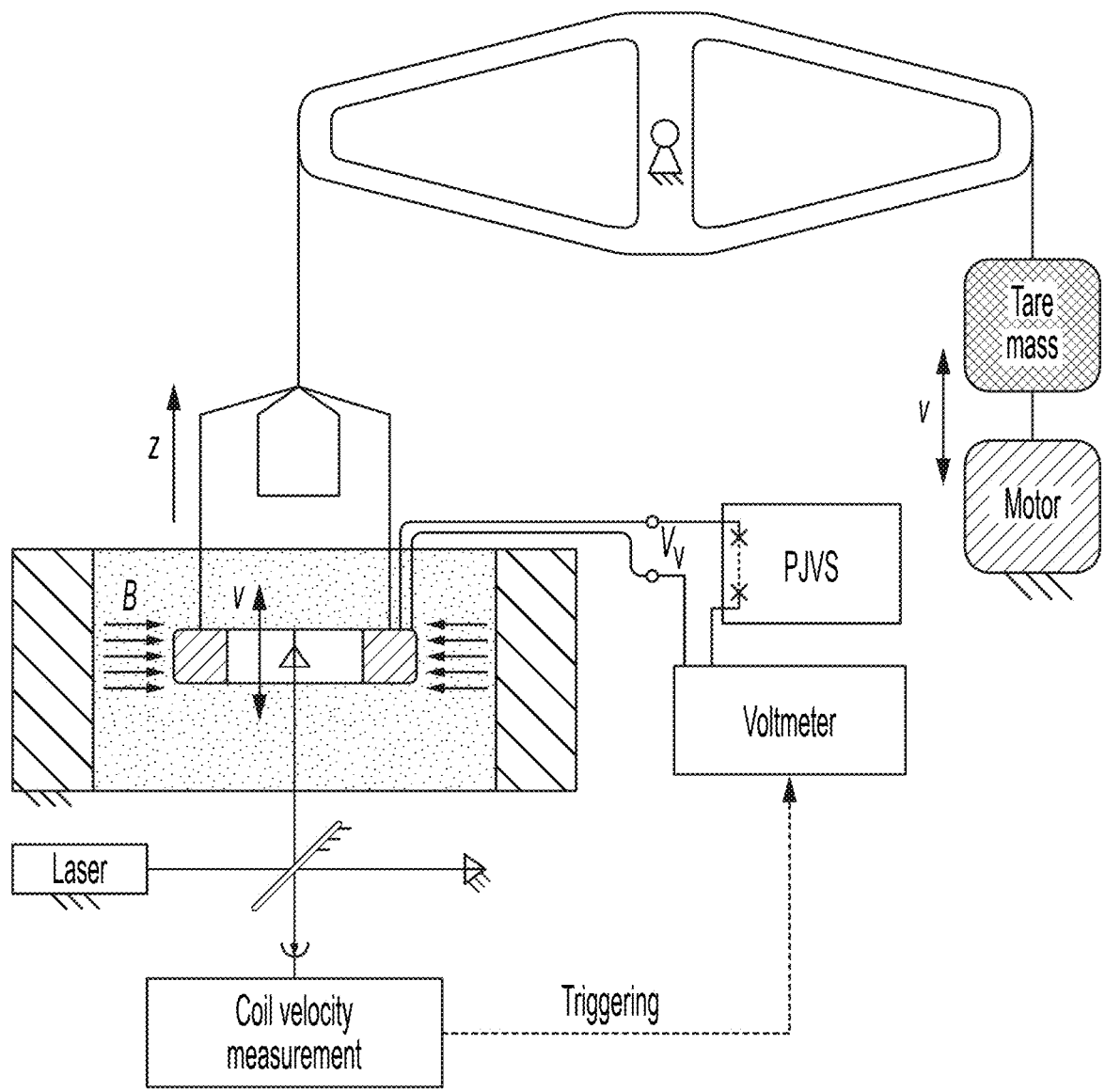
FIG. 29 shows, according to some embodiments, the principle of operation in the Kibble balance in the velocity mode. The coil is moved by a motor through the magnetic field of the magnet with vertical velocity v, and a voltage V is induced in the coil. The voltage measurement is synchronized with the position measurement of the coil using a time counter.
Figure 31:
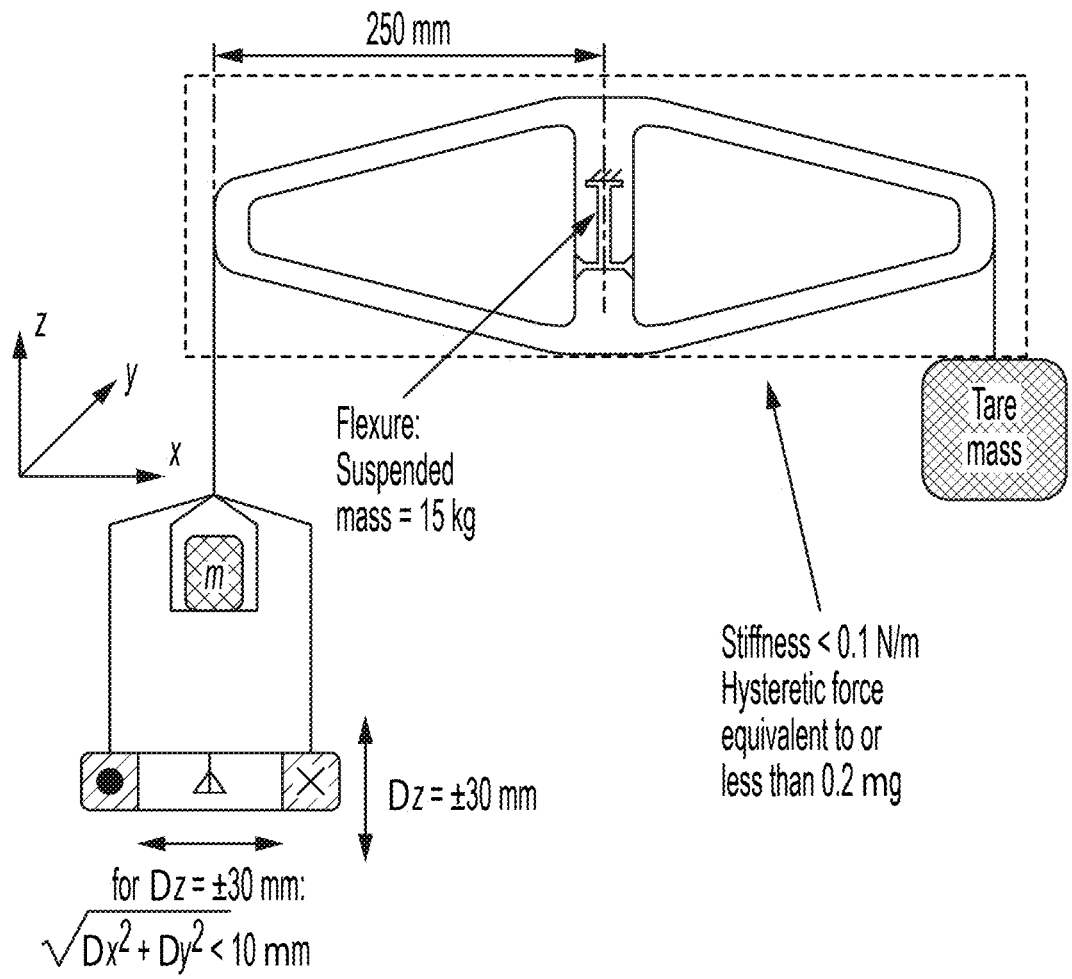
FIG. 31 shows, according to some embodiments, requirements to the mechanism in the Kibble balance of the QEMMS.

The coil speed in the velocity mode is measured with a heterodyne interferometer reflecting a laser beam off of a retroreflector that is attached to the moving coil (see FIG. 29). The most basic criterion to run a measurement in the velocity mode is that the interference detector does not lose the beam signal in the sweeping phase. The laser beam of the interferometer needs to be fully reflected. Horizontal displacements and imperfections of the trajectory from the vertical can cause the beam to be clipped. However, before clipping the beam, other impacts to the measurement occur due to imperfections in the coil trajectory from the vertical. Limiting the explanations to the x-direction, these are proportional to the term $v_x/v_z$, where $v_x$ is a horizontal and $v_z$ is the vertical coil velocity. For all, the figure of merit is $v_x/v_z = \Delta x / \Delta z \approx 1.67 \times 10^{-4}$ Low Hysteretic Force Non-linearities from mechanical hysteresis can be a problem in Kibble balances. If hysteresis is too large, then a precise measurement cannot be done because the this is a limitation in the resolution of the balance.

The magnitude of a hysteretic force in general depends on the load to the pivots and on excitations of the balance, e.g., due to a response of the balance during a mass transfer or the mechanism movement during the velocity mode. There are two general ways to reduce hysteretic forces in balances: (1) Minimizing the excursion during mass placement by adjusting mass lift speed and by optimizing feedback control. (2) Using an erasing procedure where the center pivot point is exercised in a damped sinusoidal motion after each excursion of the balance. However, a small part of hysteresis remains in the system. The goal is to have a remaining hysteretic loss in the mechanism equivalent to 0.1 µg.

The cause and magnitude of a hysteretic force is also driven by the type of mechanism used in the balance. All balance mechanisms can be divided based on their type of center pivot into two groups: knife edge based and flexure pivot-based balances. In the QEMMS mechanism, flexure pivots will be employed.

The main advantage of a flexure over a knife edge with regards to hysteresis is that in the flexure only elastic deformation contributes to this effect, whereas in a knife edge elastic and plastic deformation need to be considered.

After a change in the load and a deflection, a flexure shows anelastic behavior because it takes time to relax back to its internal equilibrium state. Despite the similarities to the knife edge, the hysteretic forces in a flexure are known to be smaller.

Note also that all published anelasticity data concerning flexures in precision balances were gathered using mass comparators which basically only use the weighing mode. The anelastic characteristic of flexures was never shown in Kibble balances where the weighing and the velocity mode are both performed by a single flexure mechanism. Conducting a series of experiments is necessary to learn about this effect because it cannot be quantitatively pre-determined during the design process. Unfortunately, theoretical calculation or simulation cannot provide quantitative knowledge regarding hysteretic forces because theories on this topic are not very well developed or validated. There are only general design recommendations that can be applied for minimizing the amount of anelasticity in flexures, for example: (1) designing the flexure as thin as possible in the region of bending, (2) designing it long and (3) using a flexure material with low internal damping coefficient. These recommendations minimize the geometric and elastic part of the stiffness, the internal material friction and therefore the energy stored and dissipated in the flexure during deflection.

Carrying Capacity and Installation Space

The central pivot in the QEMMS mechanism needs to support a total load of 15 kg. Furthermore, with this load it must be capable of rotating by ±7 to provide the desired ±30 mm of vertical travel, assuming the maximum dimension of a beam/wheel limited by the maximum installation space in QEMMS. Since the Kibble balance in QEMMS is designed to be similar in size to commercial high precision vacuum mass comparators, we allow for a maximum horizontal dimension of the mechanism of ≈500 mm. This limits the maximum dimension of one beam or wheel arm in the balance to 250 mm considering symmetric balance design. Also, the mechanism itself needs to be as compact as possible to keep free space for optical systems and a mass exchange unit in the vacuum chamber. The sensitivity of a balance scales as the square of the balance arm. Hence it should be as large as is practically allowed.

Design of the QEMMS Mechanism

Figure 32:
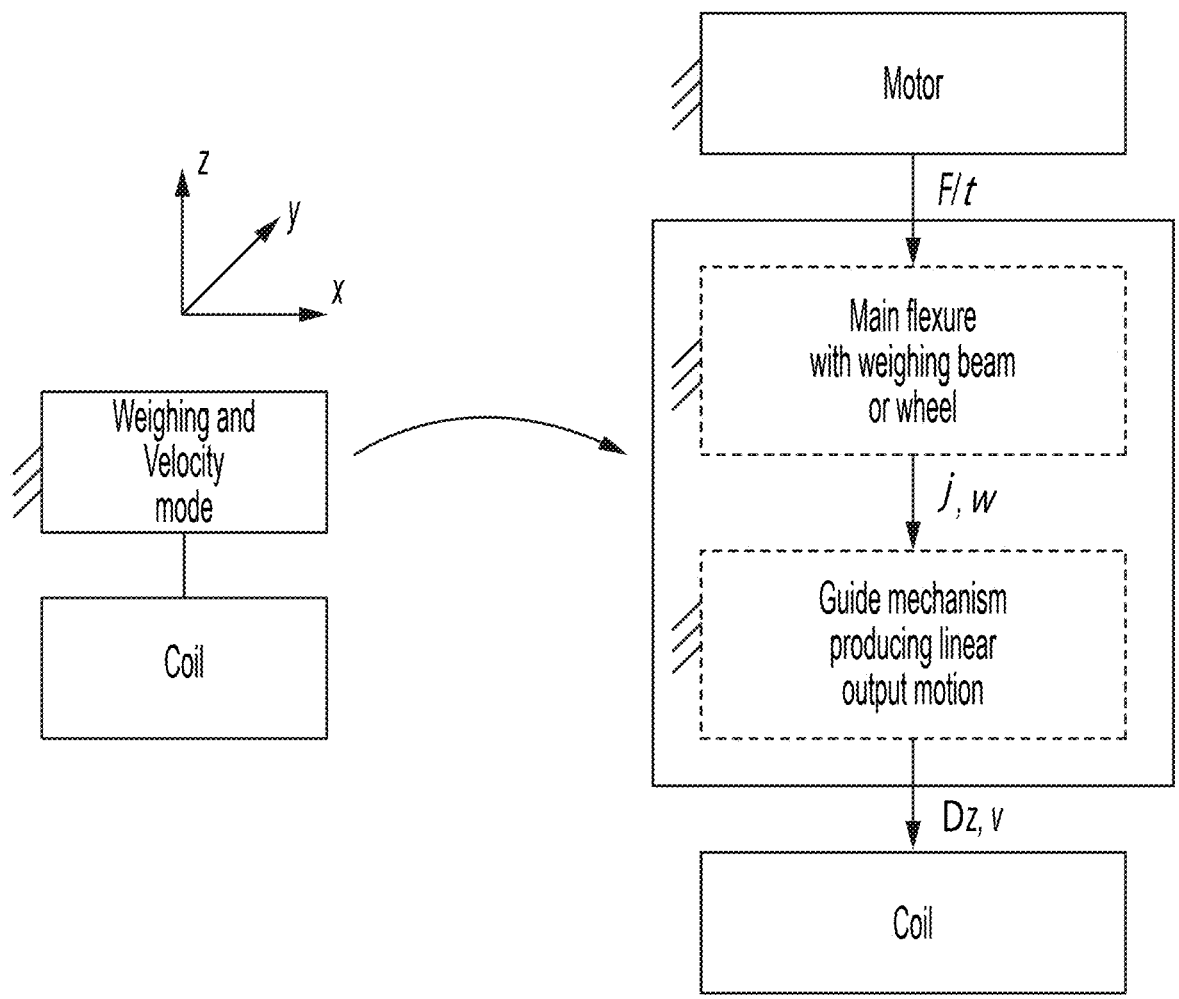
FIG. 32 shows, according to some embodiments, weighing and velocity functionality. The motor is indicated to show where a driving force/torque for the velocity mode is put into the mechanism. Here, F and T denote a force or torque applied to the mechanism by the motor used to move the coil in the velocity mode. Furthermore, (p and w are the deflection angle and angular velocity of the main pivot. Finally, Δz and v are the translational displacement and velocity of the coil in vertical direction constrained by a guiding mechanism FIG. 33 shows, according to some embodiments, finite element simulation of a conventional notch flexure with a notch radius of 3 mm and a flat flexure with a length of 3.25 mm. Both have a width of 10 mm and a minimal notch thickness of 0.05 mm. Boundary conditions: Each flexure is fixed supported at the left end and a rotation of 7 is induced at the nodes at the right end. A point mass of 15 kg, which mimics the weight of the balance components, is attached on the right end. The color bars show the results for the maximum equivalent stress in the geometry after deflection in MPa. In the flat flexure the high stress concentration is close to the right edge of the flat region.

A flexure-based mechanism design keeps the mechanical hysteresis in the QEMMS mechanism small and provides a repeatable movement. Furthermore, the new mechanism should be more compact, lighter, and require less auxiliary control features to define a one-dimensional coil trajectory than existing versions of Kibble balance mechanisms. Henceforth, we favor passive mechanical components built from flexure elements for defining the balance trajectory over auxiliary electrical components. FIG. 32 shows the separation of the QEMMS mechanism function in two sub-components integrated in a single mechanical system. One component is for balancing, the other one for defining a linear trajectory of the coil.

Main Flexure

The trade-off in the design of the main flexure is to keep the maximum stress in the flexure at the maximum deflection angle at an acceptable level. A safety factor of 2 to 3 is desired. Also, a low elastic flexure stiffness is recommended in order to reduce the anelastic effect in the flexure after deflection by design. This calls for a flexure as thin as possible.

Furthermore, a material with low internal damping/anelasticity must be used in order to avoid hysteretic effects upfront as much as possible. A metal with very high yield strength (>1000 MPa) and small anelastic after effect is a hardened Copper Beryllium alloy as used for flexures in balance experiments.

On the machining end, typically, wire electrical discharge machining, grinding, high speed milling or etching allow for minimal flexure thicknesses of ≈50 μm for notch flexures.

The main flexure needs to be carefully designed and analyzed by means of finite element analysis in order to evaluate stress and stiffness-reducing parameters in the flexure accurately. Especially the notch effect in the flexure due to the high axial load and high deflection needs to be investigated in more detail. Widely used hinge geometries such as flat, conventional circular or elliptical hinges show stress values in simulation that are too high (>1000 MPa) (see FIG. 33). Thus, other methods/parameters to reduce the stress in the flexure during operation need to be investigated.

Figure 33:
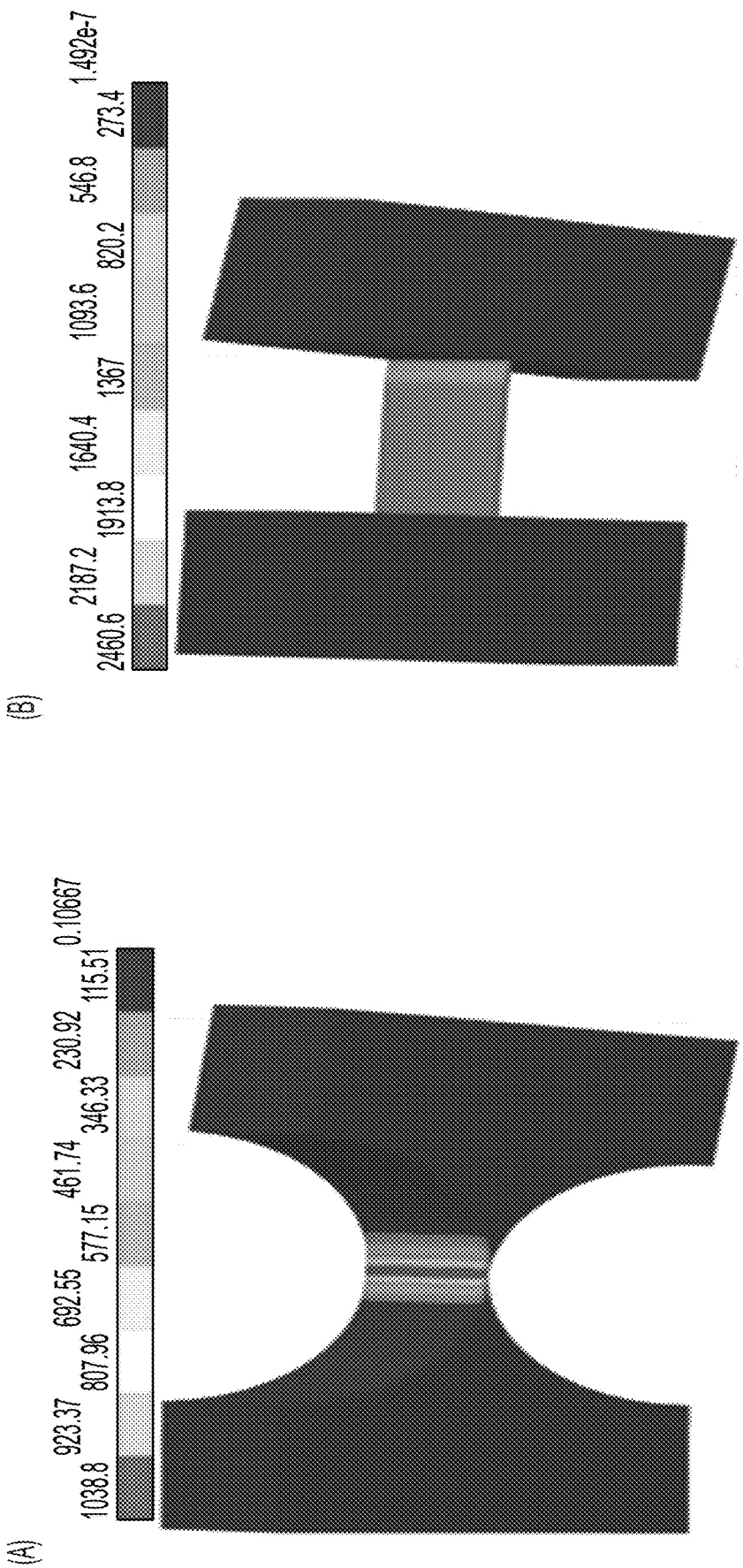
Figure 34:
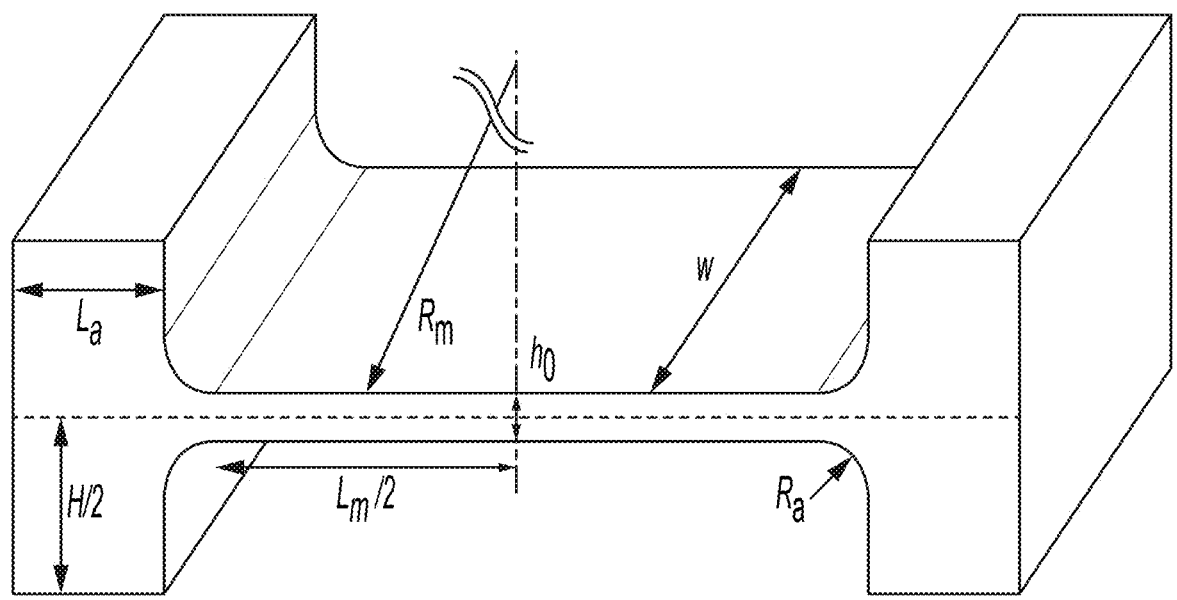
FIG. 34 shows, according to some embodiments, the modified flexure geometry. As opposed to a regular elliptical or circular flexure, the region of bending here has a very large radius $R_m$, with the characteristics of $R_m \gg L_m$. It has a minimal notch height $h_0$ and a width w. $R_a$ smoothens the transition from the bending region to the stiff part of the notch flexure.

Since a stress reduction from a flat to a circular flexure due to a reduction of the notch effect can be derived from FIG. 33, we explore a modified flexure geometry that provides us with a compromise between a flat and a circular hinge. The modified geometry is shown in FIG. 34.

Figure 35:
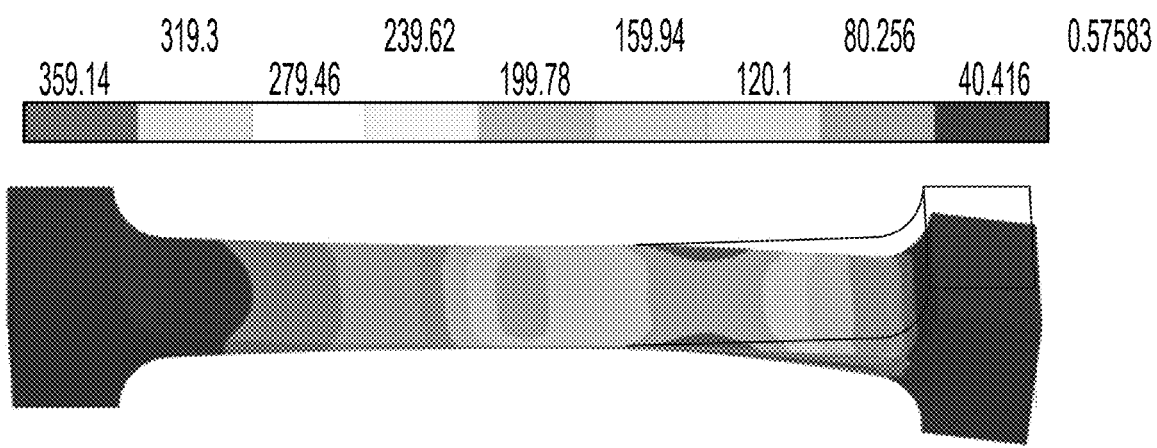
FIG. 35 shows, according to some embodiments, finite element analysis stress plot of a representative of the modified geometry. The parameters are $R_m$=200 mm, $L_m$=20 mm, $R_a$=1.5 mm, $L_a$=3 mm, H=5 mm, w=10 mm, and $h_0$=0.05 mm. Boundary conditions are the same as in FIG. 6. The color bars show the results for the maximum equivalent stress in the material after deflection in MPa. The geometry reduces the stress in the material down to 36% of the tensile strength.

A parameter study on the modified geometry based on finite element analysis was conducted, and a possible representative for a flexure geometry with sufficient properties for application in the QEMMS mechanism is shown in FIG. 35.

Kinematics

In addition to the main pivot, a sub-mechanism for guiding with a proper link to the main flexure completes the kinematics of the balance. Examples, where a guiding mechanism is combined and linked with a balance beam can, be found in, e.g., commercial weighing cells from Sartorius AG and in the Planck balance at Physikalisch-Technische Bundesanstalt (PTB). An approach for an integrated design of main flexure and guiding mechanism in a parallel four bar linkage was used at NIST for electrostatic force balance experiments. The mechanisms can show a systematic arc motion caused by the use of a parallel four bar linkage for guiding and use only small travel ranges on the order of micrometers during operation. Thus, these concepts can inspire a new design, but may not be directly used in the QEMMS due to the requirement for purely vertical motion of the coil over a relatively large travel. Other options for building flexure based guiding mechanisms providing a linear motion need to be explored.

Since a single flexure hinge is always a rotating pivot, only a chain of multiple hinges can provide a (nearly) linear motion of a moving member. Such principles are, e.g., the design of parallel or serial kinematic structures, or applying nested or external linkage structures to avoid under-constraint in a mechanism. An example based on a planar parallelogram linkage is provided in FIG. 39.

Figure 36:
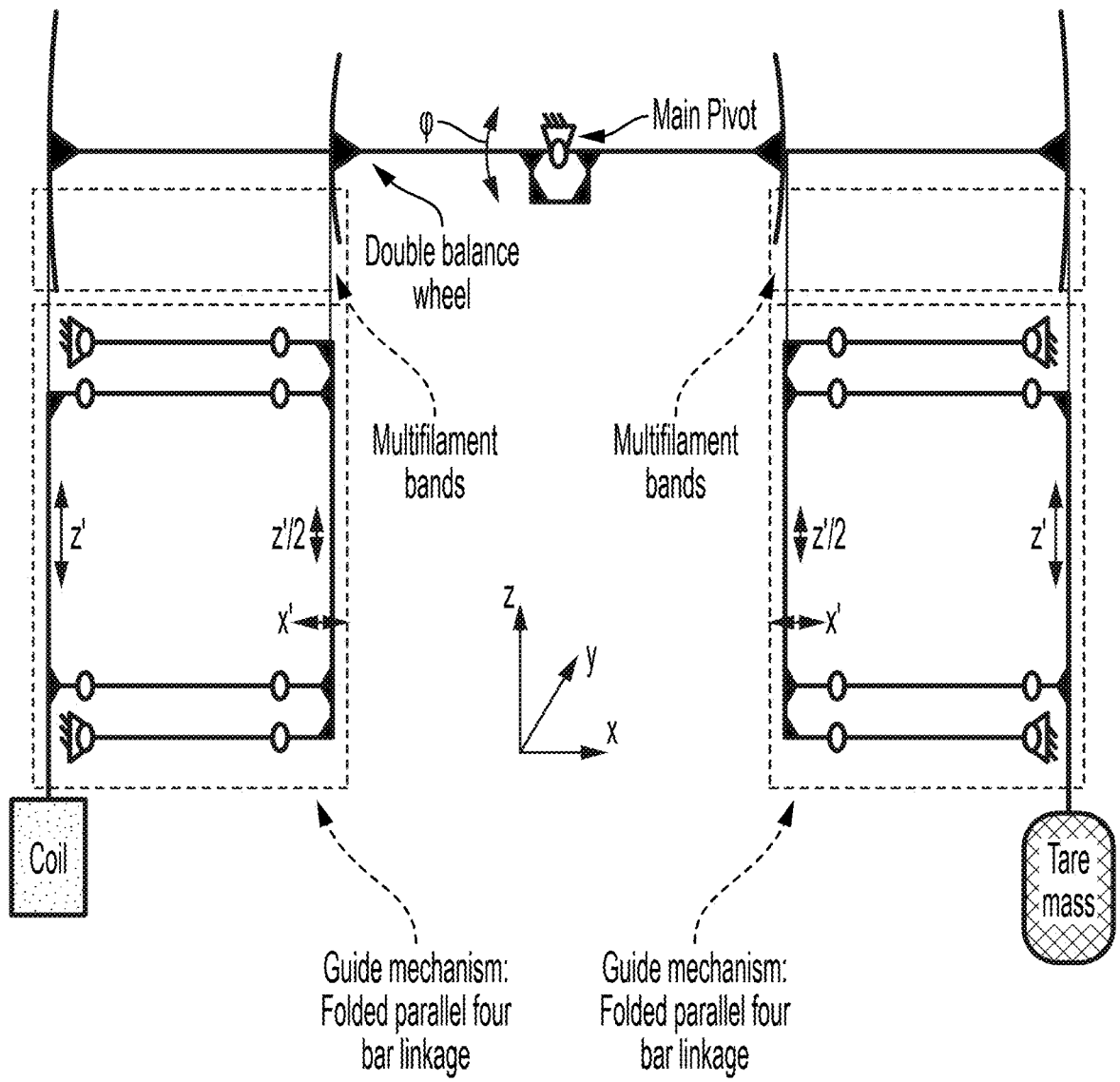
FIG. 36 shows, according to some embodiments, kinematics for the QEMMS mechanism. The principle of operation is based on a symmetric folded parallelogram linkage with external linkage. The drawing shows a representation of a wheel balance where bands roll off two wheels at the balancing structure. The wheels and bands can technically be switched with connecting flexures to create a beam balance-based mechanism. Note that the dimensions are not in scale with the optimal design.

However, due to simplicity, correction of lateral error motions, compactness, and the convenience in machining of a planar flexure mechanism, we favor the folded parallelogram linkage as a guiding mechanism for the QEMMS. We will integrate a weighing beam/wheel as the external linkage as shown in option (4.2) in FIG. 39 and use this directly as a link to the main flexure. A visualization of the kinematic system for the QEMMS mechanism is shown in FIG. 36.

Beam Balance Vs. Wheel Balance

Figure 40:
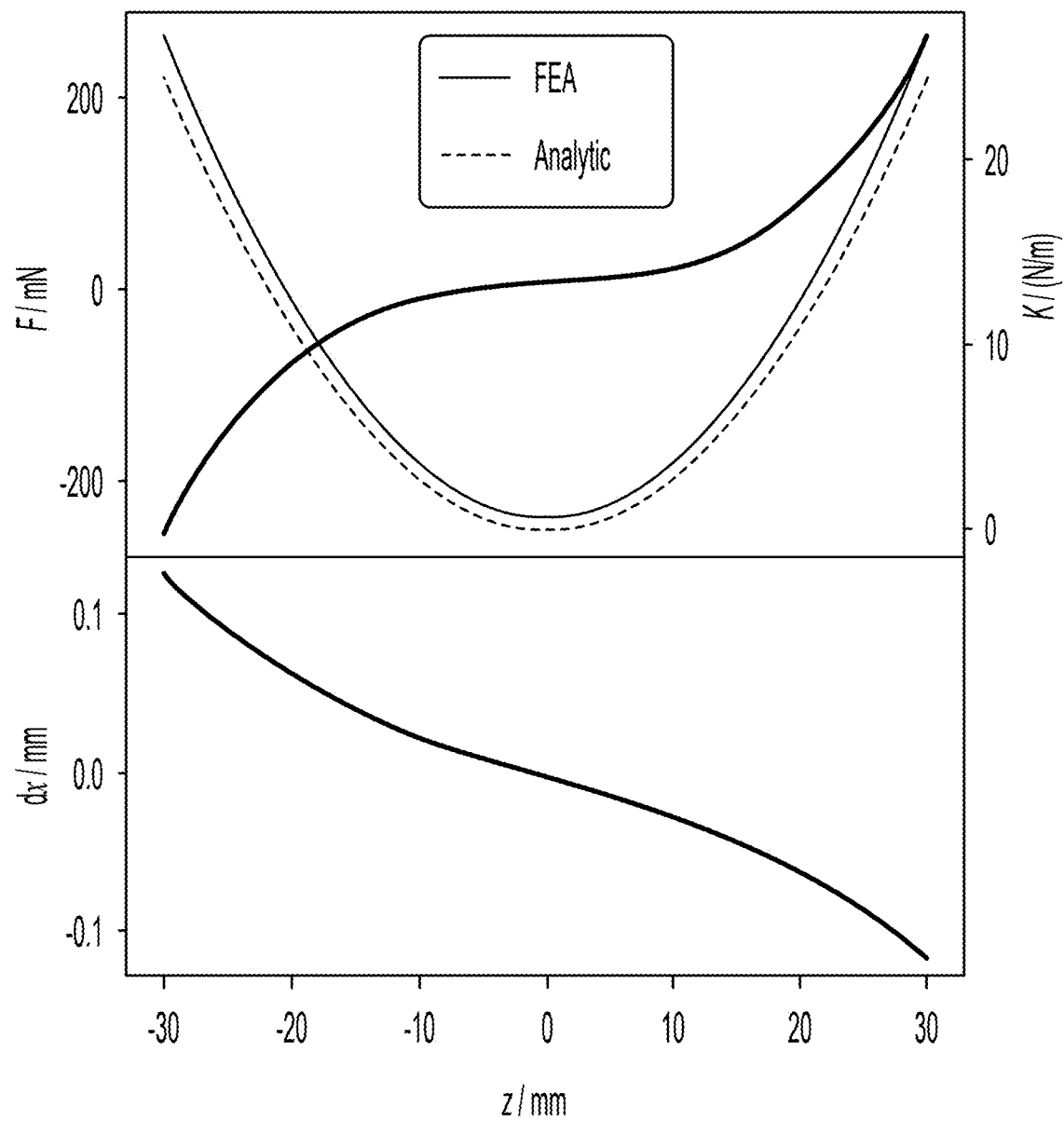
FIG. 40 shows, according to some embodiments, results of a finite element analysis (FEA) at a beam balance model of the QEMMS mechanism. Upper plot: the left axis shows a third order fit of the displacement force and the right axis the derived stiffness along the vertical (z) displacement axis. The solid lines are from finite element analysis and the dashed line is from the analytical model for the mechanism stiffness.

There is a fundamental difference between the kinematics of the two balance types. The end points of the beam balance perform a rotational motion along a fixed circle. Only by the use of a further guiding mechanism, the movement of suspended components can take place parallel to the vector of gravity as shown in FIG. 40.

In contrast, with the wheel balance, a rolling of a band on the wheel is performed. This results, in theory, in a direct conversion of a rotational movement of the wheel into a linear displacement of suspended components parallel to the vector of the gravitational force. In order to achieve a further improvement in the quality of the linear motion and to avoid unwanted oscillations, a guiding mechanism as shown in FIG. 36 can be used. The resulting over constrained design can be dealt with by adjustment.

At first glance, this difference in use of a beam to a wheel balance seems to be negligible for application in a balance. Indeed, in a mass comparator, where the mechanism operates closely around its defined zero position, there is no theoretical functional advantage to either solution. All parasitic effects in the kinematics are small due to small deflections of the flexures. Convenience in machining and assembling of small planar (sometimes monolithic) mechanisms seems to be causing the favor for beam balances here.

However, with the large travel required in the QEMMS, not all of the usually negligible effects in the mechanism remain harmless to the mechanical properties of the instrument. In fact, there is one impact that causes a major disadvantage of a beam balance compared to a wheel balance from a kinetic perspective: there is a horizontal force acting upon the connecting links between the guiding mechanism and the beam when the effective horizontal length of the balance beam shortens by the cosine of the deflection angle.

This results in a non-linear stiffness term and parasitic forces to the guiding mechanism which cause unwanted deformations and error motions in the guide.

Modular Design

Figure 37:
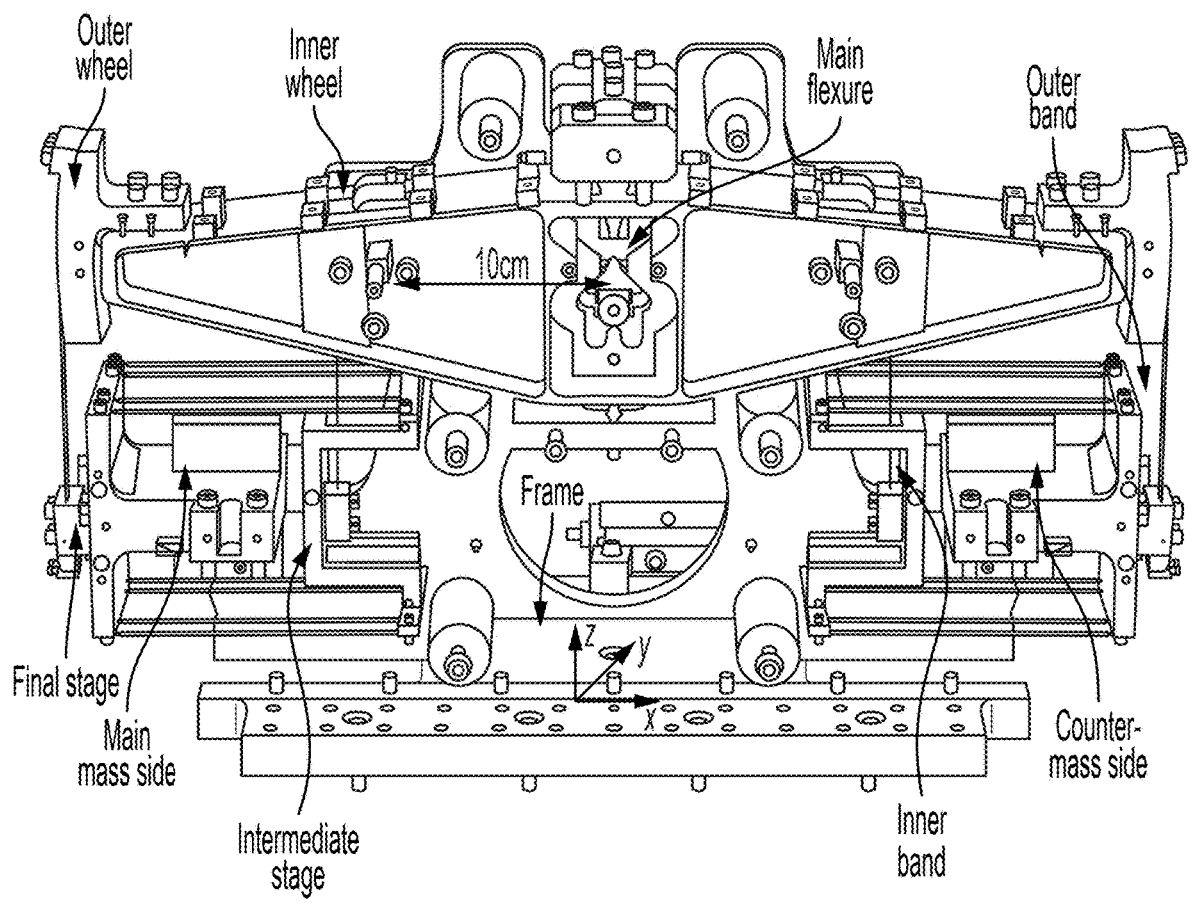
FIG. 37 shows, according to some embodiments, moveable parts of the QEMMS mechanism.

The mechanism has been designed based on a wheel balance and a rendering of the frame and the moving parts can be seen in FIG. 37. We favor a prototype of modular built to allow for variation of single components in experiments. Interesting elements for variation would be, e.g., the main flexure or the guiding mechanism flexures with view on the hysteretic properties of the mechanism or the guiding quality of the compliant structure.

The wheels are designed with wheel parts that are positioned and bolted down on a carrier beam structure. Multifilament bands are clamped, roll off the wheel surfaces and connect the intermediate and final stages of the guiding mechanisms with the inner and outer wheel.

The modular design furthermore provides us with the opportunity to methodically investigate the effect of certain misalignments to the movement and hysteretic properties of the QEMMS mechanism. This helps to further clarify which design parameters matter not just from a theoretical, but from a practical point of view and highlights practical requirements to precision in assembling.

Voltage Bias

Horizontal velocities also cause a bias $e_V$ in the readouts of the induced voltage in the velocity mode. This stems from both horizontal forces $F_x$ to the coil produced in the weighing mode—basically when the electrical center of the coil is not aligned with the magnetic center of the permanent magnet—and horizontal velocities in the velocity mode. The relative bias is expressed as follows $$e_V = \frac{F_x}{F_z}\frac{\Delta x}{\Delta z}, \qquad (5)$$

where $F_z$ is the force applied in the vertical direction by the magnet-coil system in weighing mode. The factor $F_x/F_z$ is typically on the order of $1\times10^{-5}$, thus this bias yields $e_V=1.7\times10^{-9}$. However, this effect can be cancelled when employing a balance mechanism that performs the exact same motion in the weighing and the velocity mode, which is the goal for the QEMMS mechanism.

Beam Shear Bias

A contribution to a bias in the velocity mode is the beam shear error $e_{BS}$ in the interferometer. It occurs when the coil moves horizontally and the back-reflected interferometer beam gets displaced horizontally such that there is change in overlap between the reference beam and the beam reflected off of the moving retroreflector at the coil. The important values here are the wavelength of the laser, $\lambda$, the wave distortion at the optics—we assume $\lambda/10$—the beam shear/horizontal coil motion, $\Delta x$, and the diameter of the laser beam in the interferometer, $d_{Beam}$. The equation for this relative bias is $$e_{BS} = \frac{\lambda}{10}\frac{2}{d_{Beam}}\frac{\Delta x}{\Delta z}. \qquad (6)$$

The wavelength of the laser is $\lambda=633$ nm with a beam diameter of $d_{Beam}=6$ mm which yields a correction of $e_{BS}=3.52\times10^{-9}$.

Velocity Bias

Another measurement bias, $e_v$, comes from horizontal velocities during the velocity mode. These are derived from a misalignment of the interferometer with respect to gravity, $\alpha$, and from the horizontal motion, $\Delta x$, along the vertical coil travel $\Delta z$. The equation for the correction is $$e_v = \alpha\frac{\Delta x}{\Delta z}. \qquad (7)$$

Assuming a reasonable value $\alpha=45$ μrad, we get a relative measurement bias of $e_v=7.5\times10^{-9}$, which is on the order of magnitude we desire to have.

Figure 38:
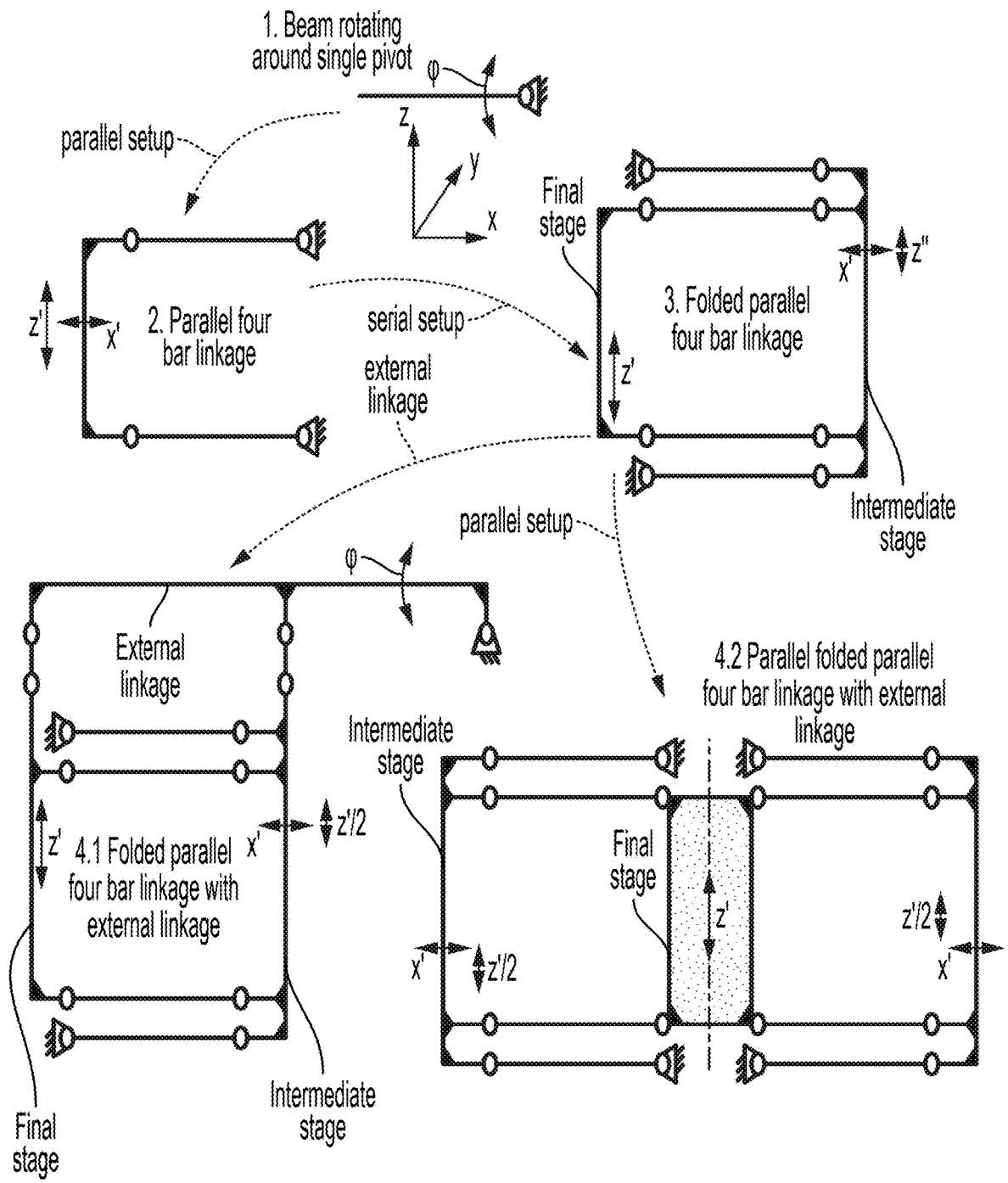
FIG. 38 shows, according to some embodiments, in first approximation, flexure mechanisms can be modelled with rigid links connected to rotational pivots. This diagram shows an example for the correction of unwanted motions in the kinematic structure of mechanisms consisting of rotational joints. Starting with a purely rotational joint (1.) and ending with a linear motion provided by a chain of rotational joints, (4.1) and (4.2). The principles of serial and parallel setup of pivots as well as an external linkage are applied.

FIG. 38 explains design principles to correct for motion imperfections in kinematic chains transitioning from a purely rotational to a purely translational motion of a moving member in a mechanism.

A purely rotational motion (1.) is turned into a quasi-linear motion of a plane with a systematic horizontal part (x) through parallel setup of two beams as in a parallel four bar linkage (2.). Now we can use a serial (folded) chain of these linkages. By moving (z") half the distance of (z') we can correct for the parasitic horizontal part of the motion in the final stage. However, this is a movable system with two degrees of freedom, where the movement of the intermediate stage on the right (z") is not coupled to the final stage on the left (z) (3.). Furthermore, if the equation z"=2z' is not fulfilled here, there is going to be a certain x' in the final trajectory. In a final step, applying an external linkage (4.1) or parallel setup (4.2) we can constrain the motion to a single degree of freedom, as long as the condition z"=2z' is fulfilled by design.

Figure 39:
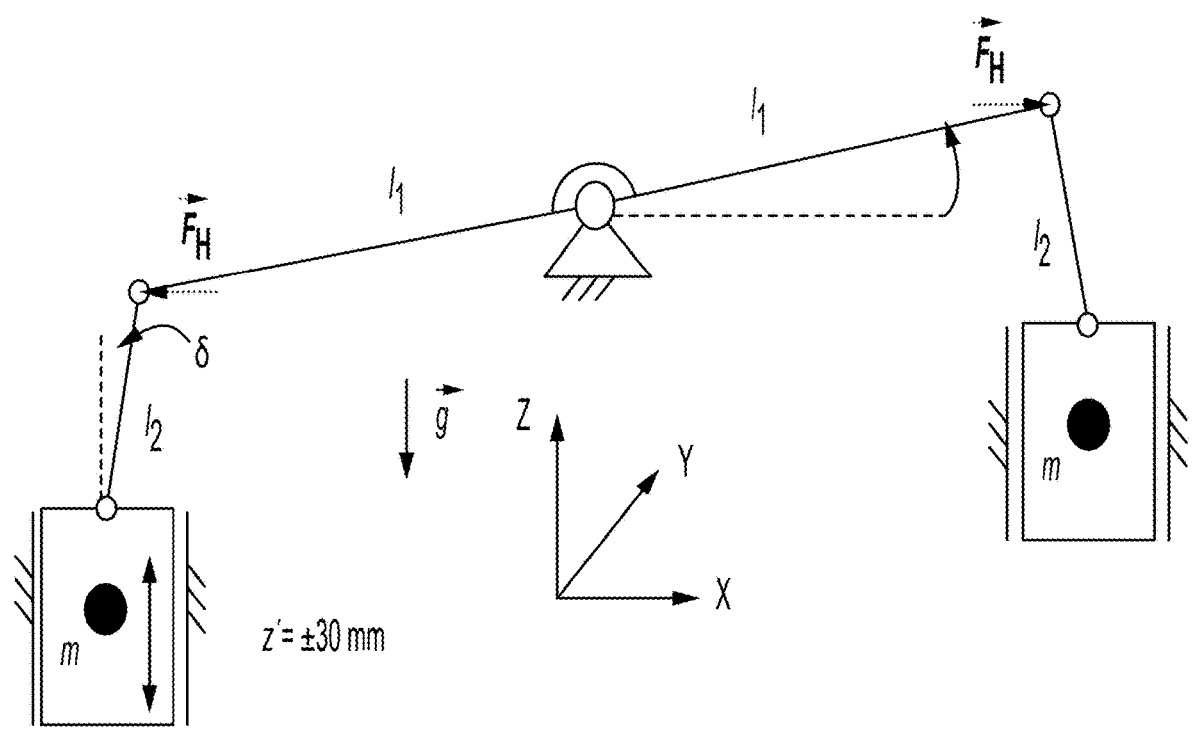
FIG. 39 shows, according to some embodiments, model of a beam balance combined with guiding mechanisms on both sides.

We derive the non-linear stiffness from the simplified model of a beam balance connected with a guiding mechanism on both sides in FIG. 39.

The horizontal force $F_H$ depending on the rotational deflection φ is described with $$F_H(\varphi) = mg\frac{l_1}{l_2}\frac{\varphi^2}{2}, \qquad (8)$$

truncating the Taylor approximations for sine and cosine after the second order term.

The lever arm z'=l1 φ introduces a moment MH(φ) through each side of the beam according to $$M_H(\varphi) = mg\frac{l_1^2}{l_2}\varphi^3, \qquad (9)$$

which points out a third order dependency of the induced moment on the deflection angle φ.

For simplification, we assume that we compensate a constant, elastic part of the flexure stiffness in the mechanism entirely by using, e.g., an inverted pendulum. Building the derivative of the previous equation due to φ yields the non-linear rotational stiffness term induced by the parasitic horizontal force $F_H$ $$K = \frac{dM}{d\varphi} = 3\ mg\frac{l_1^2}{l_2}\varphi^2. \qquad (10)$$

Figure 41:
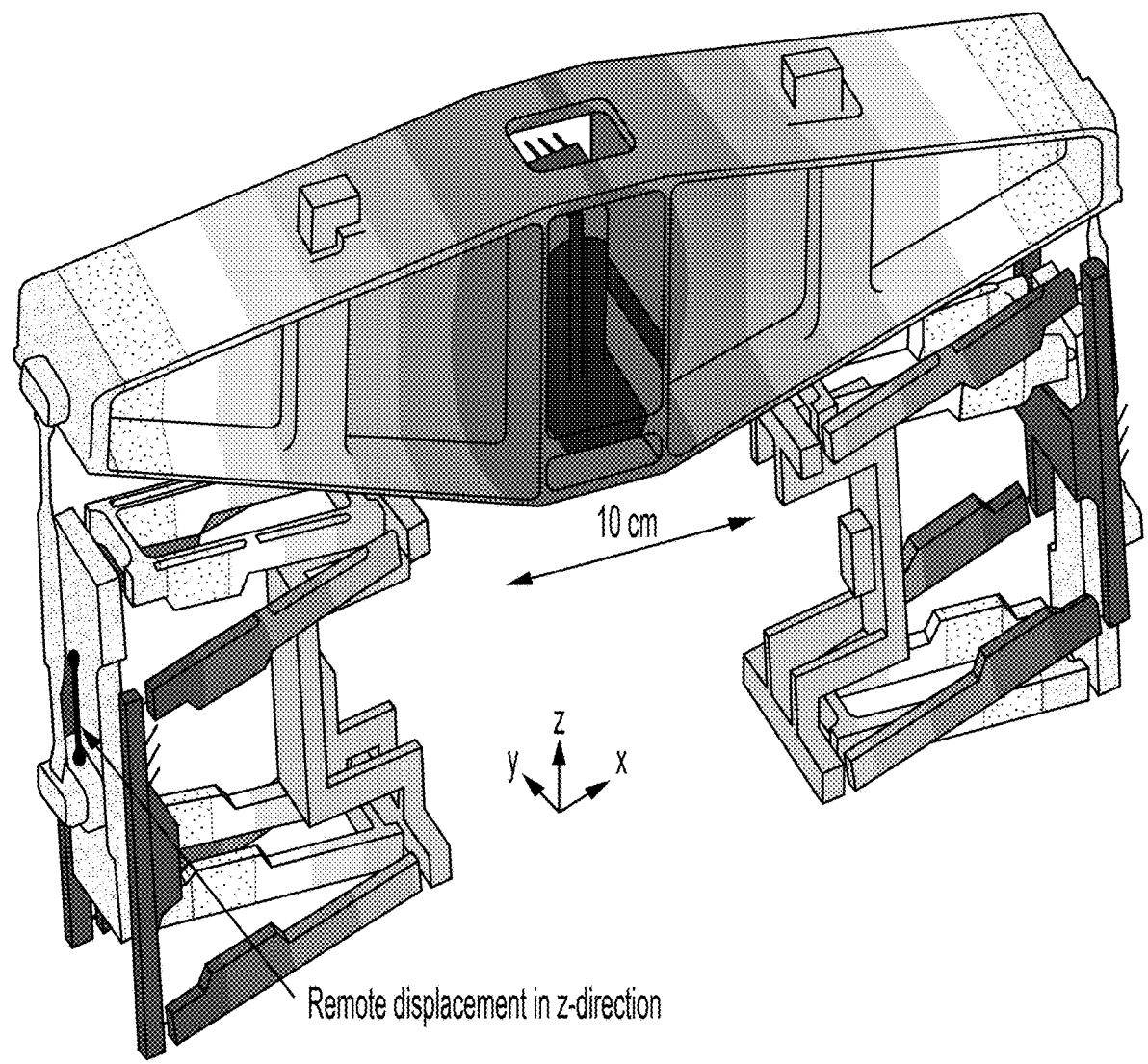
FIG. 41 shows, according to some embodiments, Total deformation plot of a finite element analysis at the beam balance model for the QEMMS mechanism.

This term can be highly dominant with larger deflections as can be seen in the upper plot in FIG. 41. With reasonable values for the system parameters shown in FIG. 40, a study at a simplified beam balance-based mechanism model using finite element analysis was conducted. FIG. 41 shows the model and boundary conditions.

The force over displacement curve of the final stage of the mechanism was monitored and compared to the analytical model. The rotational stiffness in equation 10 can be transferred to a linear stiffness at the guiding mechanism in vertical direction by dividing equation 10 by the square of the balance lever arm $l^2$. Furthermore, $\varphi \approx \Delta z/l_1$.

The processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware, or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Any logical blocks, modules, and algorithm elements described or used in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described or used in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

PARTS LIST dual-truncated wheel Kibble balance 200
stationary frame 201
central flexural bridge 202
double balance wheel 203
outer connector band 204/outer connector bands 204
guide member 205/guide members 205
coil 206
tare mass 207
outer truncated wheel 208
inner truncated wheel 209 outer wheel radius 210
inner wheel radius 211
encoder 212
base plate 213
lever bar 214
outer wheel head 215
outer peripheral radial surface 216
inner wheel head 217
inner peripheral radial surface 218
stationary point of attachment 219
flexible filament 220/flexible filaments 220
outer wheel connector end 221
outer guide connector end 222
inner wheel connector end 223
inner guide connector end 224
inner connector band 225/inner connector bands 225
translational cord 226
lateral connector 227/lateral connectors 227
guide flexural member 228/guide flexural members 228
final stage 229
intermediate stage 230
fastener 231
flexure sheet 232/flexure sheets 232
measurement mass arm 249
reference force arm 250
determining absolute mass/determines absolute mass

What is claimed is:

1. A dual-truncated wheel Kibble balance for determining absolute mass, the dual-truncated wheel Kibble balance comprising:
a stationary frame that provides a stationary point of attachment:
for displacement motion of a measurement mass arm and a reference force arm relative to the stationary frame, and
for pivotal motion of a double balance wheel relative to the stationary frame;
the double balance wheel in mechanical communication with the stationary frame at the stationary point of attachment to the stationary frame and that pivots about the stationary point of attachment to the stationary frame, such that the double balance wheel is suspended from the stationary frame by a central flexural bridge that is mechanically interposed between the double balance wheel and the stationary frame, so that the double balance wheel pivotally moves via the central flexural bridge to restore mass balance between the measurement mass arm and the reference force arm, the double balance wheel comprising:
a lever bar disposed on and opposing the stationary frame and in pivotal communication with the stationary frame via the central flexural bridge;
an outer truncated wheel disposed on the lever bar at an outer wheel radius and comprising: a first outer wheel head and a second outer wheel head, such that each outer wheel head comprises an outer peripheral radial surface arranged at the outer wheel radius;
an inner truncated wheel disposed on the lever bar at an inner wheel radius and comprising: a first inner wheel head and a second inner wheel head, such that each inner wheel head comprises an inner peripheral radial surface arranged at the inner wheel radius, and the inner truncated wheel is circumscribed by the outer truncated wheel with the outer wheel radius greater than the inner wheel radius;
the central flexural bridge in mechanical communication with the stationary frame and the double balance wheel, such that the central flexural bridge is: interposed between the stationary frame and the double balance wheel, interconnects the stationary frame and the double balance wheel, and flexes in response to pivotal motion of the double balance wheel relative to the stationary frame;
a first outer connector band disposed on the first outer wheel head at the outer peripheral radial surface, such that the first outer connector band is gravitationally suspended from the first outer wheel head and mechanically interconnects the first outer wheel head and a first guide member to synchronize the rotation of the outer truncated wheel and vertical linear motion of the first guide member and constrains motion of the first outer wheel head and the first guide member to one degree of freedom;
a second outer connector band disposed on the second outer wheel head at the outer peripheral radial surface, such that the second outer connector band is gravitationally suspended from the second outer wheel head and mechanically interconnects the second outer wheel head and a second guide member to synchronize the rotation of the outer truncated wheel and vertical linear motion of the second guide member and constrains motion of the second outer wheel head and the second guide member to one degree of freedom;
a first inner connector band disposed on the first inner wheel head at the inner peripheral radial surface, such that the first inner connector band is gravitationally suspended from the first inner wheel head and mechanically interconnects the first inner wheel head and the first guide member to synchronize the rotation of the inner truncated wheel and vertical linear motion of the first guide member and constrains motion of the first inner wheel head and the first guide member to one degree of freedom;
a second inner connector band disposed on the second inner wheel head at the inner peripheral radial surface, such that the second inner connector band is gravitationally suspended from the second inner wheel head and mechanically interconnects the second inner wheel head and the second guide member to synchronize the rotation of the inner truncated wheel and vertical linear motion of the second guide member and constrains motion of the second inner wheel head and the second guide member to one degree of freedom;
the first guide member in mechanical communication with the first outer wheel head and the first inner wheel head; and
the second guide member in mechanical communication with the second outer wheel head and the second inner wheel head.

2. The dual-truncated wheel Kibble balance of claim 1, wherein the first guide member comprises:
a final stage disposed on the first outer connector band;
an intermediate stage disposed on the first inner connector band;
a plurality of lateral connectors, such that some of the lateral connectors interconnect the final stage and the intermediate stage, and some of the lateral connectors interconnect the intermediate stage and the stationary frame; and
a plurality of guide flexural members, such that the lateral connectors interconnect the final stage and the intermediate stage via guide flexural members; the lateral connectors interconnect the intermediate stage and the stationary frame via guide flexural members; the final stage is disposed on the first outer connector band via at least one guide flexural member, and the intermediate stage is disposed on the first inner connector band via at least one guide flexural member.

3. The dual-truncated wheel Kibble balance of claim 1, wherein the second guide member comprises:
a final stage disposed on the second outer connector band;
an intermediate stage disposed on the second inner connector band;
a plurality of lateral connectors, such that some of the lateral connectors interconnect the final stage and the intermediate stage, and some of the lateral connectors interconnect the intermediate stage and the stationary frame; and
a plurality of guide flexural members, such that lateral connectors interconnect the final stage and the intermediate stage via guide flexural members;
lateral connectors interconnect the intermediate stage and the stationary frame via guide flexural members; the final stage is disposed on the second outer connector band via at least one guide flexural member, and the intermediate stage is disposed on the second inner connector band via at least one guide flexural member.

4. The dual-truncated wheel Kibble balance of claim 1, further comprising the measurement mass arm and the reference force arm.

5. The dual-truncated wheel Kibble balance of claim 4, further comprising a translational cord in mechanical communication with the first guide member and the measurement mass arm, such that the translational cord is interposed between the first guide member and the measurement mass arm, interconnects the first guide member and the measurement mass arm, and linearly translates the measurement mass arm parallel to earth's gravitational field in response to pivotal motion of the double balance wheel relative to the stationary frame.

6. The dual-truncated wheel Kibble balance of claim 4, further comprising a translational cord in mechanical communication with the second guide member and the reference force arm, such that the translational cord is interposed between the second guide member and the reference force arm, interconnects the second guide member and the reference force arm, and linearly translates the reference force arm parallel to earth's gravitational field in response to pivotal motion of the double balance wheel relative to the stationary frame.

7. The dual-truncated wheel Kibble balance of claim 4, wherein the measurement mass arm comprises a coil in mechanical communication with the first guide member.

8. The dual-truncated wheel Kibble balance of claim 7, wherein the coil linearly reciprocates parallel to the gravitational force of the earth in response to pivotal motion of the double balance wheel.

9. The dual-truncated wheel Kibble balance of claim 4, wherein the reference force arm comprises a tare mass in mechanical communication with the second guide member.

10. The dual-truncated wheel Kibble balance of claim 9, wherein the tare mass linearly reciprocates parallel to the gravitational force of the earth in response to pivotal motion of the double balance wheel.

11. The dual-truncated wheel Kibble balance of claim 1, wherein the outer connector band comprises: an outer wheel connector end, an outer guide connector end, and a plurality of flexible filaments that extend from the outer wheel connector end to the outer guide connector end.

12. The dual-truncated wheel Kibble balance of claim 1, wherein the inner connector band comprises: an inner wheel connector end, an inner guide connector end, and a plurality of flexible filaments that extend from the inner wheel connector end to the inner guide connector end.

13. A dual-truncated wheel Kibble balance for determining absolute mass, the dual-truncated wheel Kibble balance comprising:
a stationary frame;
a double balance wheel disposed on the stationary frame;
a pair of guide members, such that one of the guide members is disposed on each opposing end of the double balance wheel;
a plurality of outer connector bands, such that each guide member is gravitationally suspended from the double balance wheel by at least one of the outer connector bands;
a plurality of inner connector bands, such that each guide member is gravitationally suspended from the double balance wheel by at least one of the inner connector bands; and
a central flexural bridge in mechanical communication with the stationary frame and the double balance wheel, such that the central flexural bridge is: interposed between the stationary frame and the double balance wheel, interconnects the stationary frame and the double balance wheel, and flexes in response to pivotal motion of the double balance wheel relative to the stationary frame
wherein the double balance wheel comprises:
a lever bar disposed on and opposing the stationary frame and in pivotal communication with the stationary frame via the central flexural bridge;
an outer truncated wheel disposed on the lever bar at an outer wheel radius and comprising: a first outer wheel head and a second outer wheel head, such that each outer wheel head comprises an outer peripheral radial surface arranged at the outer wheel radius; and
an inner truncated wheel disposed on the lever bar at an inner wheel radius and comprising: a first inner wheel head and a second inner wheel head, such that each inner wheel head comprises an inner peripheral radial surface arranged at the inner wheel radius, and the inner truncated wheel is circumscribed by the outer truncated wheel with the outer wheel radius greater than the inner wheel radius.

14. The dual-truncated wheel Kibble balance of claim 13, wherein the plurality of outer connector bands comprises:
a first outer connector band disposed on the first outer wheel head at the outer peripheral radial surface, such that the first outer connector band is gravitationally suspended from the first outer wheel head and mechanically interconnects the first outer wheel head and a first guide member to synchronize the rotation of the outer truncated wheel and vertical linear motion of the first guide member and constrains motion of the first outer wheel head and the first guide member to one degree of freedom; and
a second outer connector band disposed on the second outer wheel head at the outer peripheral radial surface, such that the second outer connector band is gravitationally suspended from the second outer wheel head and mechanically interconnects the second outer wheel head and a second guide member to synchronize the rotation of the outer truncated wheel and vertical linear motion of the second guide member and constrains motion of the second outer wheel head and the second guide member to one degree of freedom.

15. The dual-truncated wheel Kibble balance of claim 14, wherein the plurality of inner connector bands comprises:
- a first inner connector band disposed on the first inner wheel head at the inner peripheral radial surface, such that the first inner connector band is gravitationally suspended from the first inner wheel head and mechanically interconnects the first inner wheel head and the first guide member to synchronize the rotation of the inner truncated wheel and vertical linear motion of the first guide member and constrains motion of the first inner wheel head and the first guide member to one degree of freedom; and
- a second inner connector band disposed on the second inner wheel head at the inner peripheral radial surface, such that the second inner connector band is gravitationally suspended from the second inner wheel head and mechanically interconnects the second inner wheel head and the second guide member to synchronize the rotation of the inner truncated wheel and vertical linear motion of the second guide member and constrains motion of the second inner wheel head and the second guide member to one degree of freedom.

16. The dual-truncated wheel Kibble balance of claim 15, wherein the guide members comprise:
- a first guide member in mechanical communication with the first outer wheel head and the first inner wheel head; and
- a second guide member in mechanical communication with the second outer wheel head and the second inner wheel head.

17. The dual-truncated wheel Kibble balance of claim 16, wherein the first guide member comprises:
- a final stage disposed on the first outer connector band;
- an intermediate stage disposed on the first inner connector band;
- a plurality of lateral connectors, such that some of the lateral connectors interconnect the final stage and the intermediate stage, and some of the lateral connectors interconnect the intermediate stage and the stationary frame; and
- a plurality of guide flexural members, such that the lateral connectors interconnect the final stage and the intermediate stage via guide flexural members; the lateral connectors interconnect the intermediate stage and the stationary frame via guide flexural members; the final stage is disposed on the first outer connector band via at least one guide flexural member, and the intermediate stage is disposed on the first inner connector band via at least one guide flexural member.

18. The dual-truncated wheel Kibble balance of claim 17, wherein the second guide member comprises:
- a final stage disposed on the second outer connector band;
- an intermediate stage disposed on the second inner connector band;
- a plurality of lateral connectors, such that some of the lateral connectors interconnect the final stage and the intermediate stage, and some of the lateral connectors interconnect the intermediate stage and the stationary frame; and
- a plurality of guide flexural members, such that lateral connectors interconnect the final stage and the intermediate stage via guide flexural members; lateral connectors interconnect the intermediate stage and the stationary frame via guide flexural members; the final stage is disposed on the second outer connector band via at least one guide flexural member, and the intermediate stage is disposed on the second inner connector band via at least one guide flexural member.

19. The dual-truncated wheel Kibble balance of claim 18, further comprising:
- a measurement mass arm in mechanical communication; and
- a reference force arm,
- wherein the double balance wheel is in mechanical communication with the stationary frame at a stationary point of attachment to the stationary frame and that pivots about the stationary point of attachment to the stationary frame, such that the double balance wheel is suspended from the stationary frame by the central flexural bridge that is mechanically interposed between the double balance wheel and the stationary frame, so that the double balance wheel pivotally moves via the central flexural bridge to restore mass balance between the measurement mass arm and the reference force arm.

20. The dual-truncated wheel Kibble balance of claim 19, further comprising a translational cord in mechanical communication with the first guide member and the measurement mass arm, such that the translational cord is interposed between the first guide member and the measurement mass arm, interconnects the first guide member and the measurement mass arm, and linearly translates the measurement mass arm parallel to earth's gravitational field in response to pivotal motion of the double balance wheel relative to the stationary frame.

21. The dual-truncated wheel Kibble balance of claim 19, further comprising a translational cord in mechanical communication with the second guide member and the reference force arm, such that the translational cord is interposed between the second guide member and the reference force arm, interconnects the second guide member and the reference force arm, and linearly translates the reference force arm parallel to earth's gravitational field in response to pivotal motion of the double balance wheel relative to the stationary frame.

22. The dual-truncated wheel Kibble balance of claim 19, wherein the measurement mass arm comprises a coil in mechanical communication with the first guide member.

23. The dual-truncated wheel Kibble balance of claim 22, wherein the coil linearly reciprocates parallel to the gravitational force of the earth in response to pivotal motion of the double balance wheel.

24. The dual-truncated wheel Kibble balance of claim 19, wherein the reference force arm comprises a tare mass in mechanical communication with the second guide member.

25. The dual-truncated wheel Kibble balance of claim 24, wherein the tare mass linearly reciprocates parallel to the gravitational force of the earth in response to pivotal motion of the double balance wheel.

* * * * *